US008681084B2

(12) United States Patent
Haga et al.

(10) Patent No.: US 8,681,084 B2
(45) Date of Patent: Mar. 25, 2014

(54) SEMICONDUCTOR DEVICE, METHOD FOR DRIVING SAME, DISPLAY DEVICE USING SAME AND PERSONAL DIGITAL ASSISTANT

(75) Inventors: Hiroshi Haga, Tokyo (JP); Tomohiko Otose, Kanagawa (JP); Hideki Asada, Tokyo (JP); Yoshihiro Nonaka, Tokyo (JP); Takahiro Korenari, Tokyo (JP); Kenichi Takatori, Tokyo (JP)

(73) Assignee: Gold Charm Limited, Apia (WS)

( * ) Notice: Subject to any disclaimer, the term of this patent is extended or adjusted under 35 U.S.C. 154(b) by 1205 days.

(21) Appl. No.: 11/229,380

(22) Filed: Sep. 19, 2005

(65) Prior Publication Data

US 2006/0109225 A1 May 25, 2006

(30) Foreign Application Priority Data

Sep. 17, 2004 (JP) ................................ 2004-272638

(51) Int. Cl.

*G09G 3/36* (2006.01)
*G09G 5/00* (2006.01)
*G06F 3/038* (2013.01)

(52) U.S. Cl.

USPC ............................................ 345/98; 345/204

(58) Field of Classification Search

USPC ................ 257/15, 64, 243, 397; 345/90-100, 345/204-206

See application file for complete search history.

(56) References Cited

U.S. PATENT DOCUMENTS 4,475,178 A * 10/1984 Kinoshita ..................... 365/203
4,791,613 A * 12/1988 Hardee .................... 365/189.09
4,943,944 A * 7/1990 Sakui et al. .............. 365/189.05
5,281,828 A * 1/1994 Muragishi ....................... 257/66
5,466,619 A * 11/1995 Choi ............................ 438/162
5,982,004 A * 11/1999 Sin et al. ....................... 257/347
6,013,922 A * 1/2000 Ueda et al. ....................... 257/57
6,049,493 A * 4/2000 Kitamoto et al. ............. 365/203
6,359,298 B1 * 3/2002 Krishnan ...................... 257/300
2003/0043104 A1 * 3/2003 Lee et al. ........................ 345/92

(Continued)

FOREIGN PATENT DOCUMENTS

CN 1117205 A 2/1996
CN 1393886 A 1/2003

(Continued)

OTHER PUBLICATIONS

Yoshiharu Nakajima et al., "TA 11.5—A3.8 inch QVQA Reflective Color LCD with Integrated 3b DAC Driver", ISSCC 2000, Section 11, 2000 IEEE International Solid-State Circuits Conference, 2000, pp. 188-189.*

(Continued)

*Primary Examiner* — Matthew Fry
(74) *Attorney, Agent, or Firm* — Altis Law Group, Inc.

(57) ABSTRACT

A device excellent in electrical characteristics is provided by suppressing an operation failure owing to a hysteresis effect that occurs in a circuit using MOS transistors having floating bodies. Moreover, sensitivity of a sense amplifier circuit and a latch circuit including these MOS transistors as components is improved. A signal required in a circuit other than a first circuit is outputted by using electrical characteristics of MOS transistors in a first period (effective period), and in a second period (idle period) excluding the first period, between the gate and source of MOS transistors, a step waveform voltage not less than threshold voltages of these MOS transistors is given.

16 Claims, 58 Drawing Sheets

(56) References Cited

U.S. PATENT DOCUMENTS

| | | | | |
|---|---|---|---|---|
| 2003/0076149 | A1* | 4/2003 | Haga | 327/333 |
| 2003/0090499 | A1* | 5/2003 | Kobayashi | 345/690 |
| 2003/0234800 | A1* | 12/2003 | Nakajima et al. | 345/690 |
| 2004/0066364 | A1* | 4/2004 | Toyozawa et al. | 345/98 |
| 2004/0150607 | A1* | 8/2004 | Nakajima et al. | 345/100 |
| 2005/0057553 | A1* | 3/2005 | Shih et al. | 345/211 |
| 2005/0077844 | A1* | 4/2005 | Koo et al. | 315/366 |
| 2005/0168428 | A1* | 8/2005 | Nakajima et al. | 345/99 |

FOREIGN PATENT DOCUMENTS

| | | | |
|---|---|---|---|
| JP | 06-252398 | A | 9/1994 |
| JP | 07-176757 | A | 7/1995 |
| JP | 08263028 | A | 10/1996 |
| JP | 09-092839 | A | 4/1997 |
| JP | 09-116159 | A | 5/1997 |
| JP | 09-139499 | A | 5/1997 |
| JP | 09-246483 | A | 9/1997 |
| JP | 09-321259 | A | 12/1997 |
| JP | 10-172279 | A | 6/1998 |
| JP | 11-354446 | A | 12/1999 |
| JP | 200176491 | A | 3/2001 |
| JP | 2001-284560 | A | 10/2001 |
| JP | 2002-351430 | A | 12/2002 |
| JP | 2003124801 | A | 4/2003 |
| JP | 2003-332346 | A | 11/2003 |
| JP | 2004-046054 | A | 2/2004 |

OTHER PUBLICATIONS

SID (Society for Information Displays) p. 1392, Digest of Technical Papers in 2003.

ISSCC (IEEE International Solid-State Circuits Conference) 2003, Paper 9.4.

Seto, Journal of Applied Physics, vol. 46, No. 12, Dec. 1975.

Sigeki Tomishima, et al., "A Long Data Retention SOI-DRAM with the Body Refresh Function," Symposium on VLSI Circuits Digest of Technical Papers, 1996, pp. 198.

Tadayoshi Enomoto, "CMOS Integrated Circuit-from introduction to actual use", Oct. 30, 1996.

Andrew Marshall et al., "SOI Design: Analog, Memory and Digital Techniques", 2002, pp. 260-263, Kluwer Academic Publishers, Norwell, Massachusetts, US.

Communication dated Aug. 17, 2011 from the State Intellectual Property Office of the People's Republic of China in counterpart Chinese application No. 200910128536.0.

Japanese Office Action dated Jun. 12, 2012 issued in corresponding Japanese Patent Application No. 2011-087796.

1.Digital Systems Engineering; W.J.Dally/J.W.Poulton; Kurodachukou; Maruzen Corporation; First published Mar. 30, 2013; pp. 723-724.

2.William J. Dally, John W. Poulton; Article 12. Timing Circuit; Digital Systems Engineering; pp. 575-577; Published by the Press Syndicate of the University of Cambridge; The Pitt Building, Trumpington Street, Cambridge CB2 1RP, United Kingdom; First published 1998.

* cited by examiner

SEMICONDUCTOR DEVICE, METHOD FOR DRIVING SAME, DISPLAY DEVICE USING SAME AND PERSONAL DIGITAL ASSISTANT

BACKGROUND OF THE INVENTION

1. Field of the Invention

The present invention relates to a semiconductor device, a circuit, a display device using the same, and a method for driving the same, and in particular, it relates to a semiconductor device for which MOS (Metal Oxide Semiconductor) transistors with SOI (Silicon on Insulator) structures, such as polysilicon (polycrystalline silicon) TFTs (Thin Film Transistors), have been integrated, a circuit, a display device using the same, and a method for driving the same.

2. Description of the Related Art

Polysilicon TFTs formed on insulating substrates had once required expensive quartz substrates for high-temperature processing and had been applied to small-sized and high-added-value display panels. Thereafter, a technique for forming a precursor film by a method such as low-pressure (LP) CVD, plasma (P) CVD, or sputtering and then laser-annealing the same for polycrystallization, namely, a technique capable of forming polysilicon TFTs at a lower temperature which allows use of a glass substrate or the like was developed. Moreover, simultaneously, techniques for oxide film formation, microprocessing, and circuit design have also repeatedly made progress, thus consequently, preparation of portable telephones, personal digital devices, and polysilicon TFT display panels for notebook PCs for which peripheral circuits of display panels have been integrated on substrates identical to those of pixels has begun.

As a specific example, provided is an active matrix-type display device disclosed in prior art 1 (Japanese Published Unexamined Patent Application No. 2004-046054). FIG. 1 is a block diagram showing a configuration of a display system of a conventional common liquid crystal display device integrated with a drive circuit described in FIG. 39 of the prior art 1.

Referring to FIG. 1, in the conventional liquid crystal display device integrated with a drive circuit, an active matrix display region 110 for which wiring has been provided in a matrix form and pixels of M rows and N columns have been arranged, a row-wise scanning circuit (scanning line (gate line) drive circuit) 109, a column-wise scanning circuit (data line drive circuit) 3504, an analog switch 3505, a level shifter 3503, etc., are formed on a display device substrate 101 in a manner integrated by polysilicon TFTs.

A controller 113, a memory 111, a digital/analog conversion circuit (DAC circuit) 3502, a scanning circuit/data register 3501, etc., are of an integrated circuit chip (IC chip) formed on a single-crystal silicon wafer, and are mounted outside the display device substrate 101. The analog switch 3505 has an output number equal to the number N of row-wise data lines of the active matrix display region 110. An interface circuit 114 is formed on a system-side circuit board 103.

In addition, some of the conventional liquid crystal display devices with integrated drive circuits composed of polysilicon TFTs are formed in a manner integrated with more complicated circuits such as DAC circuits. FIG. 2 is a block diagram showing a configuration of a display system of a conventional liquid crystal display device with a built-in DAC circuit described in FIG. 40 of prior art 1. In the conventional liquid crystal display device with a built-in DAC circuit, similar to the device of FIG. 1, which does not have a built-in DAC circuit, in addition to an active matrix display region 110 for which wiring has been provided in a matrix form and pixels of M rows and N columns have been arranged, a row-wise scanning circuit 109, and a column-wise scanning circuit 3506, circuits such as a data register 3507, a latch circuit 105, a DAC circuit 106, a selector circuit 107, and a level shifter/timing buffer 108 are formed in a manner integrated on a display device 101.

In this configuration, a controller IC mounted outside the display device substrate 101 can be composed of a memory 111, an output buffer circuit (D bits) 112, and a controller 113, which are all low-voltage circuits or elements, without including a DAC circuit that uses a high voltage. As a result, since an IC can be fabricated without simultaneously using a process for a high voltage required to generate a voltage signal for writing into a crystal, the price can be held down at a lower price than that of the aforementioned IC consolidated with a DAC.

The above-mentioned liquid crystal display devices are low in profile and lightweight. By making the best use of such features, these liquid crystal display devices are loaded on portable information processors.

Furthermore, a liquid crystal display device for which a power supply circuit composed of polysilicon TFTs has been integrated in the periphery of a display region and which has been successfully driven was recently described in prior art 2 (SID (Society for Information Displays) p. 1392, Digest of Technical Papers in 2003). According to the prior art 2, in addition to a scanning line drive circuit and a data line drive circuit including a 6-bit DAC, a power supply circuit composed of a charge pump circuit and a regulator circuit is formed by polysilicon TFTs in the periphery of a display region, and when a single power supply, for example, a 3V power, is supplied to a panel, another voltage necessary in the panel is generated. Therefore, a power supply circuit IC, which had conventionally been required outside the panel, has become unnecessary.

Moreover, in prior art 3 (ISSCC (IEEE International Solid-State Circuits Conference) 2003, Paper 9.4), an example of an 8-bit CPU with a supply voltage of 5V and an operating frequency of 3 MHz prepared by TFTs formed on a glass substrate has been described. The process rule has been provided as 2 μm. As such, the techniques for preparing polysilicon TFT integrated circuits have been remarkably developed, and are currently nearly reaching a level to realize integrated circuits on glass substrates, which were formed on single-crystal silicon wafers about 30 years ago, in 1975, for example.

Based on such a background as this, as is referred to as a "system on glass," development of a device for which an output function such as a display and an input function such as an image sensor, and peripheral circuits thereof, for example, a memory and a CPU and the like, are integrated on a glass substrate has been advanced.

A polysilicon TFT is generally a MOS-type 3-terminal element provided with a source terminal, a drain terminal, and a gate terminal, and when a circuit is constructed with use of polysilicon TFTs, a circuit configuration thereof can make a reference to a circuit configuration of a so-called bulk MOS integrated circuit, which has been formed with use of a single-crystal silicon wafer.

A circuit configuration and operations of a bulk DRAM (bulk Dynamic Random Access Memory) constructed with use of conventionally known bulk MOS transistors have been described in prior art 4 ("CMOS Integrated Circuit—from introduction to actual use—" authored by Tadayoshi Enomoto), for example. FIG. 3 and FIG. 4 show a DRAM basic circuit and its readout operation and signal waveforms described on page 192 of the prior art 4. Here, of the symbols used in the text and figures of the literature, "D bar" which denotes an inversion of "D" will be displayed, for the convenience of display in a patent document, as "XD" for description.

Referring to FIG. 3 and FIG. 4, a bulk DRAM disclosed in the prior art 4 will be described. First, description will be given of a readout operation when memory contents of a readout cell C1 (upper cell out of the two cells) are "1" with reference to FIG. 3 and FIG. 4. When a precharge pulse $\phi_p$ rises, a bit line pair of D-line and XD-line is set to $V_D/2$. Next, word line $WL_x$ (upper line out of the two lines shown) rises and the D-line is raised by ΔV. When $\phi_{An}$ reaches a high potential, n-channel MOS transistors (nM1 and nM2) of a latch-type sense amplifier start operation, and the n-channel MOS transistor (nM2) has continuity upon receiving potential of the high-potential D-line so as to lower potential of the XD-line of a low-potential side to 0V. On the other hand, a p-channel MOS transistor side functions in contrast to the n-channel MOS transistor side. Namely, when $\phi_{Ap}$ reaches a high potential, the p-channel MOS transistor (pM1) has continuity upon receiving potential of the low-potential XD-line so as to charge the high-potential D-line until it reaches $V_D$. It is considered that, when memory contents of the cell are "0," the operation is reverse of the case for reading out "1."

As such, the minute voltage signal ΔV read out from the memory cell onto the bit line pair is amplified to $V_D$ and 0 by the latch-type sense amplifier circuit. In addition, by writing the signal herein amplified to $V_D$ and 0 into a capacitance C1 of the memory cell via the bit lines, a refresh operation can be carried out.

Here, the driving method mentioned in the above is called a "VD/2 precharge method," wherein an absolute value |ΔV| of ΔV is provided as a primary approximation as in the following numerical expression 1. Here, $C_1$ denotes capacitance of the memory cell C1, and $C_2$ denotes parasitic capacitance of the D-line or DX-line.

$$|\Delta V| = \frac{C}{2(C_1 + C_2)} V_D \quad (1)$$

The description in the above is of a configuration and operations of a bulk DRAM constructed using bulk MOS transistors, meanwhile a similar circuit configuration and operations have been known with regard to a so-called SOI DRAM that utilizes single-crystal silicon on oxide films as channels as well, and this has been described in prior art 5 (page 261 of "SOI Design: Analog, Memory and Digital Techniques" authored by Andrew Marshall), for example.

In addition, an example of the foregoing sense amplifier circuit constructed using TFTs has also conventionally been known. For example, according to FIG. 2 and paragraph 0078 of the specification of prior art 6 (Japanese Published Unexamined Patent Application No. 2002-351430), a latch-type sense amplifier with a configuration the same as that of the latch-type sense amplifier shown in FIG. 3 is constructed by use of p-channel and n-channel TFTs.

The Problems to be Solved by the Invention

The inventors of the present invention found the following. While making reference to the circuit configuration of the conventional DRAM shown in FIG. 3, the present inventor has manufactured a DRAM using polysilicon TFTs by way of trial and has evaluated the same. As a result, the inventor was confronted with a problem such that a readout error frequently occurred when reading out a signal from a memory cell. And, as a result of progressing into an analysis of the cause for this, it was found that sensitivity of the latch-type sense amplifier was so inferior as to be beyond the ability to make a forecast from design and evaluation techniques for conventional polysilicon TFT integrated circuits. First, findings of this problem will be described.

(Latch-Type Sense Amplifier Evaluation Circuit Configuration)

FIG. 5 is a circuit diagram of a latch-type sense amplifier evaluation circuit which was prepared by inventors and is formed of polysilicon TFTs on a glass substrate. A transistor N1 and a transistor N2 are n-channel polysilicon TFTs and transistors P1 and P2 are p-channel polysilicon TFTs. A drain electrode of the transistor N2 and transistor P2 is connected in common to a gate electrode of the transistor P1 and transistor N1, and a drain electrode of the transistor P1 and transistor N1 is connected in common to a gate electrode of the transistor P2 and transistor N2.

A transistor N3 is an n-channel polysilicon TFT to turn on and off a section between a source electrode of the transistor N1 and transistor N2 and a ground electrode (0V), and a transistor P3 is a polysilicon TFT to turn on and off a section between a source of the transistor P1 and transistor P2 and VDD. A node ODD and a node EVN are equivalent to nodes to which a bit line pair is connected when the present sense amplifier circuit is applied to a memory circuit. Herein, capacitances C1 and C2 are connected as signal-retaining capacitances such as bit line capacitances. To the node EVN, a variable voltage source V_EVN_in is connected via SW2. To the node ODD, a fixed voltage source V_ODD_in is connected via SW1. The variable voltage source V_EVN_in, fixed voltage source V_ODD_in, SW1, and SW2 were provided so as to give a potential difference ΔV, which is originally read out from a memory cell and is given to a latch-type sense amplifier, to the present latch-type sense amplifier.

Next, description will be given of a method for driving this latch-type sense amplifier evaluation circuit with reference to input waveforms and actually measured waveforms of FIG. 6.

(A) First, the switch SW1 and SW2 are turned on in a period where SE1 is a low level and SE2 is a high level, namely, both transistors N3 and transistor P3 are off, so as to provide a voltage V_EVN_in and V_ODD_in to the node EVN and node ODD, respectively, and then the switch SW1 and SW2 are turned off, whereby this voltage is sampled in C2 and C1, respectively. Herein, voltage of VDD is provided as VDD1 (VDD1 is a positive voltage and is set to a voltage two times or more of a threshold voltage of TFTs N1 and N2), voltage of V_ODD_in is provided as (VDD1)/2 (this is set to a voltage not less than a threshold voltage of the transistors N1 and N2), and voltage of V_EVN_in is provided as a variable voltage. As such, ΔV is given to the two terminals (EVN and ODD) of the latch-type sense amplifier. ΔV can be defined by the following expression.

$$\Delta V = (V\_EVN\_in) - (V\_ODD\_in) \quad (2)$$

(B) After giving ΔV to the latch-type sense amplifier circuit as such, first, SE1 is made high in level so as to turn on the transistor N3, and next, SE2 is made low in level so as to turn on the transistor P3. Thereby, the following operations are carried out in accordance with operation principles of the DRAM shown in the aforementioned FIG. 3 and FIG. 4.

(1) First, by turning on the transistor N3 of FIG. 5, out of the node pair ODD and EVN equivalent to a bit line pair, voltage of the lower-voltage node (node ODD in the drawing) is lowered to 0V, so that a section between this node ODD and ground reaches a low impedance. At this time, voltage of the higher-voltage node (node EVN in the drawing) is (V_EVN_in), which is slightly lowered from the given voltage (shown by a in FIG. 6).

The voltage of the higher-voltage node (node EVN in the drawing) is slightly lowered for the following two reasons. That is, first, a gate voltage and a source voltage of the transistor N2 are lowered, and at this time, owing to coupling between the gate and drain and the source and drain of the transistor N2 via a capacitance, an electric charge of the capacitance C2 is extracted, and second, since it takes time until voltage of the lower-voltage node of the node pair is lowered to 0V and the transistor N2 is on for this time, electric charge of the capacitance C2 is extracted through the transistor. As illustrated, a shows a difference between a voltage given at (V_EVN_in) and a voltage where voltage of the higher-voltage node (EVN in the drawing) was stabilized. On the other hand, B shows a difference between (VDD1)/2 and a voltage at which the higher-voltage node was stabilized. Normally, a is so small to an extent as not to cause a problem in operation of the sense amplifier or circuit design is carried out so as not to cause a problem.

This higher-voltage node is still in a high-impedance state with respect to the ground and power supply (VDD).

(2) Next, by turning on the transistor P3, voltage of the higher-voltage node (EVN in the drawing) is raised to VDD1, and a section between this node and VDD reaches a low impedance.

By these amplifying and latching operations in (1) and (2), ΔV given to the latch-type sense amplifier circuit is amplified to an amplitude of VDD1-0, and is latched.

(C) Then, SE1 is made low in level and S2 is made high in level so as to turn off the transistors N3 and P3. Then, the series of operations is repeated in (A) again.

By monitoring the voltages of the node ODD and node EVN, waveforms as shown at EVN and ODD in FIG. 6 are observed, whereby a threshold value (namely, at what voltage or more of ΔV the node EVN becomes a high level) and sensitivity thereof (namely, at what voltage or more of an absolute value of ΔV the output is stabilized) can be found.

In such a manner as in the foregoing, ΔV was given to the latch-type sense amplifier to carry out amplifying and latching operations successively, and whether at a high level or at a low level the amplified and latched voltage, concretely, the node EVN, was amplified and latching was measured while varying ΔV.

Results of this measurement are shown in the graph of FIG. 7 by a two dotted chain line segment. As shown in FIG. 7, in a region of ΔV>V1, the node EVN is amplified to a high level at a probability of 100%, while in a region of ΔV<V2, the node EVN is amplified to a high level at a probability of 0%. Herein, "the node EVN is amplified to a high level at a probability of 0%" means that the node EVN is amplified to a low level at a probability of 100%. And, in a region of V2<ΔV<V1, malfunctions have occurred. Namely, the node EVN was amplified not at either the high level or low level but at a high level with a percentage shown in FIG. 7, and a so-called unstable output state was observed.

As mentioned in the foregoing, as a result that the output is not fixed as to whether it becomes high in level or low in level across a wide region and becomes unstable, an extremely significant problem arises. This is because, if this problem cannot be solved, namely, if the output becomes unstable between V1 and V2, a normal readout operation cannot be carried out unless the capacitance C1 of the memory cell and parasitic capacitance C2 of the bit line are determined according to numerical expression 1 so as to become at least |ΔV|> (absolute value of V1 or V2 with a greater absolute value). In order to secure a great ΔV as such, the memory cell capacitance C1 must be increased or the number of memory cells connected to the bit line must be reduced, therefore, the degree of integration of the DRAM is considerably lowered.

In addition, a great question has arisen from the result that the output becomes unstable across a wide voltage range as such. The reason for the question arising is as follows.

Namely, in such a case, as in the present experiment, where one latch-type sense amplifier circuit is successively measured, since a threshold value unique to the latch-type sense amplifier circuit is a certain fixed value, it is considered that the node EVN is amplified to a high level at a probability of nearly 100% if ΔV is greater than this threshold value, and the node EVN is amplified to a low level at a probability of nearly 100% if ΔV is smaller than this threshold value.

That is, as shown by the solid line segment in the graph of FIG. 7, it is forecasted that the probability results in a characteristic having a steep inclination.

Since this threshold value unique to the latch-type sense amplifier circuit is determined depending on a difference in characteristics between the polysilicon TFTs N1 and N2 and a difference in greatness between the capacitances C1 and C2, this has variation due to a process variation in manufacturing. When the threshold value of the circuit varies, the forecasted characteristic shown by the solid line in FIG. 7 changes so as to shift in the left and right direction within the graph. At this time, there is no change in the manner steeply changing at the threshold value of the circuit as a boundary. On the other hand, an experiment of the inventor using polysilicon TFTs results in indefiniteness of the threshold value of the circuit itself as shown by the two dotted chain line in FIG. 7, and the probability of amplification to one of the polarities gently changes across the voltage range of V2<ΔV<V1 where the output becomes unstable.

That is, the problem of instability that whether the output becomes a high level or a low level is not fixed in such a wide region as V2<ΔV<V1 is a problem different from the problem of variation in steep threshold values between circuits that has conventionally been a problem.

The inventor has investigated the result that the output became unstable in such a wide region as V2<ΔV<V1. Namely, he has investigated why the unstable region was wide.

As a result, the following unique phenomenon has been observed. That is, in the region of ΔV where the output becomes unstable, an occurrence of inverted outputs (error outputs) has periodicity. For example, when ΔV=V3, with reference to FIG. 7, it is shown that the probability of a high-level amplification of the node EVN is 80%, and furthermore, when waveforms of the node EVN and node ODD are carefully observed, it is found that the node EVN has been amplified to a high level four successive times out of five times of sensing operations, while it has been amplified to a low level once. Then, it is again amplified to a high level four times and then is amplified to a low level once. As such, a four-time high-level amplification and a one-time low-level amplification have been repeated.

Furthermore, when ΔV is reduced to, for example, ΔV=V4, a two-time high-level amplification and a one-time low-level amplification are repeated.

Furthermore, when ΔV is reduced to ΔV=Vh, a one-time high-level amplification and a one-time low-level amplification are repeated.

Furthermore, when ΔV is reduced to ΔV=V5, it is found the node EVN has been amplified to a low-level four successive times out of five times of sensing operations, while it has been amplified to a high level one time. Then, it is again amplified to a high level four successive times and then is amplified to a low level once. As such, a four-time successive low-level amplification and a one-time high-level amplification have been repeated.

That is, according to the experimental results shown in FIG. 7, only the percentage of a high-level amplification of the node EVN was found, however, by carefully observing waveforms of the node EVN in time series, the inventor has discovered that the case of a high-level amplification does not randomly occur in time series but has regularity.

In addition, as another phenomenon, the following has been observed. It has been observed that a malfunction occurred when turning on the transistor N3 to lower a lower-voltage node of the nodes ODD and EVN to 0V. A schematic diagram of input/output waveforms of a latch-type sense amplifier herein obtained is shown in FIG. 8. A phenomenon of inversion of a size relationship in voltage has been confirmed at a part shown by "C" in FIG. 8.

In the course of proceeding with the analysis, the inventor has ascertained that a hysteresis effect caused by a floating body had occurred in the polysilicon TFTs, and this had caused the foregoing problem in circuit operation, namely, the problem of unstabilization of the output in such a wide region as V2<ΔV<V1.

The hysteresis effect caused by a floating body is a phenomenon where it is considered that, since a body region of a polysilicon TFT sandwiched between the source and drain is electrically floating, this potential fluctuates, and consequently, characteristics such as a threshold voltage of the polysilicon TFT are dynamically fluctuating according to hysteresis until then. Of the floating body effects of a polysilicon TFT, a static phenomenon is known as a cause of the kink effect, for example, however, there is no dynamic phenomenon, for example, no such example which has caused a problem in circuit operation by a hysteresis effect as herein discussed, as far as the inventor knows.

Hereinafter, results of a measurement of a dynamic threshold voltage fluctuation of polysilicon TFTs and examination thereof will be described. A dynamic threshold voltage of a MOS transistor caused by a floating body cannot be measured by a conventional static characteristic measuring method. The conventional static method is, for example, a method for measuring ID-VG of a MOS transistor and determining a threshold voltage from that ID value. In a case of this method, since a gate voltage is swept over a few seconds to a few tens of seconds, only a static threshold voltage is obtained. That is, obtained are only characteristics in equilibrium of terminal-to-terminal voltages VGS and VDS that are being given during the measurement. In addition, since a drain current is applied for a long time at the time of measurement, a rise in potential of the body occurs owing to impact ions, and a threshold voltage immediately after giving an arbitrary operation histories cannot be measured.

Therefore, the inventor has devised a measuring method and has measured a dynamic threshold voltage after giving an operation histories to a MOS transistor.

FIGS. 9A and 9B show voltages applied to polysilicon TFTs N1 and N2 when an output voltage which appears after being amplified and latched at a node EVN of the latch-type sense amplifier circuit shown in FIG. 5 is successively at a high level as shown in FIG. 6. Herein, shown is an example where a threshold voltage of the polysilicon TFTs N1 and N2 is Vt.

As in FIG. 9A, voltage waveforms applied to the polysilicon TFT N1 are shown as "Condition 1," and as in FIG. 9B, voltage waveforms applied to the polysilicon TFT N2 are shown as "Condition 2."

Voltages obtained by modeling these voltage waveforms were given to a stand-alone polysilicon TFT, and then a threshold voltage was measured. Modeling of the voltage waveforms was performed as follows.

(1) In FIGS. 9A and 9B, a pulse voltage waveform of 0V to (Vt−ΔV)V was made into a 0V-fixed voltage waveform.

(2) In FIGS. 9A and 9B, a stepped voltage waveform which changes within a range of Vt to VDD1 was made into a pulse voltage waveform of 0V to VDD1.

Namely, as voltage waveforms equivalent to Condition 1, VDS was made into a 0V-fixed voltage waveform, and VGS was made into a pulse voltage waveform of 0V to VDD1, and as voltages equivalent to Condition 2, VDS was made into a pulse voltage waveform of 0V to VDD1, and VGS was made into a 0V-fixed voltage waveform. Then, the following measurement was carried out.

(1) Voltages (VDS=0V, a pulse voltage of 0V to VDD1 to VGS) equivalent to Condition 1 are given to the polysilicon TFT, and a threshold voltage immediately after the same is measured. By changing a giving pulse number, fluctuation of the threshold voltage is measured.

(2) Voltages (VGS=0V, a pulse voltage of 0V to VDD1 to VDS) equivalent to Condition 2 are given to the polysilicon TFT, and a threshold voltage immediately after the same is measured. By changing a giving pulse number, fluctuation of the threshold voltage is measured.

Results of the measurement are shown in FIG. 10. The horizontal axis shows the number of given pulses, and the vertical axis shows a differential ΔVth from an initial value of the threshold voltage. Results on the above-described (1) condition were plotted by |, and results on the above-described (2) condition were plotted by ○.

As shown in this graph, the threshold voltage has fluctuated according to a pulse number given as hysteresis. In addition, a difference in the threshold voltages between (1) and (2) has been increased. This fluctuation in the threshold voltage, which will be described later, can well account for the measurement results of the latch-type sense amplifier evaluation circuit.

A single polysilicon TFT was used in this measurement, and moreover, similar results could be obtained when the measurement was carried out several times while changing the order of measurement, therefore, it is considered that the threshold voltage is dynamically fluctuating, which is a phenomenon different from a deterioration owing to a stress.

Since it has been confirmed by this experiment that the characteristics (threshold voltage) of the polysilicon TFT fluctuate according to hysteresis so far, it is concluded that the polysilicon TFT circuit has a hysteresis effect.

Next, other experimental results obtained in the course of proceeding with the analysis will be described. These results serve, in a construction of the present invention to be described later, as one of the reasons for which effects of the present invention can be obtained.

As mentioned above, for the transistors N1 and N2 of the latch circuit of FIG. 5, biasing in a latching period is umbalanced, and waveforms given to the TFTs N1 and N2 are different between when shifting from a latching period to a sampling period and when shifting from a sampling period to a latching period. Consequently, due to the hysteresis effect, characteristics of the TFTs N1 and N2 fluctuate differently.

Accordingly, it is forecasted that the hysteresis effect is reduced by lowering the bias voltage given in an umbalanced manner to the TFTs N1 and N2 in the latching period. Therefore, the following experiment was carried out.

The latch circuit shown in FIG. 5 was driven in accordance with a drive timing shown in the timing chart of FIG. 6, and while changing the supply voltage VDD in a range of VDD1 to (VDD1)/2, ΔV necessary at a minimum to obtain a stable output was measured.

Here, even when the supply voltage VDD was changed, the voltage of V_ODD_in was fixed to (VDD1)/2, and voltage of V_EVN_in was provided as {(VDD1)/2}+ΔV.

According to such driving, the maximum VGS or VDS applied to the TFTs N1 and N2 was equal to the supply voltage VDD.

Then, a minimum value of ΔV necessary for stabilizing operation and continuously performing operation such that the node EVN maintains a high potential and the node ODD is lowered to 0V and a maximum value of ΔV necessary for stabilizing operation and continuously performing operation such that the node ODD maintains a high potential and the node EVN is lowered to 0V were measured.

Also, similarly, a latch-type sense amplifier circuit composed only of n-channel MOS transistors shown in FIG. 11 was used for measurement. At this time as well, the voltage of V_ODD_in was fixed to (VDD1)/2, and voltage of V_EVN_in was provided as {(VDD1)/2}+ΔV.

In this case, the maximum VGS or VDS applied to the MOS transistors N1 and N2 was a voltage slightly lower than {(VDD1)/2}.

The MOS transistors in FIG. 5 and FIG. 11 were herein provided as polysilicon TFTs.

Results of this experiment are shown in FIG. 12. With the horizontal axis showing a maximum VGS or VDS and the vertical axis showing ΔV necessary at a minimum to obtain a stable output, the results were plotted.

By lowering the maximum VGS or VDS applied to the MOS transistors N1 and N2, a phenomenon of a reduction of the unstable region was confirmed. This is considered because the imbalance of body potential that occurs in an amplifying and latching period and in the course of shifting from the latching period to a sampling period was reduced by reducing the unbalanced voltage applied to the MOS transistors.

Here, a minimum value of ΔV necessary for stabilizing operation and continuously performing operation such that, when voltage of the power supply VDD is provided as VDD1, the node EVN maintains a high potential and the node ODD is lowered to 0V is shown as V1 in FIG. 12. This V1 value is identical to V1 shown in FIG. 7. Similarly, V2 shown in FIG. 12 is identical to V2 shown in FIG. 7.

In addition, results of a measurement using a latch circuit composed only of n-channel transistors shown in FIG. 11 are shown as V8 and V9 in FIG. 12.

These experimental results also support that failures of the sense amplifier circuit are caused by the hysteresis effect owing to a floating body.

When referring to a device model of PD (partially depleted)-SOI MOS transistors using single-crystal silicon, there are various mechanisms for which body potential fluctuates, and a threshold voltage is fluctuated by an influence of this body potential, and the reason that the threshold voltage fluctuates in the direction shown in the above-described FIG. 10 can be described, with reference to FIG. 13 as follows.

When a pulse voltage is periodically given to a gate, the threshold voltage rises in a case of an n-channel MOS transistor, for example. This mechanism will be described.

The right drawing of FIG. 13A is a schematic view of an n-channel MOS transistor having a floating body. A source (S), a drain (D), a gate (G), and a body (B) are shown in this drawing. In the case of an n-channel MOS transistor, the type of conduction of a semiconductor layer as being an active layer (a part composed of a body and a depletion layer in FIG. 13A) is $P^-$ for which no electric field is provided. Accordingly, a semiconductor in a region shown by the body (B) is a neutral region where positive holes exist as carriers, and the type of conduction is $P^-$. When 0V is applied to the source and drain and a positive voltage (VDD1 in this drawing) exceeding a threshold value is applied to the gate, as shown in the right drawing of FIG. 13A, the surface of the semiconductor layer is inverted, and a channel is formed by induced electrons. Also, at this time, in the active layer region, a region other than the body (B) is depleted.

Some of the electrons induced by a gate voltage are, as shown in the right drawing of FIG. 13A, captured by traps. Then, when a voltage smaller than the threshold voltage is given to the gate voltage, the trapped electrons and positive holes of the body are recombined.

When the MOS transistor is repeatedly turned on and off by repeatedly giving such a pulse voltage to the gate, electrons flow to the body, and potential of the neutral region (body) as $P^-$is lowered. Then, similar to the description by Numerical expression 3 to be described later, the threshold voltage rises.

When a voltage is given to the drain in a state where VGS is lower than the threshold value, the threshold voltage is lowered. This mechanism will be described.

The right drawing of FIG. 13B is a schematic view of an n-channel MOS transistor having a floating body. A source (S), a drain (D), a gate (G), and a body (B) are shown in this drawing. In the case of an n-channel MOS transistor, the type of conduction of a semiconductor layer as being an active layer is $P^-$ for which no electric field is provided. Accordingly, a semiconductor in a region shown by the body (B) is a neutral region where positive holes exist as carriers, and the type of conduction is $P^-$. In the active layer region, a region other than the body (B) is depleted.

Moreover, pn-junctions formed between the body (B) and drain (D) and between the body (B) and source (S) are shown by symbols of diodes in the drawing.

As shown in the right drawing of FIG. 13B, when a voltage 0V that is a voltage not more than a threshold voltage is given to VGS and a positive voltage VDD1 is given to VDS, since the type of conduction of the body is $P^-$ and the type of conduction of the drain is $N^+$, the drain and body reaches a reverse-biased diode-connected state. Then, a junction leak current (current shown by ibd in the drawing) in the reverse biased state flows from the drain to the body, and potential of the body rises. Thereby, similar to the description by Numerical expression 3 to be described later, the threshold voltage is lowered.

In a case of a polysilicon TFT, a mechanism and model of a dynamic threshold voltage fluctuation are considered different from those of the PD-SOI MOS transistor using single-crystal silicon, however, since the results obtained by a dynamic threshold voltage fluctuation measurement of the polysilicon TFT and results obtained from the model of the PD-SOI MOS transistor using single-crystal silicon are quantitatively identical, it is considered that the model of the PD-SOI MOS transistor using single-crystal silicon is useful for analyzing behavior of the polysilicon TFT.

Here, with regard to a so-called bulk MOS transistor formed on a single-crystal silicon wafer, a relationship between the substrate potential and threshold voltage can be expressed, in a case of an n-channel transistor, by the following Numerical expression 3.

$$V_{th} = 2\phi_f + V_{FB} + \frac{\sqrt{2K\varepsilon_0 qN_a(2\phi_f + V_{SB})}}{C_0} \quad (3)$$

Herein, $V_{th}$ stands for a threshold voltage of a MOS transistor, $\phi_f$ stands for a Fermi-level potential of a (p-type) semiconductor to form a channel measured from a Fermi-level position of an intrinsic semiconductor, $V_{FB}$ stands for a flat band voltage, K stands for a relative dielectric constant of a semiconductor, $e_0$ stands for a dielectric constant in a vacuum, q stands for an electric charge quantity of electrons, $N_a$ stands for an ionized acceptor density, $V_{SB}$ stands for a source voltage in terms of a substrate, and $C_0$ stands for a unit capacitance of a gate oxide film.

According to this expression, it can be understood that, for a bulk MOS transistor, as a substrate potential is lowered, that is, by increasing $V_{SB}$, the threshold voltage is monotonously increased (although coefficient of fluctuation is reduced), and it is considered that this relationship quantitatively holds true in an SOI MOS transistor using single-crystal silicon and a polysilicon TFT as well.

However, as in the SOI MOS transistor using single-crystal silicon and TFT, if the silicon layer is limited, when substrate potential is gradually lowered, it is considered that the depletion layer reaches the lower end of the silicon layer at a certain point and the threshold value does not increase further than the same. The reason is because the depletion layer has reached the lower end of the silicon layer to provide a state the same as a so-called completely depleted SOI, and potential of the depletion layer is no longer dependent on the substrate potential. Moreover, also based on the fact that the numerator of the third member of Numerical expression 3 indicates a depletion layer charge (=−q×Na×$X_{dmax}$, $X_{dmax}$ is an maximum depletion layer width), it is forecasted that when the depletion layer reaches the lower end of the silicon layer, since the depletion does not extend further than the same, the threshold voltage no longer increases.

As has been shown in the observation results of waveforms of the latch-type sense amplifier evaluation circuit, since the size relationship in voltage is inverted at the part of C in FIG. 8, in this case, it is considered that a problem exists in the operation for turning on the transistor N3 by making SE1 high in level in the latch-type sense amplifier shown in FIG. 5 so as to operate the transistors N1 and N2, and thereby lowering potential of one of the bit lines (EVN or ODD) to a ground. Namely, analysis is proceeded while focusing on the operation of the latch circuit composed of n-channel polysilicon TFTs.

Therefore, the operation of the latch-type sense amplifier circuit composed of n-channel polysilicon TFTs shown in FIG. 11 will be examined. A condition for high-potential latching of the node EVN of the latch-type sense amplifier shown in FIG. 11 is given based on primary approximation (assumption that characteristics other than the threshold voltage are the same) by the following Numerical expression 4. Here, Vt1 can be expressed by a threshold voltage of N1, and Vt2 can be expressed by a threshold voltage of N2.

$$\Delta V > Vt1 - Vt2 \quad (4)$$

On the other hand, in a case of the following Numerical expression 5, the node EVN of the sense amplifier is amplified and latched at a low level. And, in a case of the following Numerical expression 6, since the polysilicon TFT N1 and transistor N2 are equal in conductance, a potential difference between the node EVN and node ODD is not amplified, and both are gradually lowered in potential.

$$\Delta V > Vt1 - Vt2 \quad (5)$$

$$\Delta V = Vt1 - Vt2 \quad (6)$$

When the number of given pulses is 0, for example, where threshold voltages of the polysilicon TFTs N1 and N2 in equilibrium of VGS=VDS=0V are provided as Vts1 and Vts2, respectively, and fluctuations in threshold voltage obtained from the "measurement results of a dynamic threshold voltage fluctuation of polysilicon TFTs" of FIG. 10 are provided as ΔVth1 and ΔVth2, respectively, Vts1 and Vts2 can be expressed as in the following Numerical expressions 7 and 8. When these are used, a condition for high-level latching of the node EVN of the sense amplifier in a case of a dynamic fluctuation of the threshold voltage of the polysilicon TFT becomes as in the following Numerical expression 9.

$$Vt1 = Vts1 + \Delta Vth1 \quad (7)$$

$$Vt2 = Vts2 + \Delta Vth2 \quad (8)$$

$$\Delta V > (\Delta Vth1 - \Delta Vth2) + (Vts1 - Vts2) \quad (9)$$

Herein, since the value in the second parentheses of the right side does not fluctuate from a definition and takes a certain constant, where this is provided as D, Numerical expression 9 can be expressed by the following Numerical expression 10.

$$\Delta V > (\Delta Vth1 - \Delta Vth2) + D \quad (10)$$

Numerical expression 10 means that a condition for high-level latching of the node EVN of the sense amplifier changes according to (ΔVth1−ΔVth2).

FIG. 14 is a graph of (ΔVth1−ΔVth2) plotted in terms of the number of given pulses based on the experimental results shown in FIG. 10. As mentioned above, in FIG. 10, the number of pulses given to the polysilicon TFT is equivalent to the number of operations of the latch-type sense amplifier. Accordingly, the horizontal axis of FIG. 14 can be rephrased as the number of operations of the sense amplifier, and the vertical axis can be rephrased as ΔV necessary at a minimum to amplify and latch the node EVN of the latch-type sense amplifier at a high level. However, this is in a case where the constant D of Numerical expression 10 is 0, and in a case where D takes a value other than 0, it is sufficient to offset the vertical axis of the graph of FIG. 14 according to this value.

As can be understood from FIG. 14, in order to successively obtain outputs with an identical polarity in the latch-type sense amplifier circuit, ΔV must be increased. For example, when the node EVN is amplified and latched at a high level (n1+1) times in succession, an amplification and latching operation has been carried out (n+1) times before the (n1+1)th amplification and latching operation. Accordingly, (n1) times of pulses have been given as hysteresis prior to the (n1+1)th amplification and latching operation. That is, as can be understood from FIG. 14, ΔV which is necessary at a minimum to amplify and latch the node EVN at a high level (n1+1) times in succession is V6.

Similarly, in order to amplify and latch the node EVN at a high level (n2+1) times in succession, ΔV not less than V7 becomes necessary. In order to stably operate the latch-type sense amplifier circuit (for example, in order to make the node EVN stably output a high level infinite times), ΔV which is greater than a voltage to saturate the graph of FIG. 14 must be given. If ΔV is smaller than that value, the latch-type sense amplifier circuit outputs a low level after outputting a high level a certain number of times in succession. This has quantitatively coincided with the results obtained by a measurement of the latch-type sense amplifier evaluation circuit.

Next, a case where the node EVN of the latch-type sense amplifier has outputted a low level in accordance with the above reason after having been amplified at a high level a certain number of times in succession will be examined.

When the node EVN is successively outputting a high level, to the polysilicon TFT N1, voltages shown in Condition 1 of FIG. 9 are applied so that the threshold voltage of N1 is increased as shown in FIG. 10, and on the other hand, to the polysilicon TFT N2, voltages shown in Condition 2 of FIG. 9 are applied so that the threshold voltage of N2 is reduced as shown in FIG. 10. As a result, when ΔV that has been given to the latch-type sense amplifier is not sufficiently great, the node EVN outputs a low level for the foregoing reason. At this time, the voltages shown in Condition 2 are given to the polysilicon TFT N1, to which the voltages shown in Condition 1 have been applied so far, and the threshold voltage, which has continuously risen so far, is reduced. In addition, the voltage shown in Condition 1 are given to the polysilicon TFT N2, to which the voltages shown in Condition 2 have been applied so far, and the threshold voltage, which has continuously been reduced so far, is increased. Consequently, the value of (ΔVth1−ΔVth2), which has continuously been increased so far, is reduced. Thereby, ΔV which is necessary at a minimum to amplify and latch the node EVN at a high level is lowered, so that the node EVN is again amplified at a high level.

This mechanism is coincident with experimental results, and periodicity has been confirmed by an experiment as well in occurrence of inverted outputs (error outputs) in a region of ΔV where the output was unstable.

Based on the findings obtained so far, transition in body potentials of the polysilicon TFTs N1 and N2 when the latch-type sense amplifier circuit shown in FIG. 5 was driven was estimated. As an example of driving conditions, ΔV for which a percentage that the node EVN outputs a high level (VDD) becomes 75% was given. A case where the node EVN outputs a high level (VDD1) is regarded as a normal operation, while a case where the node EVN outputs a low level (0V) is regarded as a malfunction. Namely, an operation example where a normal operation occurs three times and then a malfunction occurs once will be described.

A schematic diagram of body potentials of the polysilicon TFTs N1 and N2 are shown in FIG. 15. The horizontal axis shows time, while the vertical axis shows body potentials of the respective TFTs. In addition, timings of respective operations such as sampling, amplification, latching and the like are shown in the drawing.

The difference in body potentials becomes greater as the number of amplifying operations increases from the first amplifying operation (1) to the fourth amplifying operation (4).

Moreover, in the drawing, VGS and VDS have been appropriately specified in terms of periods at some points. In periods where these have not been specified, applied are only low voltages, such that VGS and VDS are, in either case, not more than threshold voltages of the polysilicon TFTs.

The first amplifying operation (1) is carried out at the timing shown by the arrow mark of amplifying operation (1). When the first amplifying operation (1) is carried out, ΔV that has been given to the sense amplifier is first amplified by n-channel polysilicon TFTs in terms of a potential difference therebetween. Body potentials of the polysilicon TFTs N1 and N2 at the moment that this amplification is started are potentials shown in the sampling period (1), and a potential difference therebetween is small. The first amplifying operation (1) is carried out, and the node EVN is amplified at a high level in this example. Therefore, to VGS of the transistor N1, a rising pulse with an amplitude of nearly VDD1 is applied, and by an electrostatic capacitive coupling between the gate and body, the body potential of the transistor N1 is instantaneously raised. In the amplification and latching period (1), VGS of the transistor N1 is VDD1, and VDS is 0V.

On the other hand, when the first amplifying operation (1) is carried out, a rising pulse with an amplitude of nearly VDD1 is applied to VDS of the polysilicon TFT N2, and by an electrostatic capacitive coupling between the drain and body, the body potential of the transistor N2 is instantaneously raised. However, since the capacitance between the drain and body is smaller than that between the gate and body, a voltage raised by an electrostatic capacitive coupling is smaller than that in the case of the transistor N1. In the amplification and latching period (1), VGS of the transistor N2 is 0V, VDS is VDD1, and owing to a leak current between the drain and body, the body potential gradually rises as in the drawing.

When shifting from the amplifying and latching period (1) to the sampling period (2), since VGS and VDS of the transistors N1 and N2 all become not more than the threshold voltages of the TFTs, for the transistor N1, a falling pulse is applied to the gate, and for the transistor N2, a falling pulse is applied to the drain. In accordance therewith, potentials of the bodies are lowered via an electrostatic capacitive coupling between the gate and body or between the drain and body. At this time, the reason that the transistor N1 is greater in the lowered voltage is because the capacitance between the gate and body is greater in coupling capacitance than that between the gate and drain.

Since it reaches the sampling period (2) through such operations, in the sampling period (2), the difference in body potentials has become greater than that in the sampling period (1). Namely, in the sampling period (2), the body potential of the transistor N1 has fallen and the body potential of the transistor N2 has risen in comparison with those in the sampling period (1). That is, the threshold voltage of the transistor N1 has risen, while the body potential of the transistor N2 has fallen. Accordingly, the value of Vt1−Vt2 has become greater.

Subsequent to the sampling period (2), the second amplifying operation (2) is carried out. And, in the second amplifying operation (2) as well, the node EVN has been amplified to a high level. This is because Numerical expression 4 is still satisfied even after Vt1−Vr2 has become great. Namely, when the second amplifying operation (2) is carried out, ΔV>Vt1−Vt2 has been satisfied. By the second amplifying operation (2), a rising pulse of (VDDL−Vt1+ΔV) is applied between the gate and source of the transistor N1, and a rising pulse of VDD1−Vt1 is applied between the drain and source of the transistor N2, whereby body potentials of both are instantaneously raised via an electrostatic capacitive coupling. In the amplifying and latching period (2) subsequent thereto, VGS of the transistor N2 is 0V, and VDS is VDD1, and owing to a leak current between the drain and body, the potential of the body gradually rises as in the drawing.

When shifting from the amplifying and latching period (2) to the sampling period (3), similar to when shifting from the amplifying and latching period (1) to the sampling period (2), potentials of the bodies are lowered. At this time, the reason that the transistor N1 is greater in the lowered voltage is because, as mentioned above, the capacitance between the gate and body is greater in coupling capacitance than that between the gate and drain.

Since it reaches the sampling period (3) through such operations, in the sampling period (3), the difference in body potentials has become greater than that in the sampling period (2). Namely, in the sampling period (3), the body potential of the transistor N1 has fallen and the body potential of the transistor N2 has risen in comparison with those in the sampling period (2). That is, the threshold voltage of the transistor N1 has risen, while the body potential of the transistor N2 has fallen. Accordingly, the value of Vt1−Vt2 has become greater.

Subsequent to the sampling period (3), the third amplifying operation (3) is carried out. And, in the third amplifying operation (3) as well, the node EVN has been amplified to a high level. This is because Numerical expression 4 is still satisfied even after Vt1−Vr2 has become great. Namely, when the amplifying operation (3) is carried out, ΔV>Vt1−Vt2 has been satisfied. By the third amplifying operation (3), similar to the second amplifying operation (2), body potentials of both are instantaneously raised via an electrostatic capacitive coupling. In the amplifying and latching period (3) subsequent thereto, VGS of the transistor N2 is 0V, and VDS is VDD1, and owing to a leak current between the drain and body, the potential of the body gradually rises as in the drawing.

When shifting from the amplifying and latching period (3) to the sampling period (4), similar to when shifting from the amplifying and latching period (1) to the sampling period (2), potentials of the bodies are lowered.

Since it reaches the sampling period (4) through such operations, in the sampling period (4), the difference in body potentials has become greater than that in the sampling period (3). Namely, in the sampling period (4), the body potential of the transistor N1 has fallen and the body potential of the transistor N2 has risen in comparison with those in the sampling period (3). That is, the threshold voltage of the transistor N1 has risen, while the body potential of the transistor N2 has fallen. Accordingly, the value of Vt1−Vt2 has become greater.

Subsequent to the sampling period (4), the fourth amplifying operation (4) is carried out. And, in the fourth amplifying operation (4), the node EVN has been amplified at a low level, thus a malfunction has occurred. This is because Vt1−Vr2 has become great and has finally failed to satisfy Numerical expression 4. Namely, when the fourth amplifying operation (4) was carried out, ΔV<Vt1−Vt2 has occurred.

By the fourth amplifying operation (4), now a rising pulse is applied to the drain of the transistor N1 and a rising pulse is applied to the gate of the transistor N2, and body potentials of both are instantaneously raised by an electrostatic capacitive coupling. At this time, since the transistor N1 is coupled via a drain-body capacitance, a rise resulting from the coupling is smaller than that of the third amplifying operation (3). For the transistor N2, since the body potential is raised via a coupling capacitance between the gate and body, this is instantaneously greatly raised. However, since a connection in the forward direction is provided between the body and source or between the body and drain, the potential quickly falls.

Thereafter, in the amplifying and latching period (4), the body potential of the transistor N1 gradually rises. This is because VDD1 is applied to VDS of the transistor N1 and a current is supplied from the drain to the body where potential has dropped so far. On the other hand, the body potential of the transistor N2 falls as in the drawing. This is because the still high body potential tries to return to a potential in equilibrium.

When shifting from the amplifying and latching period (4) to the sampling period (1), since VGS and VDS of the transistors N1 and N2 all become not more than the threshold voltages of the TFTs, for the transistor N1, a falling pulse is applied to the drain, and for the transistor N2, a falling pulse is applied to the gate. Then, potentials of the bodies are lowered via an electrostatic capacitive coupling between the gate and body or between the drain and body. At this time, the reason that the transistor N1 is greater in the lowered voltage is because, as mentioned above, for the transistor N2, a falling pulse is applied to the gate, and the coupling capacitance between the gate and body is greater. In addition, as in the transistor N2 in the amplifying and latching period (4), when the body potential is high, the depletion layer width is small, and the capacitance between the gate and body is greater than that when the body potential is low. Therefore, the body potential of the transistor N2 is greatly lowered.

Since it shifts the next sampling period through such operations, in this sampling period, the difference in body potentials has become smaller than that in the sampling period (4). Then, the body potentials at this time are equal to those in the sampling period (1). This is because periodicity has been confirmed in occurrence of inverted outputs (error outputs) by experiment, and when an error is outputted once in four times of amplifying operations as in this example, one cycle composed of four-time amplifying operations is repeated. Moreover, this applies not only to the voltages of the node EVN and ODD but also to the body potentials. If the body potentials had no such periodicity, such a periodical operation that an error is outputted once in four times of amplifying operations would not hold true.

In the sampling period (1), the difference in the body potentials has become smaller than that in the sampling period (4). Namely, in the sampling period (1), the body potential of the transistor N1 has risen and the body potential of the transistor N2 has fallen in comparison with those in the sampling period (4). That is, the threshold voltage of the transistor N1 has fallen, while the body potential of the transistor N2 has risen. Accordingly, the value of Vt1−Vt2 has become smaller.

Thereby, Numerical expression 4 is again satisfied. Numerical expression 4 has been ΔV>Vt1−Vt2. Namely, ΔV>Vt1−Vt2 is satisfied, and in the amplifying operation (1) subsequent thereto, a normal operation is again carried out so that the node EVN is amplified at a high level. Then, (1) to (4) are repeated as such.

As in the above, by tracing body potentials of the polysilicon TFTs and understanding operations of the latch-type sense amplifier circuit while giving consideration to the threshold voltages in that case, a relationship between the experimental results such that this latch-type sense amplifier circuit periodically malfunctions and measurement results of the threshold voltage of the polysilicon TFTs has been defined, this has clarified the reason for the wide unstable region as has been obtained by the latch-type sense amplifier evaluation.

As above, the inventor has ascertained through operation analysis, etc., of a latch-type sense amplifier that a hysteresis effect caused by a floating body had occurred in the polysilicon TFTs, and this had caused the problem in circuit operation.

As has been described so far, the inventor has ascertained that, similar to PD-SOI MOS transistors using single-crystal silicon, in polysilicon TFTs as well, the threshold voltages of MOS transistors are fluctuated by a bias given to the MOS transistors, and this exerts an influence (hysteresis effect) on the following circuit operation. And, as a result of an investigation on countermeasure against the same, he has again confronted with a problem.

In a PD-SOI MOS transistor using single-crystal silicon, in order to suppress floating body effects, employed is a method for fixing body potential by providing a body contact. However, it has been found that, in a case of polysilicon TFT, since resistance of the body is very high, a time constant which is calculated based on the resistance and capacitance of the body is great, therefore, a design to regulate and fix body potential within a time required for circuit operation is difficult. Namely, the inventor has concluded that, in a case of polysilicon TFTs, it is difficult to fix body potential even by providing a body contact.

For the reason that resistance of the body of a polysilicon TFT is very high, reference can be made to prior art 7 (Paper by Seto, Journal of Applied Physics, vol. 46, No. 12, December 1975), for example. In the body of a polysilicon TFT, a large number of traps exist at grain boundaries, and most of the positive holes and electrons are thereby trapped, therefore, carrier density is extremely small, and moreover, potential barriers that occur at the grain boundaries obstruct conduction. Therefore, resistance of the body is high.

As in the above description, the revealed problem is that an operation failure occurs owing to a hysteresis effect in a polysilicon TFT-integrated circuit.

SUMMARY OF THE INVENTION

It is an object of the present invention to provide a semiconductor device excellent in electrical characteristics by suppressing an operation failure owing to a hysteresis effect in a circuit for which MOS transistors with SOI structures, such as polysilicon TFTs have been integrated. Moreover, it is another object of the present invention to improve sensitivity of a latch-type sense amplifier circuit and a latch circuit including these TFT transistors as components. Moreover, it is still another object of the present invention to provide an electrooptically excellent display device using the same.

A semiconductor device according to a first aspect of the present invention comprises: a circuit composed of MOS transistors, for outputting a required signal in a first period; and a step waveform voltage applying section for giving, between the gate and source of predetermined MOS transistors in the circuit, a step waveform voltage not less than threshold voltages of the MOS transistors a predetermined number of times in a second period, when this is described by use of reference numerals in the attached drawings. Here, these reference numerals are used for ease in understanding the present invention, and as a matter of course, the present invention is not limited to an embodiment shown by these reference numerals.

Since the semiconductor device has the step waveform voltage applying section for giving a step waveform voltage a predetermined number of times, a step waveform voltage not less than threshold voltages is given, between the gate and source of predetermined MOS transistors in the circuit for outputting a signal in a first period, a predetermined number of times. Thereby, for the reason to be described in the following effects of the present invention, body potentials of the predetermined transistors are regulated in the second period, thus a hysteresis effect of the circuit is suppressed.

A semiconductor device according to a second aspect of the present invention comprises: when this is described by use of reference numerals in the attached drawings, a circuit composed of MOS transistors including, as channels, semiconductor layers having grain boundaries provided on insulating layers, for outputting a required signal in a first period; and a voltage applying section for giving, between the gate and source of predetermined MOS transistors in the circuit, a voltage not less than threshold voltages of the MOS transistors a predetermined number of times in a second period.

Since the semiconductor device has the voltage applying section for giving a voltage a predetermined number of times, a voltage not less than threshold voltages is given, between the gate and source of predetermined MOS transistors in the circuit for outputting a signal in a first period, a predetermined number of times. Thereby, for the reason to be described in the following effects of the invention, body potentials of the predetermined transistors are regulated in the second period, thus a hysteresis effect of the circuit is suppressed.

A method for driving a semiconductor device according to a third aspect of the present invention is, in a drive of a semiconductor device having a first circuit composed of MOS transistors, characterized by making the first circuit output a signal required in a circuit other than the first circuit in a first period, and giving, in a second period, between the gate and source of predetermined MOS transistors in the first circuit, a step waveform voltage not less than threshold voltages of the MOS transistors a predetermined number of times.

A step waveform voltage not less than threshold voltages of the MOS transistors is given a predetermined number of times in the second period, and in the first period, an output is obtained from a circuit composed of these MOS transistors. Thereby, for the reason to be described in the following effects of the present invention, body potentials of the predetermined transistors are regulated in the second period, and in the first period, an output from the first circuit for which a hysteresis effect has been suppressed is obtained.

A method for driving a semiconductor device according to a fourth aspect of the present invention is, in a drive of a semiconductor device having a first circuit composed of MOS transistors including, as channels, semiconductor layers having grain boundaries provided on insulating layers, characterized by making the first circuit output a signal required in a circuit other than the first circuit in a first period, and giving, in a second period, between the gate and source of predetermined MOS transistors in the first circuit, a voltage not less than threshold voltages of the MOS transistors a predetermined number of times.

A voltage not less than threshold voltages of the MOS transistors is given a predetermined number of times in the second period, and in the first period, an output is obtained from a circuit composed of these MOS transistors. Thereby, for the reason to be described in the following effects of the invention, body potentials of the predetermined transistors are regulated in the second period, and in the first period, an output from the first circuit for which a hysteresis effect has been suppressed is obtained.

A semiconductor device according to a fifth aspect of the present invention is characterized by having a body potential reset section for changing, by applying, between the gate and source of predetermined MOS transistors, a step waveform voltage not less than threshold voltages of the MOS transistors, body potentials of the MOS transistors to predetermined potentials.

By applying, between the gate and source of predetermined MOS transistors, a step waveform voltage not less than threshold voltages of the MOS transistors, for the reason to be described in the following effects of the present invention, body potentials of the MOS transistors are regulated. Since the semiconductor device has a body potential reset section for this function, a hysteresis effect of the predetermined MOS transistors is suppressed.

A semiconductor device according to a sixth aspect of the present invention is characterized by having a hysteresis suppressing section for suppressing hystereses of the MOS transistors, by applying, between the gate and source of predetermined MOS transistors, a voltage not less than threshold voltages of the MOS transistors.

By applying, between the gate and source of predetermined MOS transistors, a voltage not less than threshold voltages of the MOS transistors, for the reason to be described in the following effects of the invention, hystereses of the MOS transistors are suppressed. Since the semiconductor device has a hysteresis suppressing section for this function, a hysteresis effect of the predetermined MOS transistors is suppressed.

A semiconductor device according to a seventh aspect of the present invention is characterized by having a body potential reset section for changing, by applying, between the gate and source of predetermined MOS transistors, a voltage not less than threshold voltages of the MOS transistors, body potentials of the MOS transistors to predetermined potentials.

By applying, between the gate and source of predetermined MOS transistors, a voltage not less than threshold voltages of the MOS transistors, for the reason to be described in the following effects of the invention, body potentials of the MOS transistors are regulated. Since the semiconductor device has a body potential reset section for this function, a hysteresis effect of the predetermined MOS transistors is suppressed.

A semiconductor device according to an eighth aspect of the present invention is a semiconductor device having a detection circuit comprising, as components, MOS transistors including, as channels, semiconductor layers provided on insulating layers, for detecting greater and smaller voltages applied to gates of the MOS transistors to be paired, as a difference in conductance between the paired MOS transistors, and is characterized by comprising a step waveform voltage applying section for giving, between the gate and source of each of the paired MOS transistors of the detection circuit, a step waveform voltage not less than threshold voltages of the paired MOS transistors a predetermined number of times.

The semiconductor device has a step waveform voltage applying section, which gives a step waveform voltage not less than threshold voltages between the gate and source of each of the paired MOS transistors. Thereby, for the reason to be described in the following effects of the present invention, body potentials of the paired MOS transistors are regulated, thus a hysteresis effect of the detection circuit is suppressed.

A latch circuit according to a ninth aspect of the present invention is a latch circuit constructed by cross-linking first and second MOS transistors containing, as channels, semiconductor layers provided on insulating layers, and is characterized by comprising: a first step waveform voltage applying section for giving a step waveform voltage not less than a threshold voltage of the first MOS transistor between the gate and source of the first MOS transistor a predetermined number of times; and a second step waveform voltage applying section for giving a step waveform voltage not less than a threshold voltage of the second MOS transistor between the gate and source of the second MOS transistor a predetermined number of times.

The latch circuit is constructed by a so-called cross-link, in which sources of a first MOS transistor and a second MOS transistor are connected to each other, a gate of the MOS transistor is connected to a drain of the second MOS transistor, and a drain of the first MOS transistor is connected to a gate of the second MOS transistor.

In addition, the latch circuit has step waveform voltage applying section, which give, between the gate and source of each of the paired MOS transistors, step waveform voltages not less than threshold voltages a predetermined number of times. Thereby, for the reason to be described in the following effects of the present invention, body potentials of the paired MOS transistors are regulated, thus a hysteresis effect of the latch circuit is suppressed.

A latch circuit according to a tenth aspect of the present invention is a latch circuit constructed by cross-linking first and second MOS transistors, and is characterized by comprising a step waveform voltage applying section for giving a step waveform voltage not less than threshold voltages between the gate and source of the first and second MOS transistors a predetermined number of times.

The latch circuit is constructed by a so-called cross-link, in which sources of a first MOS transistor and a second MOS transistor are connected to each other, a gate of the MOS transistor is connected to a drain of the second MOS transistor, and a drain of the first MOS transistor is connected to a gate of the second MOS transistor.

In addition, the latch circuit has a step waveform voltage applying section, which gives, between the gate and source of each of the paired MOS transistors, a step waveform voltage not less than threshold voltages a predetermined number of times. Thereby, for the reason to be described in the following effects of the present invention, body potentials of the paired MOS transistors are regulated, thus a hysteresis effect of the latch circuit is suppressed.

A method for driving a latch circuit according to an eleventh aspect of the present invention is a method for driving a latch circuit constructed by cross-linking first and second MOS transistors, and is characterized in comprising the processes for: giving a step waveform voltage not less than a threshold voltage of the first MOS transistor between the gate and source of the first MOS transistor a predetermined number of times; giving a step waveform voltage not less than a threshold voltage of the second MOS transistor between the gate and source of the second MOS transistor a predetermined number of times; and carrying out, after these processes, a latching operation.

The method comprises a process for giving, between the gate and source of the first MOS transistor of the latch circuit, a step waveform voltage not less than a threshold voltage of the first MOS transistor a predetermined number of times and a process for giving, between the gate and source of the second MOS transistor, a step waveform voltage not less than a threshold voltage of the second MOS transistor a predetermined number of times, before carrying out an amplifying and latching operation in the latching circuit. Thereby, for the reason to be described in the following effects of the present invention, body potentials of the first MOS transistor and second MOS transistor are regulated, thus a hysteresis effect is suppressed in the subsequent step for carrying out a latching operation.

A method for driving a latch circuit according to a twelfth aspect of the present invention is a method for driving a latch circuit constructed by cross-linking first and second MOS transistors, and is characterized in comprising the processes for: giving a step waveform voltage not less than threshold voltages of the first and second MOS transistors between the gate and source of the first and second MOS transistors a predetermined number of times; and carrying out, thereafter, a latching operation.

The method comprises a process for giving, between the gate and source of the first and second MOS transistors, a step waveform voltage not less than threshold voltages a predetermined number of times, before carrying out an amplifying and latching operation in the latching circuit. Thereby, for the reason to be described in the following effects of the present invention, body potentials of the first MOS transistor and second MOS transistor are regulated, thus a hysteresis effect is suppressed in the subsequent process for carrying out an amplifying and latching operation.

A semiconductor device according to a thirteenth aspect of the present invention is a semiconductor device characterized by comprising: a first circuit composed of MOS transistors including, as channels, semiconductor layers having boundaries provided on insulating layers; a second circuit for using a signal generated by the first circuit in a first period and for not using a signal being generated by the first circuit in a second period; a transmission control section for enabling signal transmission between the first circuit and second circuit in the first period and disabling the same in the second period; and a step waveform voltage applying section for giving, between the gate and source of predetermined MOS transistor in the first circuit, a step waveform voltage not less than threshold voltages of the MOS transistors a predetermined number of times.

The semiconductor device has a step waveform voltage applying section for giving, between the gate and source of predetermined MOS transistor in the first circuit, a step waveform voltage not less than threshold voltages a predetermined number of times, and by operating the same in the second period, body potentials of the predetermined MOS transistors are regulated. In addition, in this second period, signal transmission between the first circuit and second circuit is disabled by the transmission control section.

In the first period, the first circuit and second circuit are enabled by the transmission control section to transmit a signal therebetween, whereby a signal generated by the first circuit is transmitted to the second MOS transistor. Alternatively, a signal is transmitted from the second circuit to the first circuit.

Thereby, nodes to which a noise that occurs as a result of operating the step waveform voltage applying section is applied can be minimized.

In addition, even when a high voltage is outputted from the second circuit, application of this high voltage to the first circuit is prevented, thus a hysteresis effect of the first circuit can be suppressed.

A semiconductor device according to a fourteenth aspect of the present invention is a semiconductor device including first and second MOS transistors including, as channels, semiconductor layers provided on insulating layers, and is characterized by having a circuit configuration wherein the first MOS transistor and a source of the second MOS transistor are connected, a gate of the first MOS transistor, a drain of the second MOS transistor, and a step waveform voltage applying circuit are connected via a first switch, a gate of the second MOS transistor, a drain of the first MOS transistor, and the step waveform voltage applying section are connected via a second switch, the gate and drain of the first MOS transistor are connected via a third switch, and the gate and drain of the second MOS transistor is connected via a fourth switch.

In the above circuit configuration, when the third and fourth switches are turned off (open) and the first and second switches are turned on (short-circuit), the first MOS transistor and source of the second MOS transistor are connected, and moreover, each other's gates and drains are cross-linked, and consequently, this circuit forms a latch circuit. Accordingly, an amplifying and latching operation becomes possible.

On the other hand, when all switches are brought into opposite conditions, for the first MOS transistor, the gate and drain are connected, and for the second MOS transistor as well, the gate and drain are connected. In this condition, it becomes possible to simultaneously regulate body potentials of the first and second MOS transistors by simultaneously applying step waveform voltages between the sources connected in common and drains of the first and second MOS transistors.

A sense amplifier circuit according to a fifteenth aspect of the present invention is a sense amplifier circuit for amplifying and latching greater and smaller potentials between two nodes, and the sense amplifier circuit is characterized by having a transmission control section having first and second latching circuits, for enabling or disabling signal transmission between at least one of the first and second latching circuits and either of the two nodes.

Having the transmission control section makes it possible to electrically connect and disconnect the first latch circuit and second latch circuit.

For example, by receiving a signal amplified and latched by the first latch circuit by the second latch circuit, and then electrically disconnecting the first and second latch circuits by use of the transmission control section, it becomes possible to amplify and latch a signal received by the second latch circuit in the second latch circuit and utilize the output signal, simultaneously with regulating body potentials by applying a step waveform voltage to MOS transistors of the first latch circuit.

A sense amplifier circuit according to a sixteenth aspect of the present invention has characteristic features of the present invention according to the fifteenth aspect of the present invention, and is further characterized in that an output voltage amplitude of the first circuit (first latch circuit) is smaller than that of the second circuit (second latch circuit).

Having the transmission control section makes it possible to electrically connect and disconnect the first latch circuit and second latch circuit.

And, a signal amplified and latched at a low amplitude by the first latch circuit is received by the second latch circuit, and then the first and second latch circuits are electrically disconnected by use of the transmission control section. Thereafter, by the second latch circuit, the signal is amplified to a desired amplitude and is latched.

Thereby, it becomes possible to keep a voltage applied to the first latch circuit low, thus a hysteresis effect that occurs in the first latch circuit can be reduced.

A semiconductor device according to a seventeenth aspect of the present invention is a semiconductor device having a first circuit and a second circuit composed of MOS transistors, and is characterized in that the first circuit is connected to the second circuit via a transmission control section for not applying a high voltage generated in the second circuit to the MOS transistors of the first circuit.

Having the transmission control section makes it possible to electrically connect and disconnect the first circuit and second circuit.

Thereby, application of a high voltage generated in the second circuit to the MOS transistors included in the first circuit can be prevented, thus a hysteresis effect that occurs in the first circuit can be reduced.

A sense amplifier circuit according to an eighteenth aspect of the present invention is characterized by comprising: a first circuit (first latch circuit) constructed by cross-linking first and second MOS transistors including, as channels, semiconductor layers provided on insulators; two nodes connected to the first latch circuit via a transmission control section for enabling signal transmission in a first period and disabling the same in a second period; a second latch circuit (second latch circuit) connected to the two nodes; and a step waveform voltage applying section for giving, between the gate and source of the first and second MOS transistors, a step waveform voltage not less than threshold voltages of the first and second MOS transistors a predetermined number of times in the second period.

Having the transmission control section makes it possible to electrically connect and disconnect the first latch circuit and second latch circuit.

And, by receiving a signal amplified and latched by the first latch circuit by the second latch circuit, and then electrically disconnecting the first and second latch circuits by use of the transmission control section, it becomes possible to carry out an amplifying and latching operation in the second latch circuit and utilize the signal, simultaneously with regulating body potentials by applying a step waveform voltage to the first and second MOS transistors of the first latch circuit by use of the step waveform voltage applying section.

In addition, a signal amplified and latched at a low amplitude by the first latch circuit is received by the second latch circuit, and then the first and second latch circuits are electrically disconnected by use of the transmission control section. Thereafter, by the second latch circuit, the signal is amplified to a desired amplitude and is latched. Thereby, it becomes possible to keep a voltage applied to the first latch circuit low, thus a hysteresis effect that occurs in the first latch circuit can be reduced.

A memory circuit according to a nineteenth aspect of the present invention is characterized by comprising: a transmission control section having a first circuit (first latch-type sense amplifier circuit) including first and second MOS transistors including, as channels, semiconductor layers provided on insulators and a second circuit (second latch-type sense amplifier circuit), for enabling signal transmission between the first latch-type sense amplifier circuit and a pair of bit lines in a first period and disabling the same in a second period; a precharge circuit connected to at least one of the bit lines; memory cells connected to at least one of the bit lines; and a step waveform voltage applying section for giving, in the second period, a step waveform voltage not less than threshold voltages of the first and second MOS transistors between the gate and source of the first and second MOS transistors in the first latched-type sense amplifier a predetermined number of times.

Having the transmission control section makes it possible to electrically connect and disconnect the first latch circuit and pair of bit lines.

A signal amplified and latched by the first latch circuit is written into the pair of bit lines, and then the first latch circuit is electrically disconnected from the pair of bit lines by use of the transmission control section. To the first and second MOS transistors of the first latch circuit, a step waveform voltage is applied by the step waveform voltage applying section, whereby body potentials are regulated. Simultaneously, at this time, the second latch circuit carries out an amplifying and latching operation upon receiving a voltage written into the bit lines, and refreshes the memory cells and outputs data by this amplified and latched signal. Accordingly, it is possible to simultaneously carry out a body potential regulating operation simultaneously with a memory cell refreshing operation for and a data outputting operation, whereby an operation cycle can be shortened.

In addition, the pair of bit lines are precharged at a low voltage by the precharge circuit, a signal amplified and latched at a low amplitude by the first latch circuit is written into the pair of bit lines, and then, the first latch circuit and pair of bit lines are electrically disconnected. Thereafter, the signal written into the bit lines is further amplified by the second latch circuit. Thereafter, the pair of bit lines is again precharged at a low voltage, and then the first latch circuit is electrically connected to the pair of bit lines by use of the transmission control section. Thereby, it becomes possible to keep a voltage applied to the first latch circuit low, thus a hysteresis effect that occurs in the first latch circuit can be reduced.

A differential amplification circuit according to a twentieth aspect of the present invention is, in a differential amplification circuit comprising, as components, MOS transistors including, as channels, a semiconductor layer provided on an insulating layer, for amplifying greater and smaller voltages applied to gates of the MOS transistors to be paired as a difference in conductance between the paired MOS transistors, characterized by comprising a step waveform voltage applying section for giving a step waveform voltage not less than threshold voltages of the paired MOS transistors between the gate and source of each of the paired MOS transistors a predetermined number of times.

Having the step waveform voltage applying section makes it possible to give the paired MOS transistors of the differential amplification circuit a step waveform voltage for which gate-source voltages thereof become threshold voltages or more.

Since this step waveform voltage is given to the MOS transistors prior to obtaining an output from the differential amplification circuit, body potentials of these MOS transistors are regulated, thus a hysteresis effect is suppressed.

A voltage follower circuit according to a twenty-first aspect of the present invention is a voltage follower circuit constructed, in a differential amplification circuit comprising MOS transistors including, as channels, semiconductor layers provided on insulating layers, for amplifying greater and smaller voltages applied to gates of the MOS transistors to be paired as a difference in conductance between the paired MOS transistors, by inputting an output from the differential amplification circuit into one of the gates of the paired MOS transistors, and is characterized by comprising a step waveform voltage applying section for giving a step waveform voltage not less than threshold voltages of the paired MOS transistors between the gate and source of each of the paired MOS transistors a predetermined number of times.

Having the step waveform voltage applying section makes it possible to give the paired MOS transistors of the differential amplification circuit a step waveform voltage for which gate-source voltages thereof become threshold voltages or more.

Since this step waveform voltage is given to the MOS transistors prior to obtaining an output from a voltage follower circuit constructed using the differential amplification circuit, body potentials of these MOS transistors are regulated, thus a hysteresis effect is suppressed.

A source follower circuit according to a twenty-second aspect of the present invention is a source follower circuit constructed including a first MOS transistor including, as a channel, a semiconductor layer provided on an insulating layer, and is characterized by comprising a step waveform voltage applying section for outputting a required signal in a first period and giving, in a second period, a step waveform voltage not less than a threshold voltage of the first MOS transistor between the gate and source of the first MOS transistor a predetermined number of times.

Having the step waveform voltage applying section makes it possible to give the MOS transistor of the source follower a step waveform voltage for which a gate-source voltage thereof becomes a threshold voltage or more.

Since this step waveform voltage is given to the MOS transistor prior to obtaining an output from this source follower, a body potential of this MOS transistor is regulated, thus a hysteresis effect is suppressed.

A semiconductor device according to a twenty-third aspect of the present invention is, in the semiconductor circuit as set forth the first, second, fifth, sixth, seventh, eighth, thirteenth, fourteenth, or seventeenth aspect of the present invention, characterized in that a display portion constructed by arranging pixels in a matrix form at intersections of a plurality of data lines with a plurality of scanning lines and a memory for storing data corresponding to information to be displayed on the display portion are formed on an identical substrate.

In the present invention, the memory and display portion have been formed on an identical substrate, and in the memory, data corresponding to information to be displayed on the display portion is stored. Thereby, a small-sized low-cost low-power-consumption high-image-quality display device can be obtained.

A display device according to a twenty-fourth aspect of the present invention is a display device having a display portion constructed by arranging pixels in a matrix form at intersections of a plurality of data lines with a plurality of scanning lines and a memory for storing data corresponding to information to be displayed on the display portion, formed on a substrate identical to that where the display portion has been formed, and is characterized in that the memory includes, as a component, any circuit as set forth in the ninth, tenth, fifteenth, sixteenth, eighteenth, or nineteenth aspect of the present invention.

The memory and display portion have been formed on an identical substrate, and in the memory, data corresponding to information to be displayed on the display portion is stored. This memory includes, as a component, any circuit as set forth in the ninth, tenth, fifteenth, sixteenth, eighteenth, or nineteenth aspect of the present invention. Thereby, a highly-integrated memory can be formed on the periphery of the display region, a small-sized low-cost display device can be obtained.

A display device according to a twenty-fifth aspect of the present invention is a display device having a display portion constructed by arranging pixels in a matrix form at intersections of a plurality of data lines with a plurality of scanning lines and a digital/analog conversion circuit for converting, upon receiving digital signal display data supplied from a higher-level device, the digital signal display data to analog voltage signals, and is characterized in that the digital/analog conversion circuit includes, as a component, either circuit of the twentieth, twenty-first or twenty-second aspect of the present invention.

The digital/analog conversion circuit and display portion have been formed on an identical substrate, and the digital/analog conversion circuit converts, upon receiving digital signal display data supplied from a higher-level device, the digital signal display data to analog signals, and writes the signals into data lines of the display portion. This digital/analog conversion circuit includes, as a component, either circuit of the twentieth, twenty-first or twenty-second aspect of the present invention. Since a hysteresis effect is suppressed for the circuit of the sixteenth or seventeenth aspect of the present invention, a small-sized low-cost high-image-quality display device can be obtained.

A personal digital assistant according to a twenty-sixth aspect of the present invention is loaded with any display device of the twenty-third, twenty-fourth, or twenty-fifth aspect of the present invention.

Thereby, a low-power-consumption small-sized personal digital assistant can be realized at a low cost.

A MOS transistor according to a twenty-seventh aspect of the present invention is a MOS transistor including, as a channel, a semiconductor layer having grain boundaries provided on an insulating layer, and is characterized in that a body contact is provided on the MOS transistor.

By applying a predetermined voltage to a body contact portion and thereby biasing a body and the body contact portion in a forward direction, an electric charge (positive holes in a case of an n-channel MOS transistor) accumulated in the body portion can be extracted. Thereby, a hysteresis effect can be suppressed to some extent. In a case of an n-channel transistor, further effects can be obtained by sufficiently lowering the voltage applied to the body contact.

A MOS transistor according to a twenty-eighth aspect of the invention is a MOS transistor including, as a channel, a semiconductor layer having grain boundaries provided on an insulating layer, and is characterized in that a back gate is provided on the MOS transistor.

By applying a predetermined voltage to a back gate portion and thereby expanding a depletion layer of the semiconductor layer so as to reduce a neutral region, accumulation of an electric charge that causes a hysteresis effect can be suppressed, whereby a hysteresis effect can be suppressed to some extent.

According to the present invention, since a step waveform voltage not less than the threshold voltage of a MOS transistor is given between the gate and source of the MOS transistor, body potential of the MOS transistor is regulated. And, since, thereafter, a circuit including this MOS transistor is caused to operate a desirable operation, a hysteresis effect is suppressed.

The reason for this is as follows. When a step waveform voltage not less than a threshold voltage is given to a MOS transistor, body potential rises owing to an electrostatic induction coupling via a capacitance between the gate and body, and then the body potential of the MOS transistor quickly converges toward a potential "potential in thermal equilibrium"+"ϕbi (built-in potential)," therefore, it becomes possible to reset the potential of the body. Thereby, it becomes possible to regulate the threshold voltage.

In addition, when a step waveform voltage not less than a threshold voltage is given, electrons are swiftly supplied onto the semiconductor surface from the source. Since the MOS transistor is on, even when a semiconductor layer is of a polycrystal, the electrons supplied from the source are also swiftly supplied to a place distant from the source junction in sufficient numbers. Some of the supplied electrons are captured by traps in the semiconductor layer. When the MOS transistor is turned off, the body potential is reset since the electrons that have been captured by the traps are recombined with positive holes of the body, thus effects of the present invention are obtained.

In addition, the depletion layer reaches the lower end of a silicon layer at a certain point when this operation is repeated, and the threshold voltage does not increase further than the same, thus it becomes possible to regulate the threshold voltage.

After executing these operations in a second period, a circuit composed of the MOS transistors is caused to operate in a first period so as to obtain an output, therefore, a hysteresis effect of this circuit composed of the MOS transistors is suppressed.

In addition, for a period where a step waveform voltage not less than a threshold voltage is given between the gate and source of a MOS transistor, in addition to that the source voltage is 0V, the drain voltage is also provided as 0V. Accordingly, no current flows between the drain and source even when the step waveform voltage is given between the gate and source to turn on the MOS transistor. Therefore, electricity resulting from the body potential resetting operation is small.

In addition, for a period where a step waveform voltage not less than a threshold voltage is given between the gate and source of a MOS transistor, in addition to that the source voltage is 0V, the drain voltage is also provided as 0V. Accordingly, electrons that are necessary to eliminate positive holes accumulated in the body are supplied from both the source and drain, thus potential of the body can be effectively lowered, and the body potential can be effectively reset.

As will be described in detail in the embodiments, since a body contact which has been necessary for suppressing a hysteresis effect in the conventional SOI technique is unnecessary, it is unnecessary to develop a new device or a new process. Therefore, the development cost is extremely low.

In addition, according to a latch circuit of the present invention, since body potentials of paired MOS transistors to carry out amplification are reset before amplifying a difference between greater and smaller voltages, a hysteresis effect is suppressed and a unstable region where a latching operation of the latch circuit becomes unstable is reduced.

In addition, nodes to which a step waveform voltage not less than a threshold voltage is applied and nodes to which a noise caused by the step waveform voltage are minimized by use of the transmission control section for controlling availability of signal transmission between the nodes, electricity at the resetting time is reduced.

In addition, according to the present invention, since cross-linking of the latch circuit is released in a period for resetting body potential by giving a step waveform voltage not less than a threshold voltage between the gate and source of a MOS transistor, it becomes possible to simultaneously reset two MOS transistors. Thereby, it becomes possible to shorten the time required for resetting body potential, and moreover, speedup of the circuit and system as a whole using this circuit can be realized.

In addition, by providing a second latch circuit composed of, for example, p-channel MOS transistors and a first latch circuit composed of, for example, n-channel MOS transistors and carrying out an amplifying and latching operation in the first latching operation prior to carrying out an amplifying and latching operation in the second latching operation, greater and smaller signal voltages are amplified to some extent, for example, to a value of a few volts. Accordingly, when an amplifying and latching circuit is carried out in the second latch circuit in succession hereto, a sufficient voltage difference has already been given between the nodes. Therefore, no malfunction occurs even when a step waveform voltage not less than threshold voltages is not given to the MOS transistors in the second circuit.

In addition, a latch-type sense amplifier of the present invention is composed of a first latch circuit "small-amplitude preamplifier portion" for amplifying greater and smaller signal voltages first and a second latch circuit "full-swing amplifier portion" for amplifying the same to a finally required voltage, and an output voltage of the first latch circuit "small-amplitude preamplifier portion" is set lower than a finally required output voltage.

And, by using a transmission control section for controlling availability of signal transmission between the nodes, the sense amplifier is driven in a manner that a high voltage amplified by the second latch circuit, that is, a finally required output voltage, is not applied to the first latch circuit "small-amplitude preamplifier portion." By these, a voltage to be applied to the MOS transistors of the first latch circuit is kept low, and as a result, a hysteresis effect is suppressed, and an unstable region is reduced.

In addition, during a period where the second latch circuit is carrying out an amplifying and latching operation, a step waveform voltage not less than threshold voltages is given to the MOS transistors of the first latch circuit that has been disconnected by the transmission control section. Namely, since an amplifying and latching operation of the second latching circuit and a body potential resetting operation of the first latching circuit are executed in parallel, an increase in the cycle time resulting from a resetting operation can be suppressed.

Sensitivity of the latch-type sense amplifier circuit is heightened as a result of a body potential resetting operation, thus it becomes possible to carry out a stable readout operation without malfunction even when an absolute value of a difference between the greater and smaller voltages is small. Accordingly, it becomes possible to increase the number of memory cells connected to the bit lines, which improves the memory capacity per unit area.

In addition, since a display device of the present invention has, in an LCD panel, a memory (equivalent to a so-called frame memory) for storing data corresponding to information, it is unnecessary to externally supply video data to display a still image. Therefore, it becomes possible to stop the circuit portion that has been driven for an external video data supply, whereby electricity can be reduced.

Even for a video image generally regarded as a moving image, there is often a frequency difference between a panel driving frequency (for example, 60 HZ, this means a drive where a signal is written into the pixels 60 times in one second) and a frame rate of video data (for example, 30 fps, this means that video data is updated 30 times in one second) as in the examples shown in the parentheses. This occurs when, for example, the processing speed of elements for generating video data is slow, and when the frame rate of video data is slow (for example, 10 fps or less), a moving image is displayed in a manner of a frame-by-frame advance.

In a case of the above numerical example (panel driving frequency is 60 Hz, and a video data frame rate is 30 fps), the panel substantially displays an identical image in two frames, which is considered to be a sort of still image. Namely, by providing the frame memory in the LCD panel, the band of video data that should be externally supplied can be reduced to half despite generally being a moving image.

In other words, although it has been necessary, when there is no frame memory in an LCD panel, to supply a signal equivalent to 60 Hz irrespective of a frame rate of video data, it is sufficient, in a case of the present embodiment, to supply a signal in accordance with a frame rate of video data, for example, at 30 Hz, whereby the band of data to be supplied to the panel can be reduced.

In addition, since a highly-sensitive sense amplifier and a DRAM with a small memory cell area were used, a memory having a capacity for one frame could be formed at a so-called frame part in the periphery of the display portion. Namely, in comparison with a construction mounted with a memory chip supplied as a separate chip, a frame memory could be obtained in a smaller space.

In addition, since a frame memory is designed and prepared simultaneously when a panel is designed and prepared, it is unnecessary to procure a memory chip, which has facilitated delivery date management. Stock of the members is also reduced, and inventory management also becomes unnecessary, which allows to supply products at a low price. In addition, mounting costs for module assembly could be reduced.

In addition, since a pixel arrangement of the display portion is identical to an arrangement of memory cells in the memory, a simple layout from the memory to the display portion realizes a small layout area.

In addition, according to a display device shown in the embodiments, the display device has been constructed so as to select data by the multiplexers, convert the same to analog signals by the DACs, and select data lines for writing by the demultiplexers, and also has been constricted so that the multiplexers and demultiplexers operate in pairs. In conventional construction, since the multiplexers and demultiplexers do not have a one-to-one correspondence, it has been necessary to wire signal lines from the multiplexers to the demultiplexers via the DACs while drawing around the same in the lateral direction. In the present invention, this drawing-around of wiring is unnecessary, therefore, a small layout area was required. Furthermore, since an optimal number of DACs could also be selected from the point of view of the circuit area, operating speed, and power consumption, a small-area low-power circuit and display device could be realized.

In order to maintain display quality, even for a still image, data is written into all pixels at a fixed cycle in the liquid crystal display device. This cycle is 16.6 ms, in general. The memory cells of a DRAM prepared in the present embodiment have been designed so that the retention time is longer than this cycle. Accordingly, all cells that store frame data are accessed at the fixed cycle, and the memory cell data is refreshed at this time, therefore, a circuit and an operation for refreshing that is usually necessary for a DRAM becomes unnecessary.

Since various circuits including a memory are built with a small area into a display device, by use of a display device of the present invention, a personal digital assistant can be reduced in size by use of the display device of the present invention.

In addition, in the present invention, an output voltage has been held by the latch circuit during a period where a step waveform voltage not less than not less than threshold voltages is being given, and this latch circuit is disconnected by the transmission control section from MOS transistors to which the step waveform voltage is given, therefore, the step waveform voltage never influences output.

Furthermore, in the present invention, since a step waveform voltage not less than threshold voltages in a period where the outputs have been latched and are being used in the next-stage circuit, an increase in the cycle time resulting from a reset operation can be suppressed.

Still furthermore, according to a differential amplification circuit of the present invention, since a step waveform voltage for which gate-source voltages become threshold voltages or more is given to two MOS transistors of a differential pair, body potentials of these MOS transistors are reset. Thereby, an offset of the differential amplification circuit that has been caused by operation histories is reduced.

Still furthermore, since this differential amplification circuit is used to provide a voltage follower, input/output characteristics are improved.

In addition, image quality of a display device provided by application of the present voltage follower circuit to an output stage of a DAC circuit has been improved.

In addition, according to a source follower circuit of the present invention, a step waveform voltage higher than threshold voltages is given between the gate and source of MOS transistors, body potentials are reset. Thereby, fluctuation in input/output characteristics of the source follower circuit that has been caused by operation histories can be suppressed.

In addition, since the source follower circuit has a transmission control section for turning off a path between the power supply and ground when giving a step waveform voltage not less than threshold voltages, an increase in consumption current can be suppressed.

In addition, as a result of application of the present source follower circuit to an output stage of a DAC circuit, image quality of the display portion has been improved.

In addition, as a result of application of the present source follower circuit to an output stage of a DAC circuit, image quality of the display portion has been improved.

BRIEF DESCRIPTION OF THE DRAWINGS

FIGS. 9A and 9B are timing charts showing voltages applied to the MOS transistors N1 and N2 composing the latch-type sense amplifier shown in FIG. 5, wherein FIG. 9A shows a voltage of the transistor N1, and FIG. 9B shows a voltage of the transistor N2;

FIGS. 13A and 13B show timing charts and device sectional views showing estimated reasons that threshold voltage of a MOS transistor dynamically fluctuates as a result of giving a pulse voltage, wherein FIG. 13A is a case where the body potential declines, and FIG. 13B shows a case where the body potential rises;

FIGS. 20A and FIG. 20B show a MOS transistor model and body potentials when a reset pulse is applied, wherein FIG. 20A is a model of an enhancement-mode PD (Partially depleted) MOS transistor having a floating body, and FIG. 20B is a diagram showing time changes of body potentials VBS of two MOS transistors and the time change of a voltage VGS applied between the gate and source;

FIG. 21A and FIG. 21B show body-source band diagrams in cases where the body and source have been biased in a forward direction in an n-channel MOS transistor, wherein FIG. 21A is a case where the body is a single crystal, and FIG. 21B is a case where the body is a polycrystal;

FIGS. 23A and 23B show band diagrams in a body direction (vertical direction) from a gate (G) of a MOS transistor, wherein FIG. 23A is a case where a voltage not less than the threshold voltage is applied to VGS in a MOS transistor, and FIG. 23B is a case where a MOS transistor is off.

FIGS. 28A and 28B show circuit diagrams of a latch-type sense amplifier of a third embodiment of the present invention, wherein FIG. 28A is a latch-type sense amplifier circuit diagram, and FIG. 28B is a clocked inverter circuit diagram.

THE PREFERRED EMBODIMENTS OF THE PRESENT INVENTION

Figure 1:
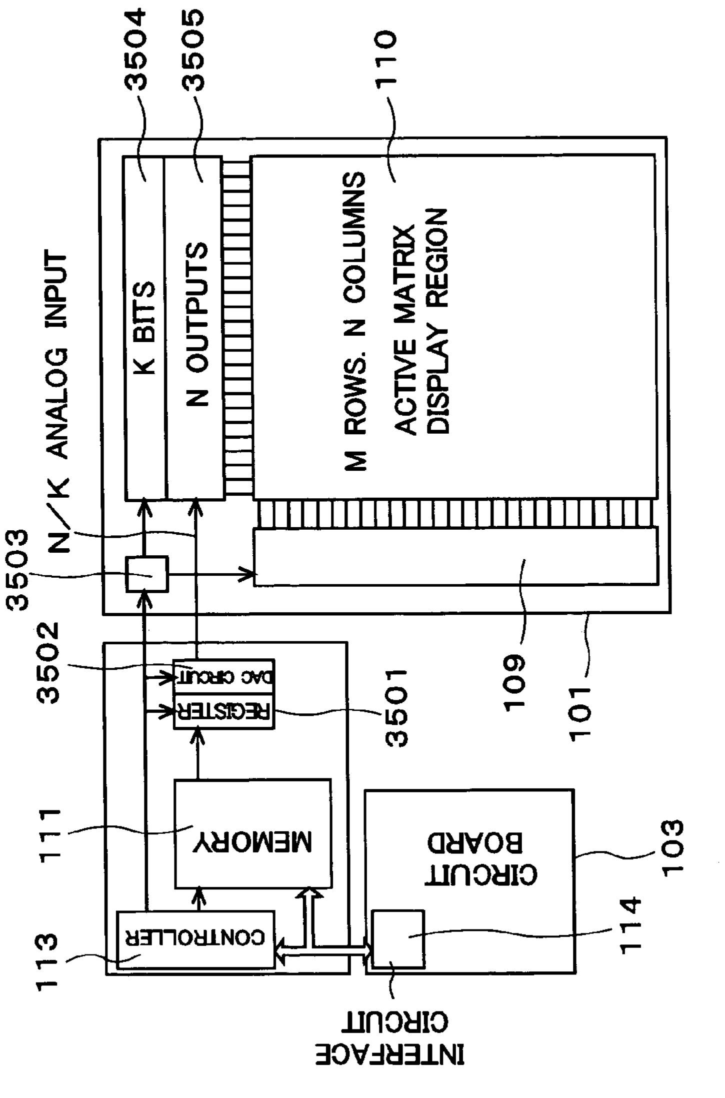
FIG. 1 (PRIOR ART)
FIG. 1 is a block diagram showing a configuration of a display system using a conventional liquid crystal display device integrated with a drive circuit.
Figure 2:
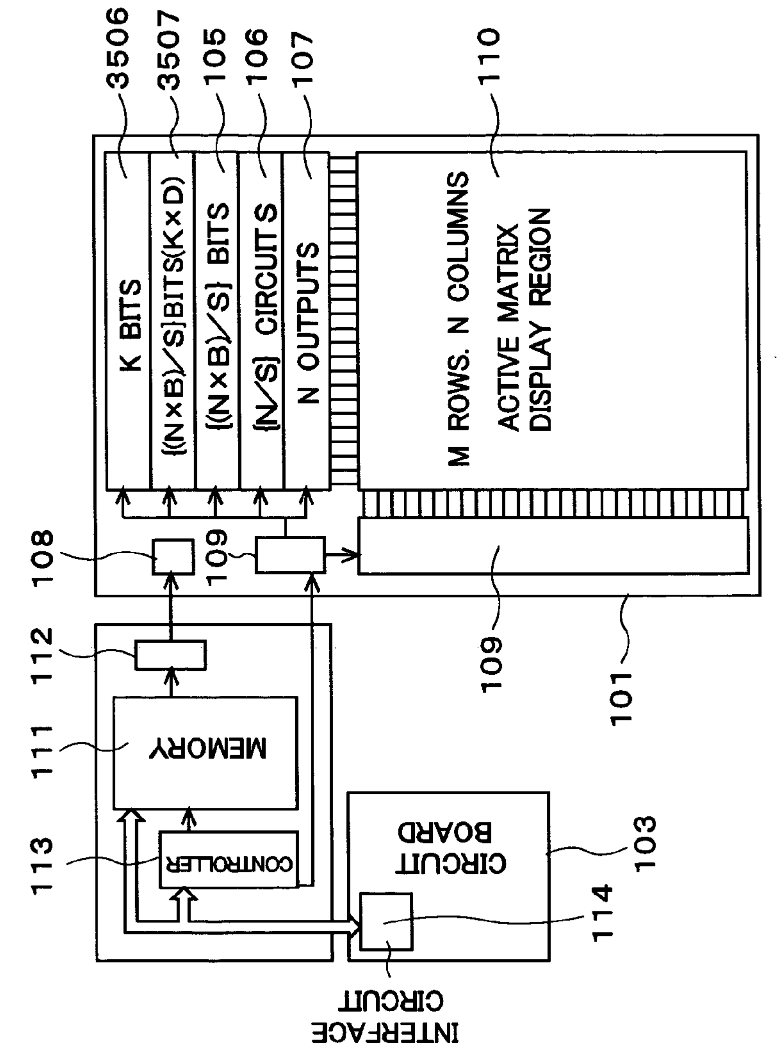
FIG. 2 (PRIOR ART)
FIG. 2 is a block diagram showing a configuration of a display system using a conventional liquid crystal display device with a built-in DAC circuit.
Figure 3:
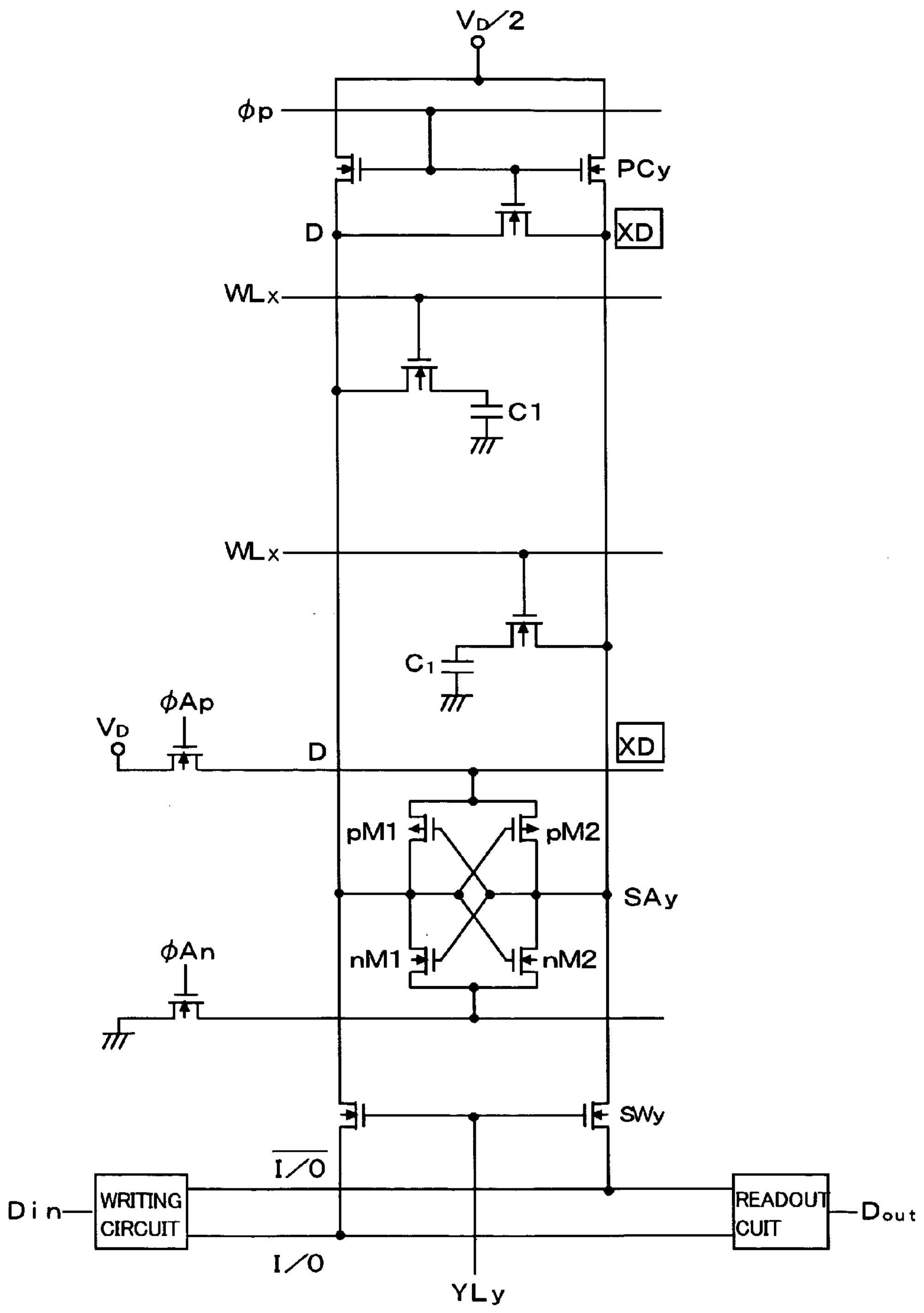
FIG. 3 (PRIOR ART)
FIG. 3 is a circuit configuration diagram of a DRAM constructed using a conventional bulk MOS transistor.
Figure 4:
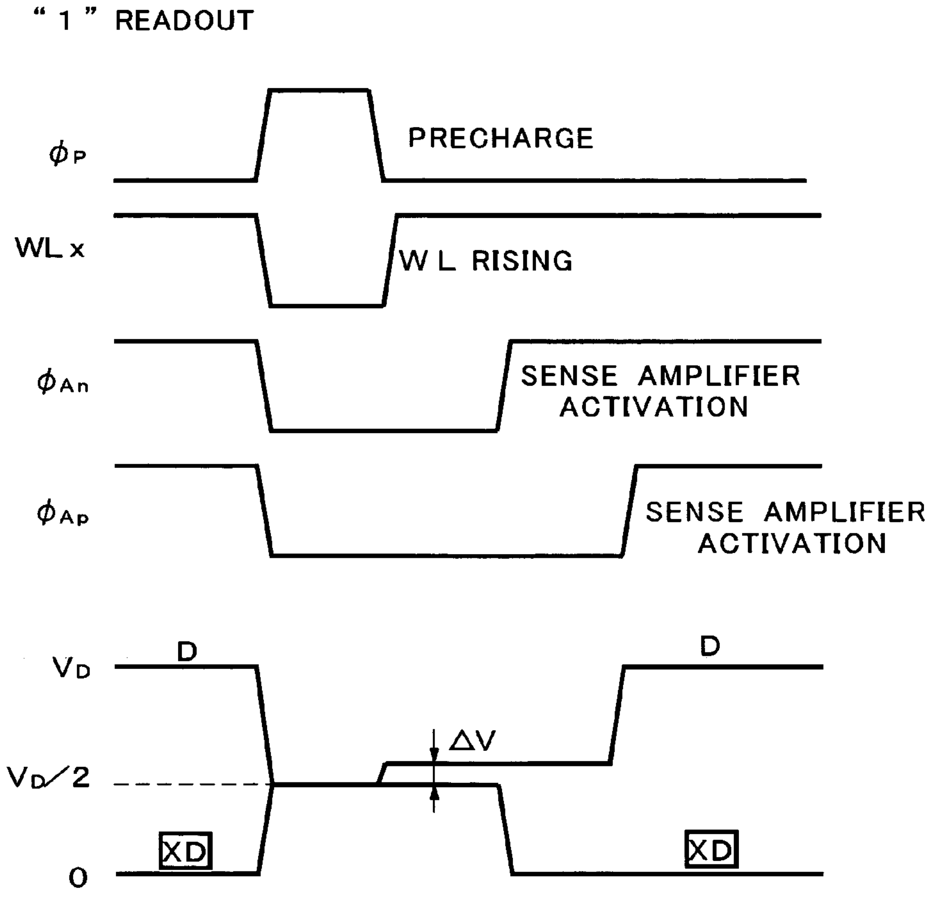
FIG. 4 (PRIOR ART)
FIG. 4 is a signal waveform diagram in a "1" readout operation of the DRAM shown in FIG. 3.
Figure 5:
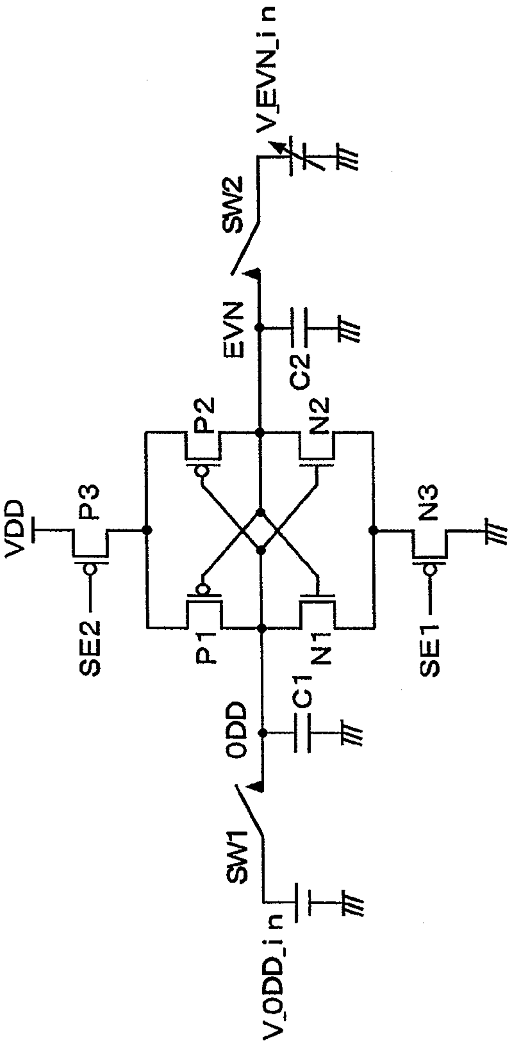
FIG. 5 is a circuit diagram of a latch-type sense amplifier evaluation circuit.

Next, embodiments of the present invention will be described in detail with reference to the accompanying drawings. Here, some of the embodiments of the present invention to be shown in the following are characterized by "giving a step waveform voltage (5003) between the gate and source of predetermined one or a plurality of the MOS transistors (4901)." In a case of a plurality of MOS transistors (4901), for convenience of a definite distinction between the individual MOS transistors, reference numerals thereof are shown by (4901*a* and 4901*b*) with lower case letters. Similarly, when it is necessary for a distinction between step waveform voltages (5003), reference numerals thereof are shown by (5003*a* and 5003*b*) with lower case letters. Moreover, a step waveform voltage applying section (4904) may include a hysteresis suppressing section (5904), a pulse voltage generator Vrst1 (4904*a*), a pulse voltage generator Vrst2 (4904*b*), a clocked inverter or clocked inverters (5904*a*, 5904*b*), a clocked inverter circuit, a variable voltage source Vrst (6904), or a reset operation control section (7904). A transmission control section (4905), including a latch circuit, switch, or switches may be illustrated by (4905*a* and 4905*b*). On the other hand, the step waveform voltages (5003, 5003*a*, 5003*b* and the like) are referred to as reset pulses or body potential reset pulses.

The step waveform voltage applying section 4904, which may include a pulse voltage generator Vrst1 (4904*a*) and/or a pulse voltage generator Vrst2 (4904*b*), is described as a hysteresis suppressing section or a voltage applying section in some parts of the application. The reason for this is because similar effects, that is, effects to suppress a hysteresis effect, can be obtained even by a voltage not having a step waveform, for example, a voltage having an exponential waveform, a sinusoidal waveform, or a pulse waveform.

Similarly, the step waveform voltage (5003, 5003*a*, or 5003*b*) is described as a voltage not less than threshold voltages of MOS transistors in some parts.

First Embodiment

Figure 11:
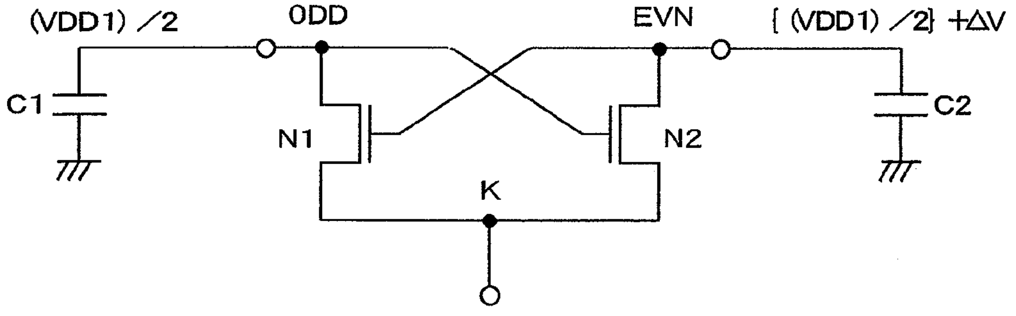
FIG. 11 is a circuit diagram of a latch-type sense amplifier composed of n-channel MOS transistors.
Figure 16:
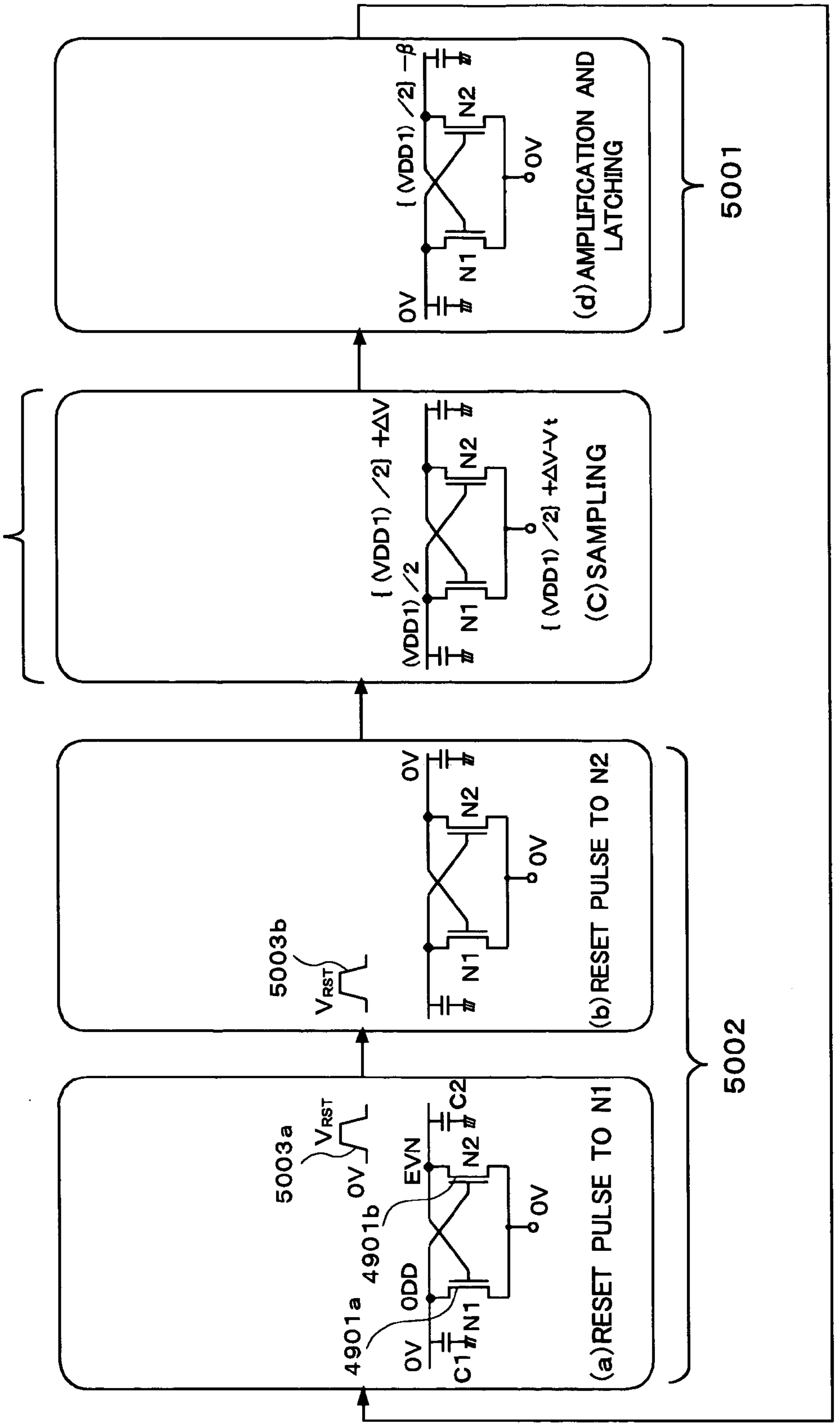
FIG. 16 is a flowchart showing a method for driving a latch circuit of a first embodiment of the present invention.

FIG. 16 is a flowchart showing a method for driving a latch circuit according to first embodiment of the present invention. A latch circuit used for explaining this driving method is identical to the latch-type sense amplifier circuit composed of n-channel MOS transistors shown in FIG. 11. Namely, the present latch circuit comprises a polysilicon TFT N1 (4901*a*) and a polysilicon TFT N2 (4901*b*) whose sources are connected in common. A gate of the TFT N1 is connected to a drain of the transistor N2, and is further connected to a capacitance C2. A gate of the TFT N2 is connected to a drain of the transistor N1, and is further connected to a capacitance C1.

The latch circuit is driven while outputting a signal required in an unillustrated circuit other than the latch circuit by using electrical characteristics of the MOS transistors (4901*a* and 4901*b*) in a first period (effective period) (5001), and giving, in a second period (idle period) (5002), reset pulses (5003*a* and 5003*b*) not less than a threshold voltage of the MOS transistors between the gate and source of the MOS transistors (4901*a* and 4901*b*) a predetermined number of times.

Next, the driving method will be described in detail with reference to FIG. 16. The driving method of the present invention is characterized by giving reset pulses to reset body potential to the TFTs N1 and N2 before carrying out an amplifying and latching operation.

First, as shown in (a) of FIG. 16, while giving 0V to the source of the transistors N1 and N2 and 0V to a node ODD, a pulse (5003*a*) higher in voltage than the threshold voltage of the TFT N1 is given to a node EVN.

Next, as shown in (b) of FIG. 16, while giving 0V to the source of the transistors N1 and N2, and 0V, to the node EVN, a pulse (5003*b*) higher in voltage than the threshold voltage of the TFT N2 is given to the node ODD.

Next, as shown in (c) of FIG. 16, a potential difference ΔV is given to the nodes EVN and ODD (period 5401), and this is held by the capacitances C1 and C2. Namely, this is sampled in the capacitances, and the nodes EVN and ODD are brought into a floating state. Moreover, in this case, the common source between the transistors N1 and N2 is brought into a floating state or is supplied with a voltage high enough but not to an extent to turn on the transistors N1 and N2. In this example, since the common source between the transistors N1 and N2 is brought into a floating state and the threshold voltage of the transistors N1 and N2 is provided as Vt, voltage of the common source between the transistors N1 and N2 is illustrated as $\{(VDD1)/2\}+\Delta V-Vt$ (where ΔV is positive).

Figure 6:
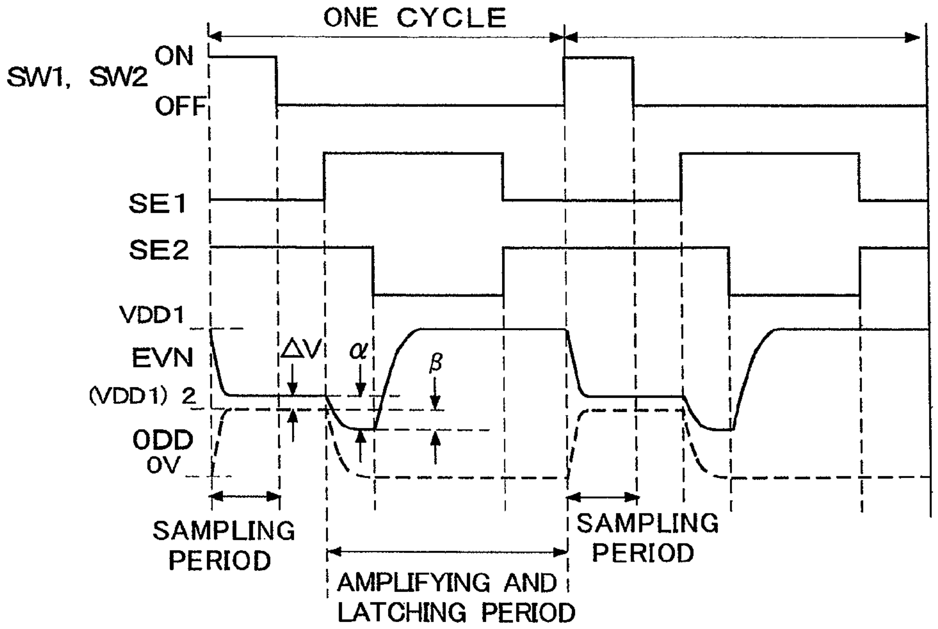
FIG. 6 is a diagram showing input waveforms to drive the latch-type sense amplifier evaluation circuit shown in FIG. 5 and waveform examples actually measured at a node EVN and a node ODD.

Next, as shown in (d) of FIG. 16, by lowering the common source between the N1 and N2 to 0V, the potential difference given in (c) of FIG. 16 is amplified by a difference in conductance between the TFTs N1 and N2, and is latched in a condition where the node to which a lower potential had been provided in (c) of FIG. 16 has been lowered to 0V, while the higher node potential has been scarcely lowered, at $\{(VDD1)/2-\beta\}$. β denotes a difference between the VDD1/2 and a voltage at which the higher-voltage node is stabilized, which has been described in FIG. 6.

Then, when an amplifying and latching operation are to be carried out in succession hereto, the same operations are repeated in (a) of FIG. 16 again.

By giving, before carrying out an amplifying and latching operation, the gate electrodes of the TFTs N1 and N2 pulses (which are referred to as body potential reset pulses) to make VGS of these exceed the threshold voltage, unevenness in characteristics between the TFTs N1 and N2 that has occurred owing to operation histories can be corrected. And, consequently, it becomes possible to amplify ΔV without a malfunction even when ΔV given to the latch circuit is small, which allows a normal latching operation.

Hereinafter, effects of the present embodiment will be described based on experimental results.

Figure 17:
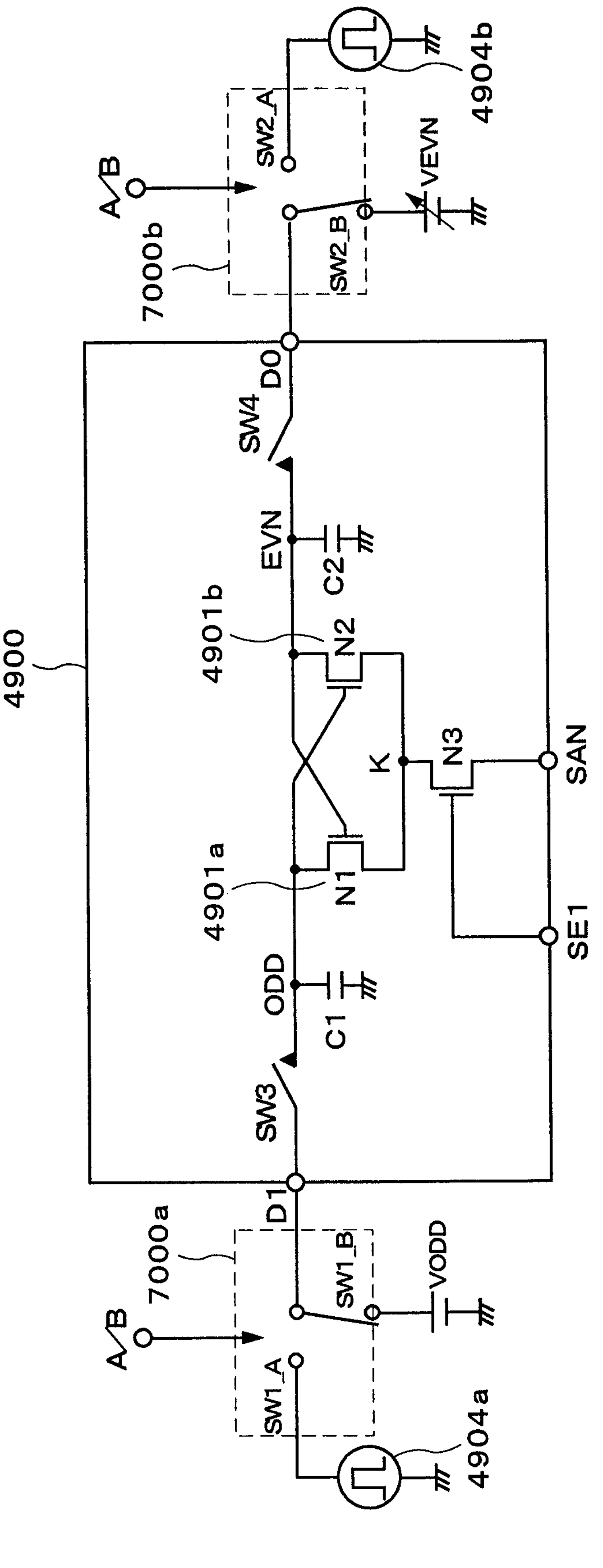
FIG. 17 is a circuit diagram of the first embodiment of the present invention.

FIG. 17 is a circuit diagram showing an evaluation circuit to evaluate a latch-type sense amplifier. The circuit block illustrated at the center is a latch circuit 4900 composed of polysilicon TFTs on a glass substrate, which is a circuit also used for a sense amplifier of a memory circuit. Transistors N1 and N2 of this latch circuit 4900 are n-channel polysilicon TFTs, and a transistor N3 is an n-channel polysilicon TFT to turn on and off a section between the source of the transistors N1 and N2 and a SAN node. The SAN node is connected to a ground (0V). The node ODD and node EVN are, in a memory circuit, equivalent to nodes to which a bit line pair is connected, and capacitances C1 and C2 are connected in place of bit line capacitances. To the node EVN, a selector switch (7000*b*) is connected via a switch (SW4).

This selector switch is controlled by a control signal “A/B,” wherein a node D0 and SW2_A have continuity where “A” is at a high level, and the node D0 and a variable voltage supply VEVN have continuity where “A” is at a low level. To SW2_A, a signal from a pulse voltage generator Vrst2 (4904*b*) is applied.

To the node ODD, a selector switch (7000*a*) is connected via a switch (SW3). This selector switch is controlled by a control signal “A/B,” wherein a node D1 and SW1_A have continuity where “A” is at a high level, and the node D1 and a fixed voltage supply VODD have continuity where “A” is at a low level. To SW1_A, a signal from a pulse voltage generator Vrst1 (4904*a*) is applied.

The variable voltage supply VEVN, fixed voltage source VODD, and switches (SW3 and SW4) are provided for giving ΔV that is originally read out from a memory cell to the latch-type sense amplifier circuit.

Figure 18:
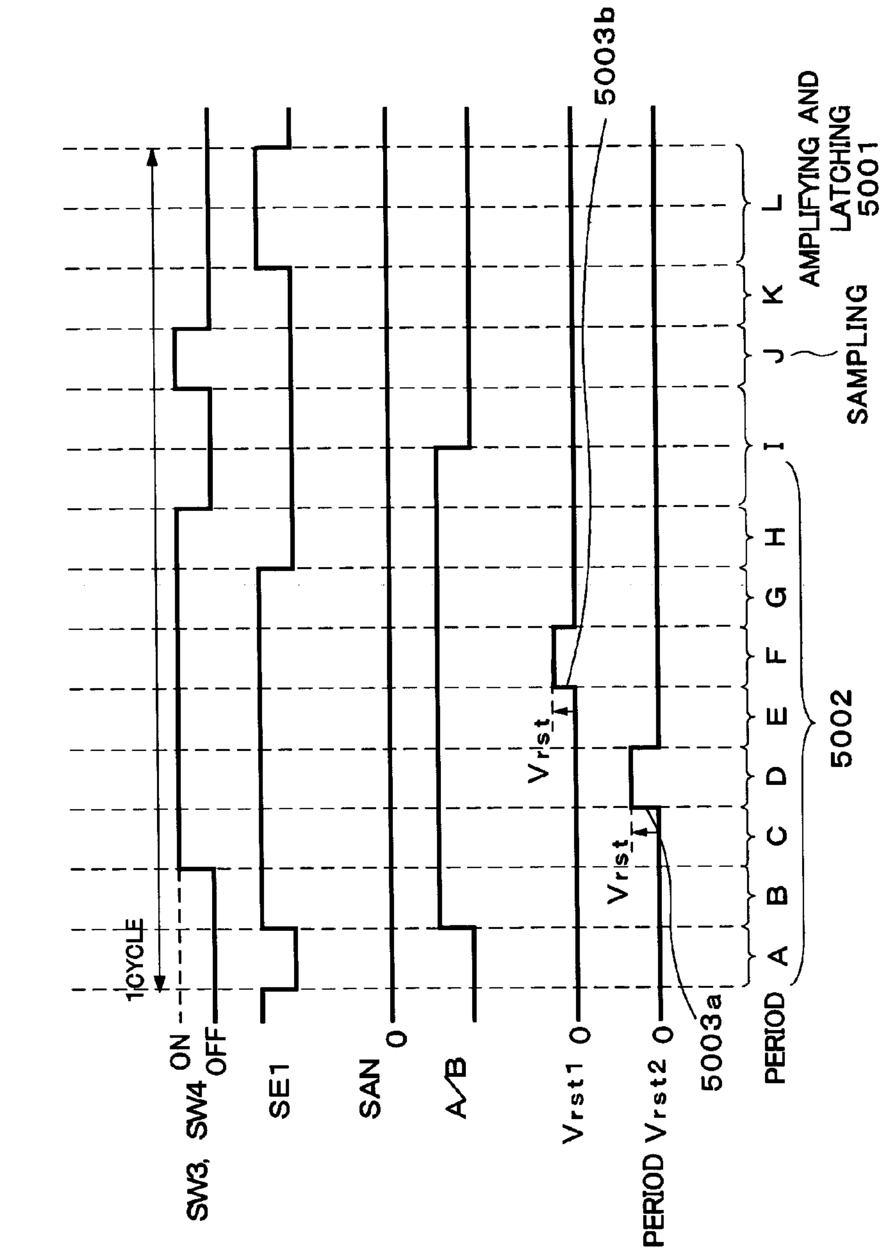
FIG. 18 is a timing chart showing a driving method of first embodiment of the present invention.

Next, a method for driving this latch-type sense amplifier circuit will be described with reference to FIG. 18.

(Period C) With the switches (SW3 and SW4) on, SE1 high in level, A/B high in level, and D0 and D1 are connected with the pulse voltage generators (Vrst2 and Vrst1). At this time, Vrst1 and Vrst2 are both provided as 0V. Namely, 0V is given to the source of the transistors N1 and N2, and 0V is given to the nodes EVN and ODD as well.

(Period D) A pulse with a pulse voltage value of Vrst is outputted from Vrst2. Thereby, a pulse with a pulse voltage value of Vrst is applied between the gate and source of the transistor N1.

(Period F) A pulse with a pulse voltage value of Vrst is outputted from Vrst1. Thereby, a pulse with a pulse voltage value of Vrst is applied between the gate and source of the transistor N2.

(Period J) With the switches (SW3 and SW4) on, SE1 low, and A/B low in level, D0 is connected with VEVN, and D1 is connected with VODD. VODD is provided as (VDD1)/2 and VEVN is provided as (VDD1)/2+ΔV, whereby a potential difference of ΔV is given to the sense amplifier. Thereafter, by turning off the switches (SW3 and SW4), these voltages are sampled in C2 and C1, respectively.

(Period L) With the switches (SW3 and SW4) off and SE1 high, the source potential of the N1 and N2 is lowered to 0V, whereby causing the circuit to carry out an amplifying and latching operation.

Then, operations are repeated in Period C again.

Monitoring the voltages of the node ODD and node EVN allows to find out at what voltage or more of the sense amplifier circuit sensitivity, that is, the absolute value of ΔV, the output is stabilized.

Here, a period (first period) where the present latch-type sense amplifier issues an effective output is Period L (5001). And, pulses are given to the transistors N1 and N2 in a part (second period) (5002) of the other periods by use of pulse generators (Vrst2 and Vrst1).

Next, a positive value of ΔV and a negative value of ΔV necessary at a minimum for stable output were measured by use of the pulse voltage value Vrst as a parameter.

Figure 7:
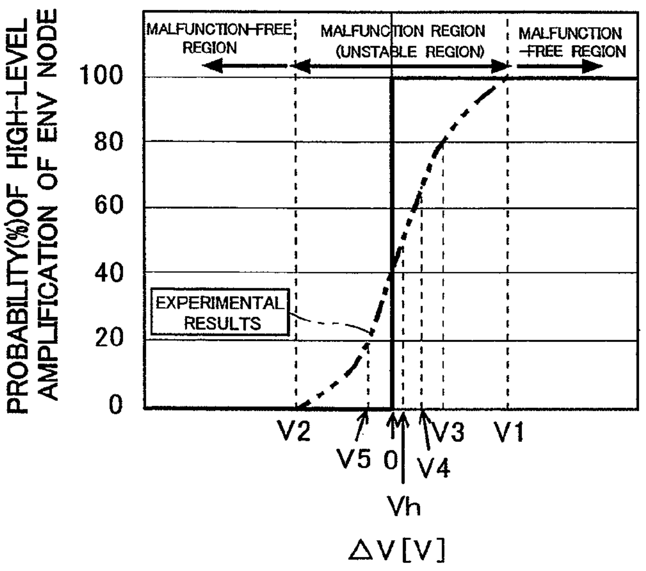
FIG. 7 is a graph showing an actually measured potential difference ΔV to be inputted into a latch-type sense amplifier and a probability of high-level amplification of a node EVN.
Figure 8:
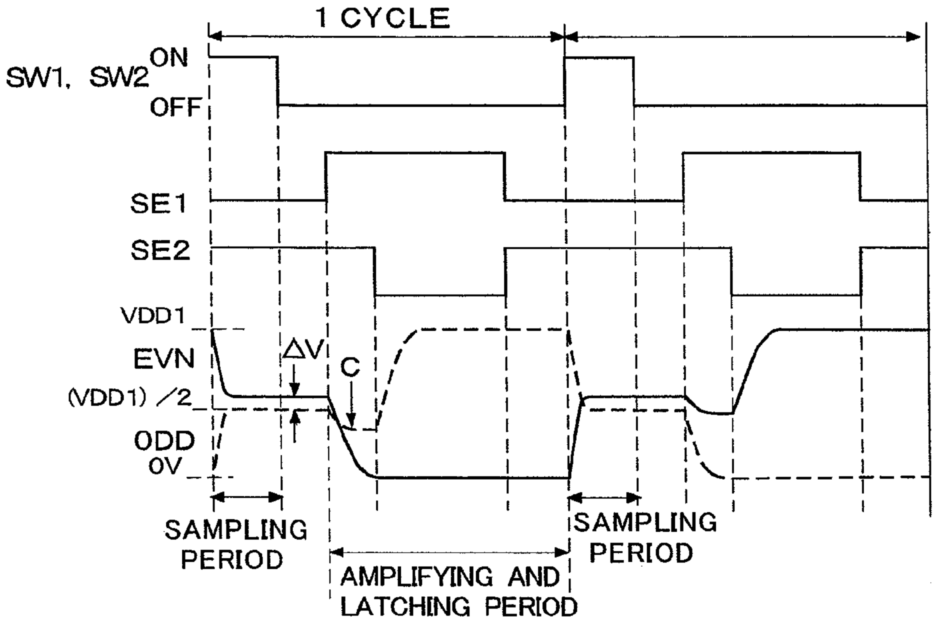
FIG. 8 is a waveform diagram of input waveforms for driving the latch-type sense amplifier evaluation circuit shown in FIG. 5 and waveforms actually measured at a node EVN and a node ODD when a malfunction occurred.
Figure 9A:
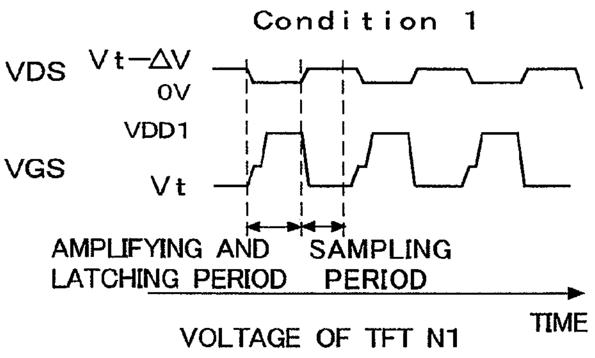
Figure 9B:
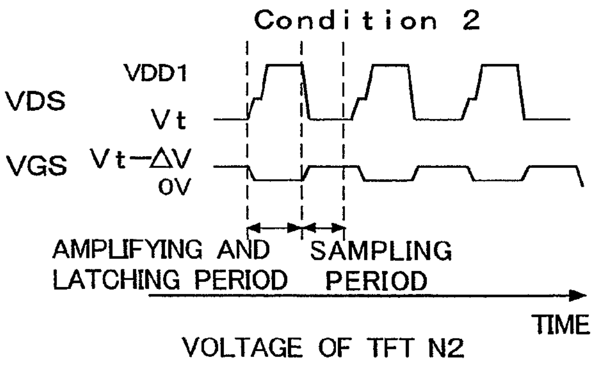
Figure 19:
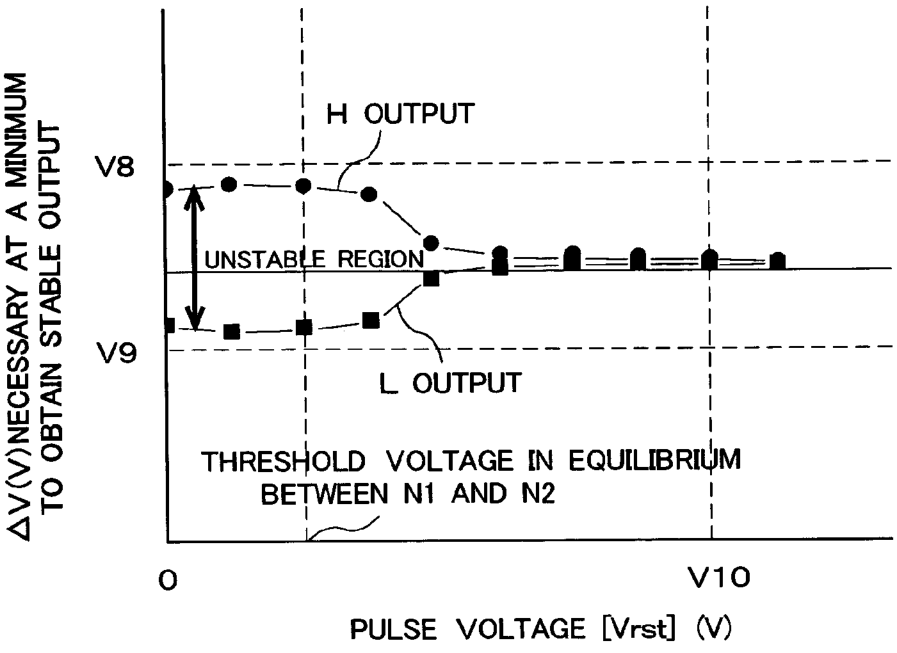
FIG. 19 is a graph of actual measurement values showing a relationship between a pulse voltage (Vrst) obtained in first embodiment of the present invention and ΔV necessary at a minimum to obtain a stable output.

Results of this measurement are shown in FIG. 19. Data "H output" shows a minimum value of ΔV necessary for stabilizing operation and continuously performing operation such that the node EVN maintains a high potential and the node ODD is lowered to 0V. This voltage corresponds to V1 shown in FIG. 7. In addition, data "L output" shows a maximum value of ΔV necessary for stabilizing operation and continuously performing operation such that the node ODD maintains a high potential and the node EVN is lowered to 0V, and this voltage corresponds to V2 shown in FIG. 7.

Accordingly, in the graph of FIG. 19, when ΔV which is present in a region smaller than the data "H output" and greater than the data "L output" is given to a latch circuit, this latch circuit does not stably operate. Namely, this region is a region where whether a latch circuit output (for example, a voltage of the node EVN) becomes 0V or a high potential is unstable, which is described as "unstable region" in the graph. It is obvious that the narrower this unstable region, the more excellent the latch circuit or latch-type sense amplifier is.

As shown by this result, although the unstable region is large when the body potential reset pulse voltage is low, there is a tendency that the unstable region becomes smaller in proportion to a rise in the body potential reset pulse voltage. In particular, when the body potential reset pulse voltage is raised above the threshold voltage in equilibrium between the transistors N1 and N2, an effect to reduce the unstable region is provided.

Figure 12:
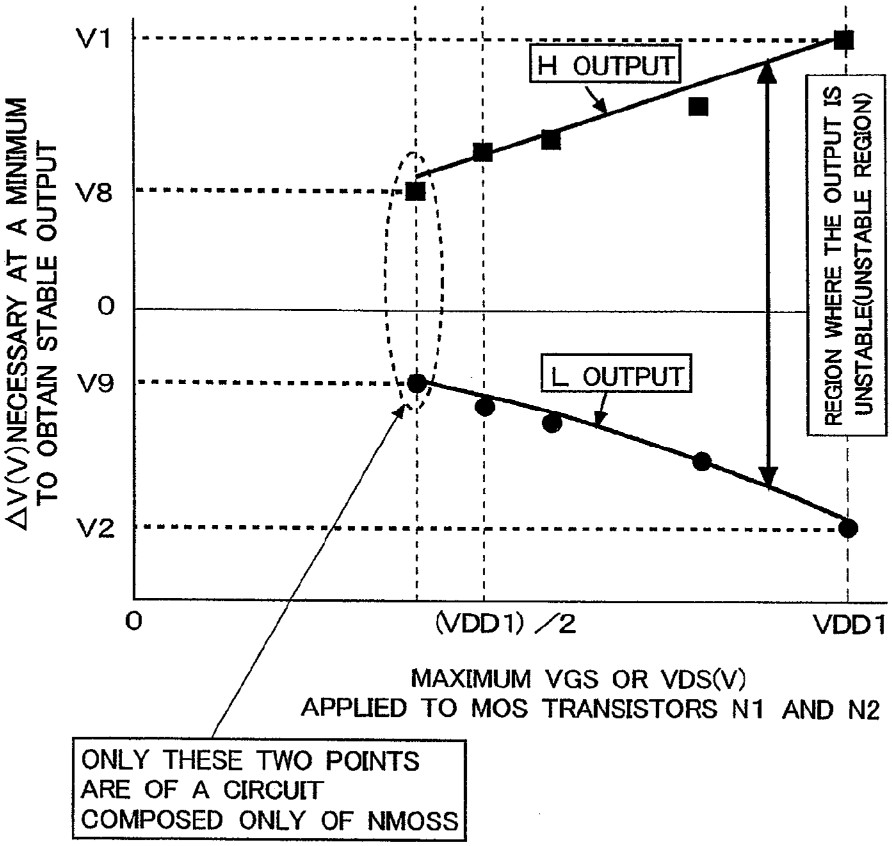
FIG. 12 is a graph showing actual measurement values of a relationship between a supply voltage of a latch-type sense amplifier circuit and ΔV necessary for obtaining a stable output.

Here, an unstable region when a conventionally known normal driving method is applied to the present latch circuit is, as already shown in FIG. 12, V9<ΔV<V8, which is large to the same extent as that when the body potential reset pulse voltage is 0.

On the other hand, in the graph of FIG. 19, the width of the unstable region when, for example, the reset pulse is V10 becomes 1/22 or less relative to (V8-V9) in the case of the conventional driving method, wherein a substantial reduction can be recognized. Thereby, effects of the present invention are confirmed.

Namely, by giving reset pulses (5003*a* and 5003*b*) not less than the threshold voltage of the MOS transistors between the gate and source of the MOS transistors (4901*a* and 4901*b*) a predetermined number of times for driving, the unstable region of the latch circuit is reduced.

Also, in a case of this driving method, for the period where body potential reset pulses are given to the gates of the MOS transistors N1 and N2, in addition to that the source potential is 0V, the drain voltage is also provided as 0V. Accordingly, no current flows between the drain and source even when the body potential reset pulse is given to the gate to turn on the MOS transistor. Therefore, there is also an effect such that electricity resulting from the body potential resetting operation is small.

Also, in a case of this driving method, for the period where pulses are given to the gates, in addition to that the source potential is 0V, the drain voltage is also provided as 0V. Accordingly, electrons that are necessary to eliminate positive holes accumulated in the body can be easily supplied from both the source and drain, thus potential of the body can be effectively lowered.

In the present invention, even without using a body contact that has conventionally been necessary, the body potential can be stabilized to improve a negative influence as a result of the hysteresis effect. Namely, since no body contact is necessary, it is unnecessary to develop a new device or a new process. Therefore, there is also an effect such that the development cost is extremely low. Here, the present invention is effective in a circuit using a body contact as well, wherein satisfactory results can be obtained.

As mentioned above, the inventor has discovered that the reason that the width of an unstable region is wide when the latch circuit or latch-type sense amplifier circuit is driven by the conventional driving method is because characteristics of the MOS transistors N1 and N2 to amplify ΔV are changed according to hystereses before the amplifying operation. And, this is caused by the fact that the MOS transistors N1 and N2 are of structures having floating bodies.

Therefore, it is considered sufficient to reset body potentials of the MOS transistors N1 and N2, before amplifying ΔV, so as not to exert an influence of hystereses on the MOS transistors N1 and N2 to amplify ΔV. Namely, by resetting body potentials of the MOS transistors N1 and N2, before amplifying ΔV, so as not to exert hysteresis influence on the MOS transistors N1 and N2 to amplify ΔV, effects of the present invention can be obtained.

Next, a method for resetting the body potential will be described. FIG. 20A shows a model of an enhancement-mode PD (Partially depleted) MOS transistor having a floating body. Herein, description will be given of an n-channel MOS transistor, for example. In a case of the n-channel MOS transistor, the source and drain are formed of an n-type semiconductor ($N^+$) doped with a high-density donor impurity, while a semiconductor at a part where a channel is formed is formed of a p-type semiconductor ($P^-$). And, as shown in FIG. 20A, when 0V is applied to the gate (G), drain (D), and source (S), a part of the p-type transistor ($P^-$) is depleted to form a depletion layer, and the remaining region becomes a body ($P^-$ neutral region).

The body and source and the body and drain form pn-junctions. In this FIG. 20A, the pn-junctions are shown as diodes.

In addition, a capacitance CGB between the gate and body is shown. However, a capacitance between the body and source and a capacitance between the body and drain, etc., are not illustrated since there are not used in the following description.

Figure 20B:
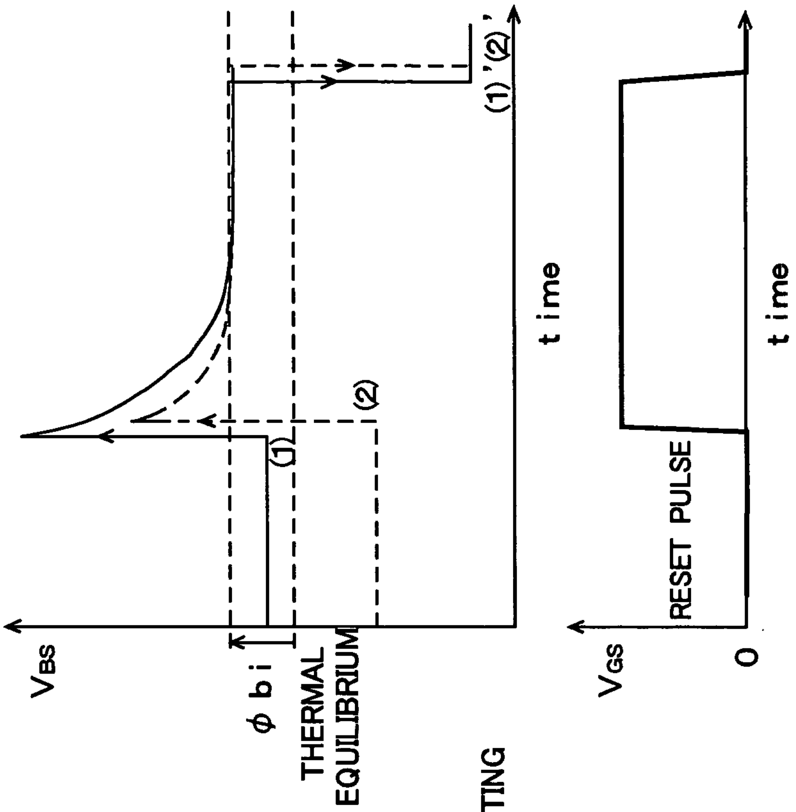
Figure 20A:
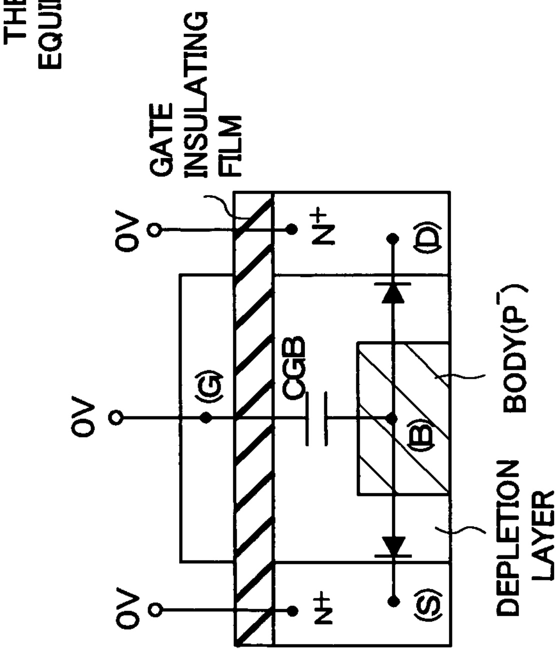

FIG. 20B schematically shows time changes of body potentials VBS of two MOS transistors and the time change of a voltage VGS applied between the gate and source. Here, one of the VBS of the two MOS transistors is shown by a solid line, and the other VBS is shown by a dashed line. In FIG. 20B, (1) and (2) show a condition where the body potentials are not coincident.

Herein, when a rising step waveform voltage is given to the gate while the source potential is provided as 0V, the body potential rises owing to an electrostatic induction coupling via the capacitance CGB between the gate and body. When the body potential reaches “body potential in thermal equilibrium”+“ϕbi (built-in potential) of the pn-junction” or more, since the diode owing to the pn-junction between the body and source reaches a condition where a barrier-free forward bias is given, the body potentials of the two MOS transistors are quickly converged toward a potential “body potential in thermal equilibrium”+“ϕbi (built-in potential) of the pn-junction,” and as a result, the two body potentials reach an almost coincident condition. Thereafter, when the gate voltage is lowered to 0V, the body potentials lower owing to the electrostatic induction coupling via CGB, and the body potentials coincide as shown in (1)' and (2)'.

That is, since a step waveform voltage is applied between the gate and source of the MOS transistor having a floating body, the body potential is reset. This is one of the reasons that effects are obtained by the present invention.

Furthermore, in a case of the present embodiment, since the MOS transistors are polysilicon TFTs and semiconductors of the bodies are not of a single crystal but of a so-called polycrystal having grain boundaries, virtually no effect is obtained as will be described later by only forward biasing between the body and source by simply raising the body potential. In order to obtain effects, it is important that VGS becomes not less than the threshold voltage of this MOS transistor when a body potential reset pulse is given, and this can also be read out from the present experimental results shown in FIG. 19.

Herein, the reason that there is a difference in mechanisms between a case of a single crystal and a case of a polycrystal will be described.

First, as has been shown in the foregoing, in a case where the semiconductor forming a channel is a single crystal, since the carrier density is increased according to the amount of impurities (dopant) to be doped into the semiconductor, the Fermi level approaches the band edge (the Fermi level approaches the valence band in a case of a p-type silicon), and carriers (positive holes in a case of a p-type silicon) which contribute to conduction exist. Therefore, carriers which contribute to conduction exist in the body of a PD (partially depleted)-SOI MOS transistor using a single crystal silicon.

However, in a case of a polycrystal, since (1) positive holes and electrons are trapped by the grain boundaries and (2) parts which are great in the degree of freedom of structure exist mainly in grain boundary portions, valence requirements are satisfied even when impurities which are different in valences are doped and electrons and positive holes are not supplied, therefore, the carrier density is not improved. In addition, potential barriers exist in the grain boundary portions. For these reasons, there are few carriers which contribute to conduction in the body portion of a polycrystalline silicon TFT.

Therefore, although it is considered that, in the case of a single crystal, carriers (positive holes in a case of an n-channel MOS transistor) accumulated owing to a floating body effect can be extracted by biasing the body and source so as to be in a forward direction, it is difficult to extract the same in the case of a polycrystal.

Figure 21B:
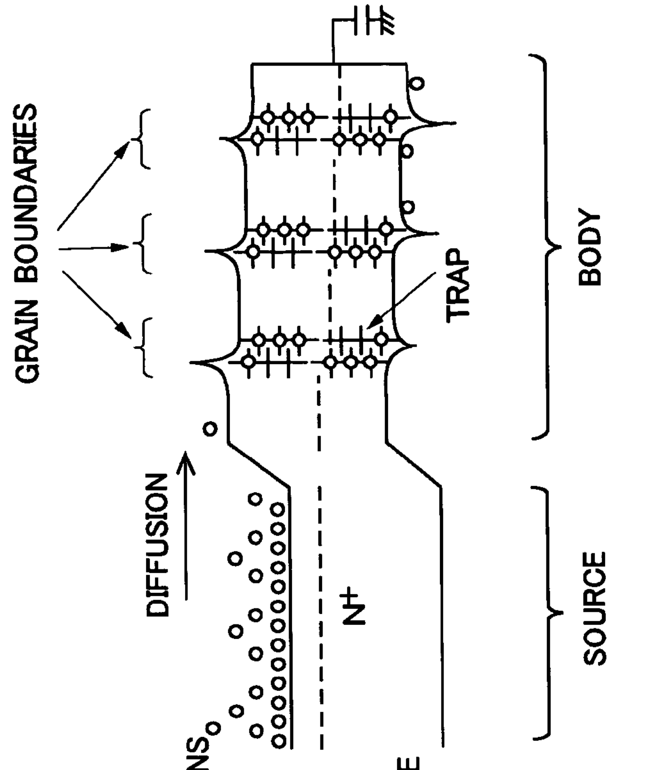
Figure 21A:
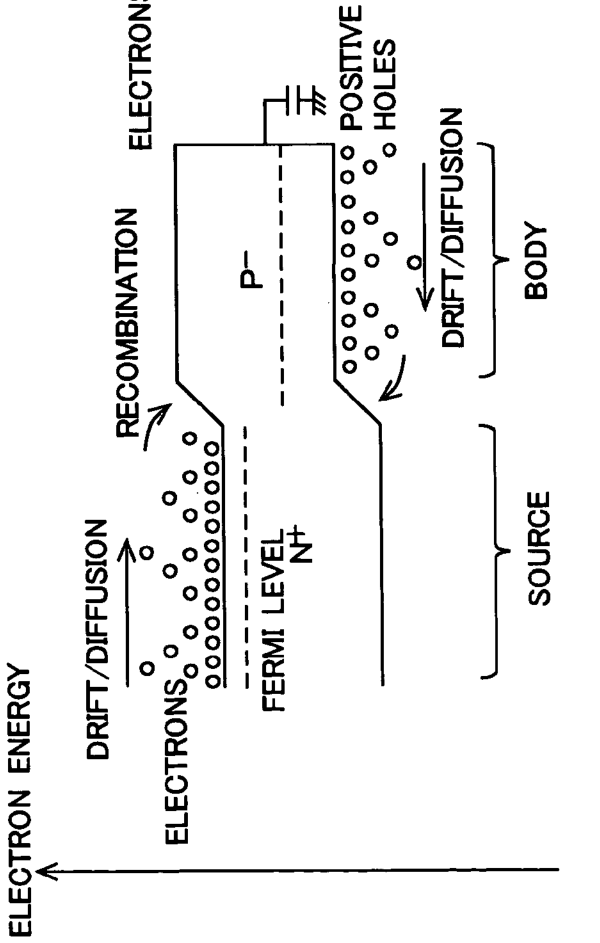

FIGS. 21A and 21B show body-source band diagrams taking a case where the body and source have been biased in a forward direction in an n-channel MOS transistor, for example. Here, the capacitance in the drawing shows a capacitance (body-drain capacitance or the like) other than a junction capacitance between the body and source.

FIG. 21A shows a case of a single crystal, wherein positive holes which have been accumulated owing to a floating body effect and which contribute to conduction exist in the body portion, and by biasing in a forward direction, positive holes in the vicinity of the junction are diffused toward the source, and positive holes in a part distant from the junction are also diffused and drifted toward the source. Moreover, similarly for the electrons of the source, electrons in the vicinity of the junction are diffused toward the body, and electrons in a part distant from the junction are also diffused and drifted toward the body.

In the vicinity of the junction, the electrons and positive holes are recombined, and by these operations, the positive holes accumulated in the body portion are extracted. Namely, in the case of a single crystal, since positive holes which exist in the body can be easily drifted and diffused in a lateral direction (a direction toward the source from the body in FIG. 20B), it is possible to extract the positive holes accumulated in the body portion.

FIG. 21B shows a case of a polycrystal. Although positive holes have been accumulated in the body portion owing to a floating body effect, these can scarcely contribute to conduction since these are obstructed or trapped by potential barriers in the grain boundary portions, as shown in FIG. 21B. Although electrons of the source in the vicinity of the junction are diffused toward the body, since there are no positive holes to be recombined with, this results in only heightening a potential barrier of the junction portion and cannot allow a current to flow. Namely, the accumulated positive holes cannot be extracted.

In addition, this model shows that positive holes more than those in the case of a single crystal are accumulated as well as that the accumulated positive holes cannot be extracted.

Figure 13A:
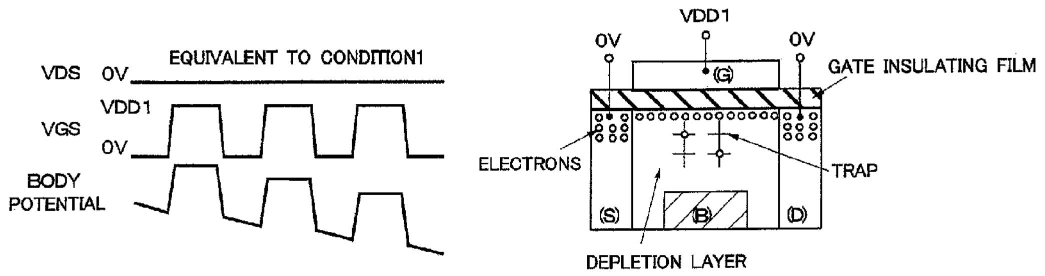
Figure 13B:
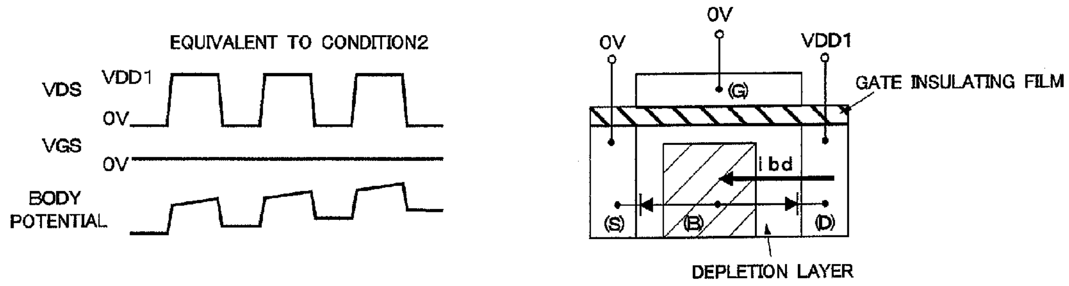
Figure 14:
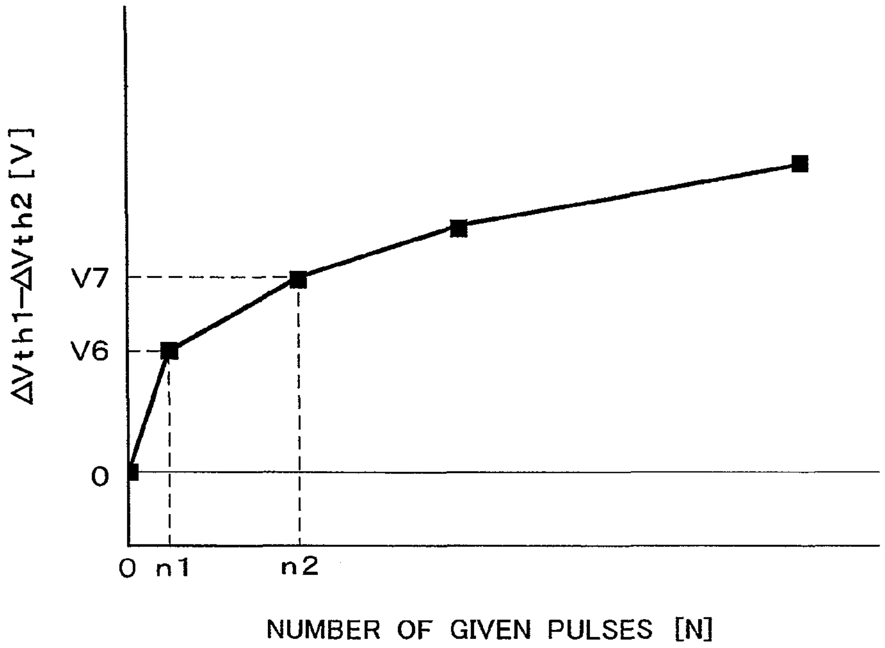
FIG. 14 is a graph showing a relationship between ΔVth1-ΔVth2 and the number of given pulses.
Figure 15:
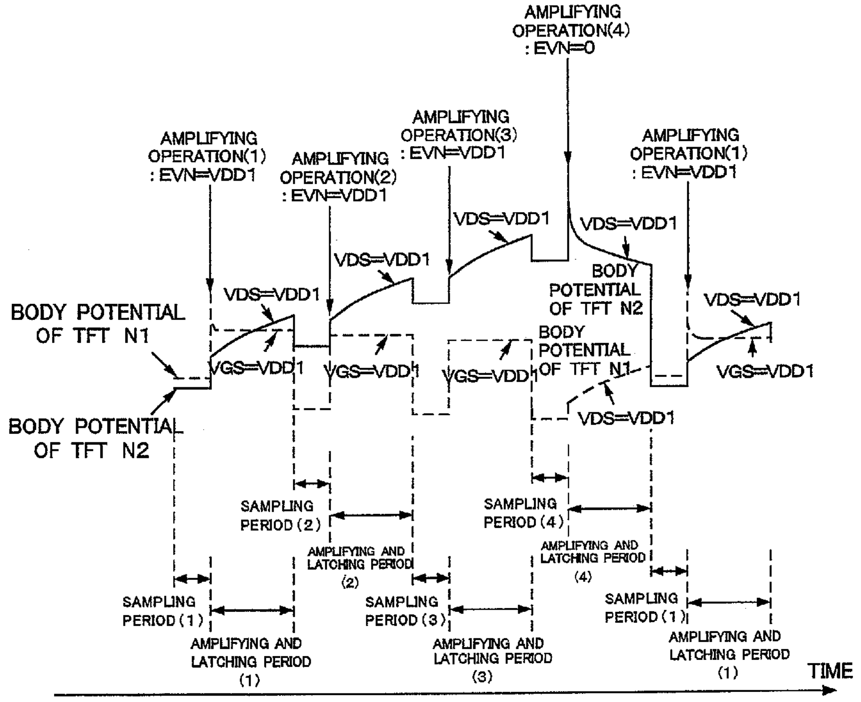
FIG. 15 is an estimated diagram of body potentials of a MOS transistor.

For example, when voltages of VGS=0V and VDS=VDD1 are given to an n-channel MOS transistor, as has been shown in FIG. 13B, a junction leak current flows from the drain to the body. When potential of the body reaches “body potential in thermal equilibrium”+“ϕbi (built-in potential) of the pn-junction” or more, positive holes flow through the body and are swiftly released to the source in a case of a single crystal, whereas, in a case of a polycrystal, positive holes are obstructed by potential barriers in the grain boundary portions only to form a potential difference between the grain boundaries, and the positive holes are not easily released to the source.

That is, in the case of a polycrystal, the positive holes which exist in the body are not easily drifted and diffused in a lateral direction (a direction toward the source from the body in FIG. 20). Therefore, in such a case, as in the present invention, where there is no operation for resetting body potential by applying a step waveform voltage between the gate and source, a larger number of positive holes than those in the case of a single crystal are accumulated in the body, the threshold voltage is changed, and a hysteresis effect and the like owing to the floating body is more seriously realized.

Figure 10:
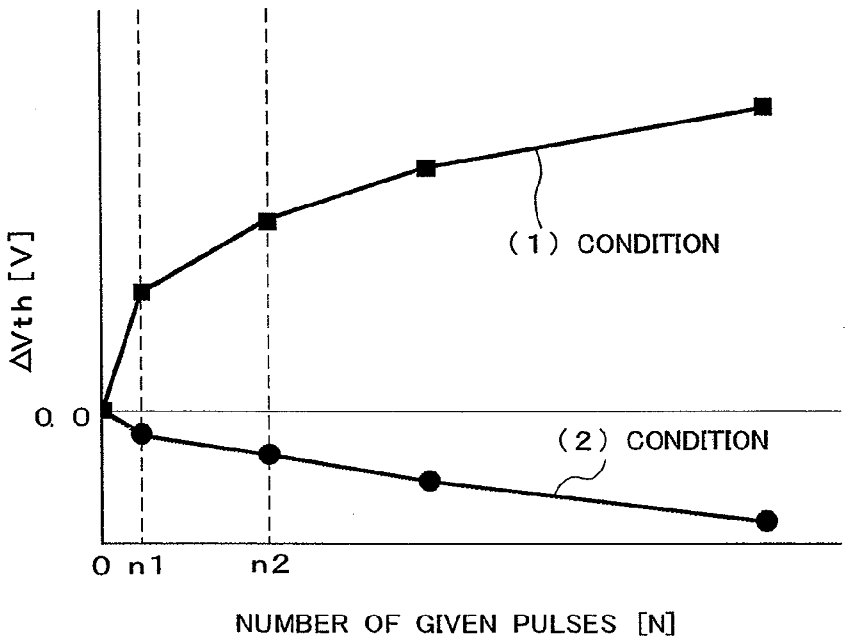
FIG. 10 is a graph showing measurement results of a dynamic threshold voltage fluctuation of polysilicon TFTs.

On the other hand, when a pulse waveform voltage not less than the threshold voltage is repeatedly applied between the gate and source of a MOS transistor, based on the results of FIG. 10, it is considered that the threshold voltage rises (namely, the body potential lowers), and, as mentioned above, if the silicon layer is limited, the depletion layer reaches the lower end of the silicon layer at a certain point, and the threshold voltage does not increase further than the same.

That is, when a pulse waveform voltage not less than the threshold voltage is repeatedly applied between the gate and source of a MOS transistor, a state the same as a so-called completely depleted SOI is provided, and at this time, the threshed voltage of the MOS transistor is saturated at a certain unique value, and the threshold voltage never becomes greater than this value.

Accordingly, before carrying out an amplifying operation by use of a MOS transistor, the threshold voltage can be saturated at a certain unique value by applying a pulse waveform voltage not less than the threshold voltage between the gate and source of a MOS transistor, thus it becomes possible to fix the threshold voltage when an amplifying operation is started.

In addition, the body potential is lowered even when application of the pulse waveform voltage is carried out only once. Namely, it is possible to extract positive holes accumulated in the body. This owes to such a mechanism that positive holes accumulated in the body are extracted by recombining trapped electrons in a channel with positive holes when applying a voltage not less than the threshold voltage to a MOS transistor. Description will be given of this mechanism with reference to the drawings.

Figure 22:
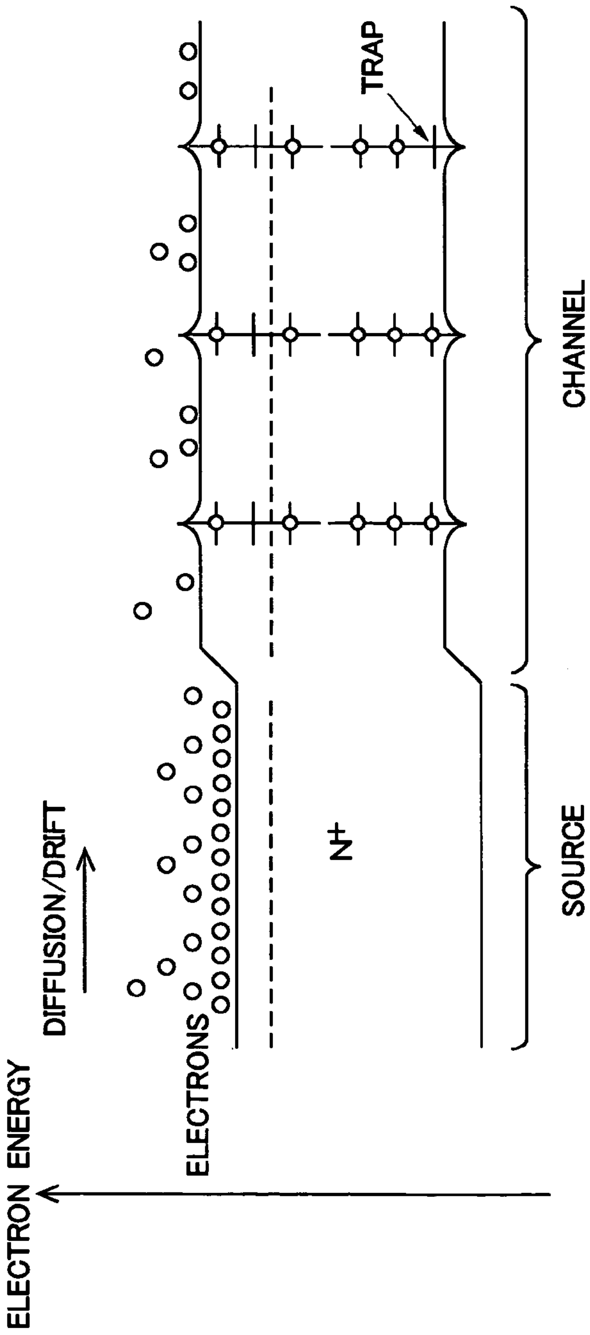
FIG. 22 is a band diagram in a lateral direction in the vicinity of a semiconductor surface in a case where a MOS transistor is in an ON state.

FIG. 22 shows a band diagram in a lateral direction in the vicinity of a semiconductor surface in a case where a MOS transistor is turned on by applying a voltage not less than the threshold voltage to VGS in a MOS transistor.

By applying a voltage so that the gate-source voltage VGS becomes not less than the threshold voltage of this MOS transistor, this MOS transistor is turned on, and a channel is formed by electrons swiftly supplied by the source. Namely, a sufficient number of electrons exist under the gate. That is, a sufficient number of electrons exist on the body. Therefore, provided is a state where a large number of electron traps which exist at the grain boundaries have captured electrons.

Figure 23B:
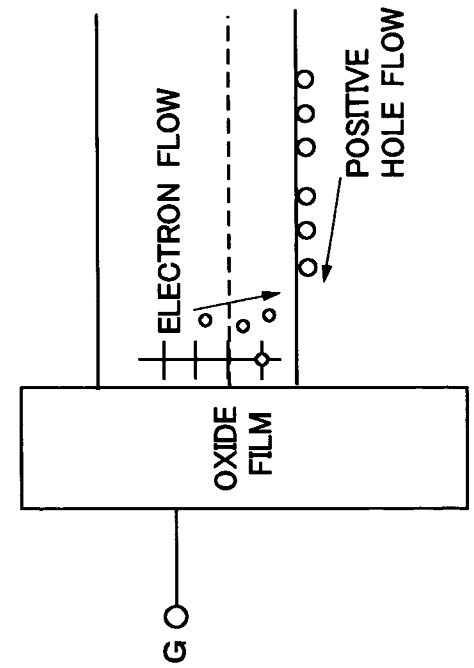
Figure 23A:
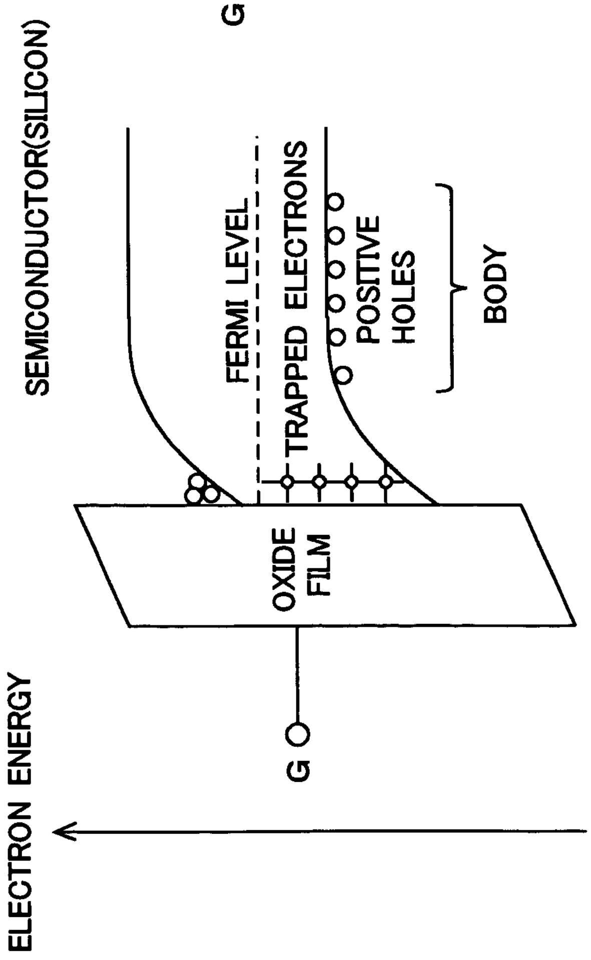

FIG. 23A is a band diagram in a vertical direction around a gate electrode when, similarly, a voltage not less than the threshold voltage is applied to VGS in a MOS transistor and the MOS transistor is thereby turned on, showing a part from the gate (G) toward the body. As has been indicated in the description of FIG. 22, this shows a state where a large number of electron traps have captured electrons in the vicinity of a semiconductor surface.

When the transistor is turned off in this state, a band diagram as shown in FIG. 23B is provided. Namely, energy of a large number of electron traps becomes higher than the Fermi level. Accordingly, electrons which have been trapped are recombined with positive holes in the balance band. Thereby, all or some of the positive holes which have been accumulated in the body are extracted from the body.

By repeating FIG. 23A and FIG. 23B, the operations of (a) and (b) mentioned in the foregoing are repeated, and if the silicon layer is limited, it is considered that most of the positive holes are extracted from the body, and the depletion layer reaches the lower end of the silicon layer at a certain point and the threshold voltage does not increase further than the same.

No potential barriers caused by the grain boundaries are illustrated in FIG. 23 in a direction where the positive holes are shifted. This is because the direction where the positive holes are shifted is a vertical direction and a shifting distance therein is considerably shorter than that in the lateral direction, probability that grain boundaries are present is extremely small. Namely, since the distance from the body to the semiconductor surface where a channel is formed is short, there are a small number of or no grain boundaries which the carriers must cross before being recombined.

In addition, the distance by which the carriers must be shifted is also short. Moreover, the cross-sectional area where the carriers are shifted is large. For these reasons, positive holes which exist in the body are easily shifted in the vertical direction. As a result, it becomes possible to easily recombine with electrons. Namely, when a voltage not less than the threshold voltage is applied to the gate, by a recombination in the vertical direction, accumulated positive holes are extracted and the body potential is regulated.

Namely, in the present invention, since a step waveform voltage not less than the threshold voltage of a MOS transistor is applied between the gate and source, the MOS transistor is turned on, and electrons are swiftly supplied onto the semiconductor surface from the source. And, these electrons are also supplied to a place distant from the source junction in sufficient numbers, even when the semiconductor is of a polycrystal, since the MOS transistor is on. And, since electrons trapped at this time are recombined with positive holes of the body when the MOS transistor is turned off, the body potential is reset, thus effects of the present invention can be obtained.

As such, as the reasons that effects are obtained by the present invention, in addition to the reason that "since a step waveform voltage is applied between the gate and source of an MOS transistor having a floating body, the body potential is reset" mentioned in the foregoing, a reason that "positive holes which exist in the body are drifted and diffused in a vertical direction (a direction toward the gate from the body in FIG. 20) and are recombined" also exists.

As described above, in the present embodiment, since the body is not of a single crystal but of a polycrystal, virtually no effect is obtained by only biasing the body and source in a forward direction by simply raising the body potential. However, effects can be obtained by giving, as in the present embodiment, a step waveform voltage (referred to as a reset pulse or a body potential reset pulse) not less than the threshold voltage of a MOS transistor between the gate and source.

On the other hand, in a case where the body is of a single crystal, it has been considered effective to provide a forward bias between the body and source by simply raising the body potential (by lowering potential of the source relative to the body), without being conscious of the presence of the gate electrode. This can make reference to the following prior arts; prior art 8 (Japanese Published Unexamined Patent Application No. H10-172279), prior art 9 (Japanese Published Unexamined Patent Application No. H09-246483), and prior art 10 (Sigeki TOMISHIMA, et al., "A Long Data Retention SOI-DRAM with the Body Refresh Function," Symposium on VLSI Circuits Digest of Technical Papers, 1996, pp 198), and prior art 11 (Japanese Published Unexamined Patent Application No. H09-321259).

The prior arts 8 to 10 disclose driving methods devised for the purpose of reducing a leak current at the holding time of switch transistors in memory cells of DRAMs, wherein while the capacitor in a memory cell is holding electric charge, the source potential is lowered to provide a forward bias between the body and source, whereby electric charge accumulated in the body is extracted. It is reported that since the body potential is thereby lowered and the threshold voltage is raised, a leakage is reduced. However, since the transistor to be an object remains off during this operation, the driving methods are different from the present invention wherein a voltage not less than the threshold voltage is applied between the gate and source to provide an ON-state.

In addition, as has been clarified in the present invention, even if the body and source are biased in a forward direction in a condition where the transistor remains off, effects of the present invention cannot be obtained in such a case where the body is of a polycrystal or an amorphous substance.

In addition, prior art 11 describes a driving method contrived for the purpose of lowering a leak current when the logic circuit is in an idle state, wherein potential of the source is lowered to provide a forward bias between the body and source, whereby electric charge accumulated in the body is extracted. It is reported that since the body potential is thereby lowered and the threshold voltage is raised, a leakage is reduced. In this Patent literature 5 as well, similar to Patent literatures 3 and 4 and Non-patent literature 5, since the transistor to be an object remains off during this operation, the driving method is different from the present invention wherein a voltage not less than the threshold voltage is applied between the gate and source to provide an ON-state, and as has been clarified in the present invention, effects as shown in the present invention cannot be obtained in such a case where the body is of a polycrystal or an amorphous substance.

Here, although an example where the body potential reset pulse number is once per one MOS transistor has been shown in the present embodiment, the pulse number may be twice or more, and similar effects could be obtained in this case as well.

In addition, although an example where a step waveform has been given between the gate and source of MOS transistors to reset a dynamic fluctuation in characteristics of the MOS transistors has been described in the above, similar effects could be obtained in a case where an exponential waveform, a sinusoidal waveform, or a pulse waveform has been given, as well. By giving an exponential waveform or a sinusoidal waveform in place of the step waveform, the amount of noise and a bandwidth generated by this waveform could be reduced.

Figure 24C:
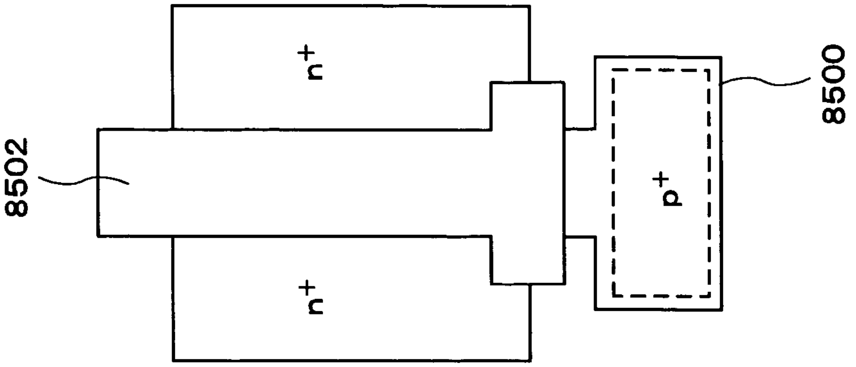
FIGS. 24A to 24C are plan views of MOS transistors of the present invention.
Figure 24B:
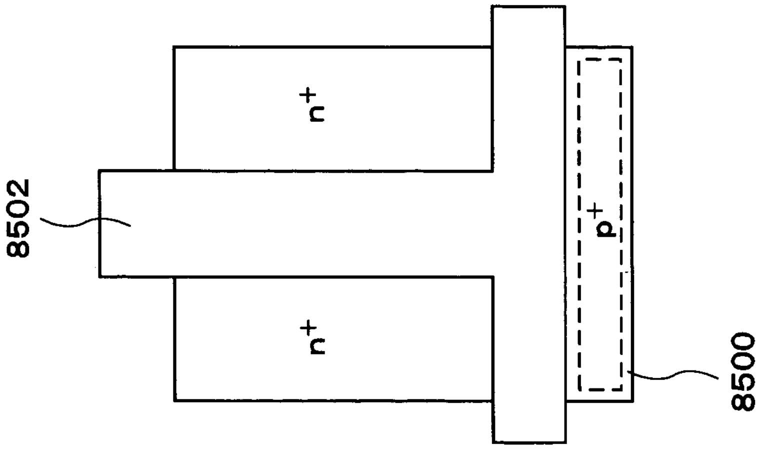
Figure 24A:
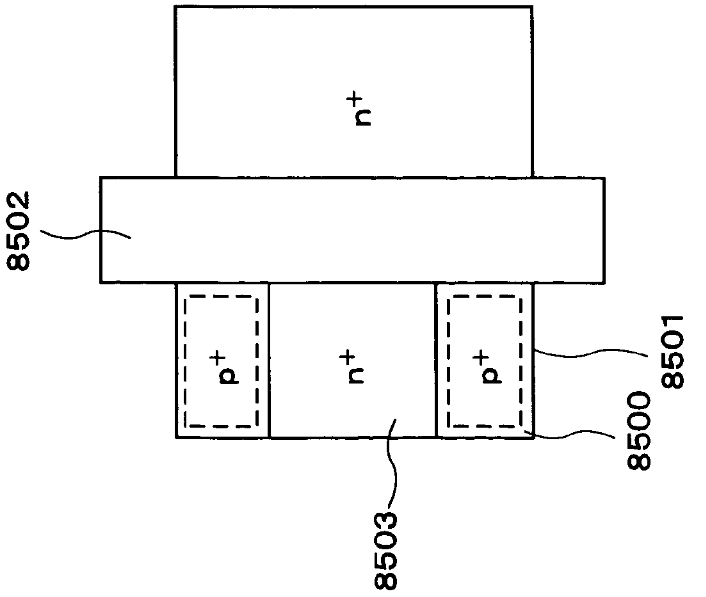

In addition, simultaneously while taking a countermeasure such as to provide a body potential reset pulse to reset a dynamic fluctuation in characteristics of a MOS transistor, a countermeasure by a device configuration may be used. For example, even in a case of a driving method where a body potential reset pulse is given to a TFT having a body contact, effects can be obtained. FIGS. 24A to 24C are plan views of TFTs each of which is provided with a body contact (8500). FIG. 24A shows an example where $p^+$ regions have been provided in a source region (8503) formed of n+ diffusion layer of a MOS transistor having a gate electrode (8502) provided on a silicon layer (8501), wherein by giving a voltage the same as that of the source region (8503) or a further lower voltage to $p^+$, an electric charge accumulated in the body can be extracted, thus an effect to suppress a hysteresis effect can be obtained. In FIGS. 24B and 24C as well, body contacts (8500) formed of $p^+$regions are provided near gate electrodes (8502) each of which has a T-shape, and by giving a voltage not more than a source voltage to $p^+$ region, an electric charge accumulated in the body can be extracted, thus an effect to suppress a hysteresis effect can be obtained.

In addition, by providing a back gate on the TFT and giving an appropriate voltage to the back gate so as to expand the depletion layer of the body, an electric charge accumulated in the body can be reduced, and a hysteresis effect can be reduced by applying a drive such as to give a body potential reset pulse to the TFT.

Figure 25:
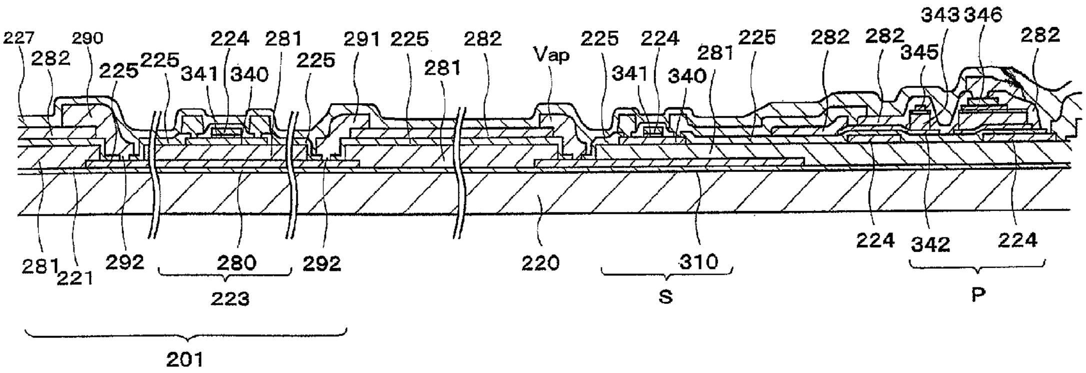
FIG. 25 is a sectional view of a MOS transistor of the present invention.

FIG. 25 is a sectional view showing a MOS transistor (TFT) having a back gate (280). This semiconductor device includes a photodiode region P for converting an incident light to an electrical signal, a switch region S for charging this photodiode, and a scanning circuit (201) for on/off controlling this switch. A glass substrate (220) has, for example, a thickness of 1.1 mm. For preventing pollution from this glass substrate (220) and flattening, an oxide silicon film (221) has been formed at a thickness of approximately 3000 angstroms by a CVD (Chemical vapor deposition) method.

A back gate 280 has been formed, on this oxide silicon layer (221), at a position equivalent to a region where the scanning circuit (201) is formed and a region where a switching transistor or transistors (223) such as a thin film transistor or transistors are formed, and a light-shielding film 310 has been formed in the switch region S. This back gate 280 is desirably a conductor having a high melting point so as to be resistant to a process temperature after a back gate formation, and is formed by, for example, sputtering WSi at a film thickness of 1800 angstroms and a photolithographic method.

Next, in a manner covering the whole of these, an oxide silicon layer 281 having a thickness of, for example, 10000 angstroms has been formed. Since capacitance which is parasitic in a circuit is determined depending on a film thickness of this oxide silicon film 281, it is desirable to adjust the film thickness according to an operating speed and a power consumption required in this circuit.

On the oxide silicon film 281, a polycrystalline silicon thin film 340 has been formed at a thickness of 500 to 1000 angstroms by a CVD method, for example, and has been patterned into a transistor form by a photolithography step. On this polycrystalline silicon thin film 340, a gate oxide film 341 has been formed at a thickness of 100 to 1000 angstroms. The polycrystalline silicon thin film 340 can be formed at a lower temperature by forming amorphous silicon by a CVD method and then melting and recrystallizing this film by a laser annealing method.

Next, as a gate electrode 224, a laminated structure film of polysilicon or a metal film with silicide has been formed at a thickness on the order of 1000 to 3000 angstroms and has been similarly patterned.

In this condition, ion doping for forming source and drain regions of a thin film transistor is carried out. At this time, for an n-type, doped are phosphorus (P) ions at a predetermined dosage, and for a p-type, boron (B) ions.

The switching transistor 223 including a thin film transistor using polycrystalline silicon as an active layer has been formed in such a manner. After ion doping, for easily attaining contact of the back gate 280 with aluminum wirings 290 and 291 to be formed later, the oxide silicon film 281 for insulation around portions scheduled to have contact holes 292 formed are locally removed by etching.

Thereafter, in a manner covering the entire surface of these, an oxide silicon film has been formed as a first interlayer film 225 at a thickness of 2000 to 5000 angstroms by a CVD method. On this first interlayer film 225, a lower electrode 342 of the photodiode portion has been formed of a metal such as chromium, for example.

On the lower electrode 342, an amorphous silicon layer 343 has been formed in order of an i-layer and a p-layer from the bottom at a thickness of approximately 8000 angstroms by a CVD method. On the amorphous silicon layer 343, an ITO layer being a transparent electrode 345 has been formed at a thickness of 1000 angstroms, and an electrode 346 by a barrier metal layer such as tungsten silicide has been formed at a film thickness of 500 to 2000 angstroms in order. The barrier metal layer, ITO layer, and amorphous silicon layer have been formed in a photodiode form by a photolithography step.

On these, a second interlayer film 282 including a silicon nitride film has been formed at a film thickness on the order of 2000 to 5000 angstroms by a CVD method.

Then, the second interlayer film 282 in the thin film transistor region and around parts where a contact hole of the upper electrode 346 of the photodiode, a contact hole of the photodiode lower electrode 342, and the contact holes 292 with the back gate 280 should be formed has been removed.

In addition, the first interlayer film 225 at parts of the source and drain of the TFT, gate electrode, and contact holes 292 to the back gate 280 has been removed. In order to lower resistance of the back gate 280, the aluminum wirings 290 and 291 have been connected with the back gate 280 via a large number of contact holes 292, and on both sides of these aluminum wirings, bonding pads have been provided. The aluminum wirings 290 and 291 have been formed of a metal such as Al at a film thickness of 5000 to 10000 angstroms, and have been etched in desired wiring forms.

A passivation film 227 has been formed of a silicon nitride film or a polyimide film, and has been removed by etching at parts of the bonding pad portions. Here, between the contact holes 292, the switching transistors 223 including the thin film transistors have been formed in large numbers.

When the countermeasure by a body potential reset pulse was not simultaneously used with the countermeasure by a device, namely, even with only the countermeasure by a device, a hysteresis effect could be suppressed to some extent. In this connection, effects could be obtained in cases, as well, as shown in other embodiments where the problem is a hysteresis effect.

In the present embodiment, although a description has been given of polysilicon TFTs as MOS transistors composing a circuit, for example, similar effects can be obtained by amorphous silicon TFTs and MOS transistors such as MOS transistors using microcrystalline silicon in an intermediate state between polysilicon and amorphous silicon as channels and SOI MOS transistors using crystalline silicon as a channels, as long as these are MOS transistors having floating bodies.

In the present embodiment, although a description has been given of top-gate MOS transistors as MOS transistors composing a circuit, similar effects can also be obtained by bottom-gate MOS transistors.

Second Embodiment

Although an example where VDS of the MOS transistors was 0 and no drain current flowed when a body potential reset pulse was given has been shown in first embodiment, the same circuit (circuit shown in FIG. 11) as in first embodiment is used in the present second embodiment, and a drive different from FIG. 16 is carried out.

Figure 26:
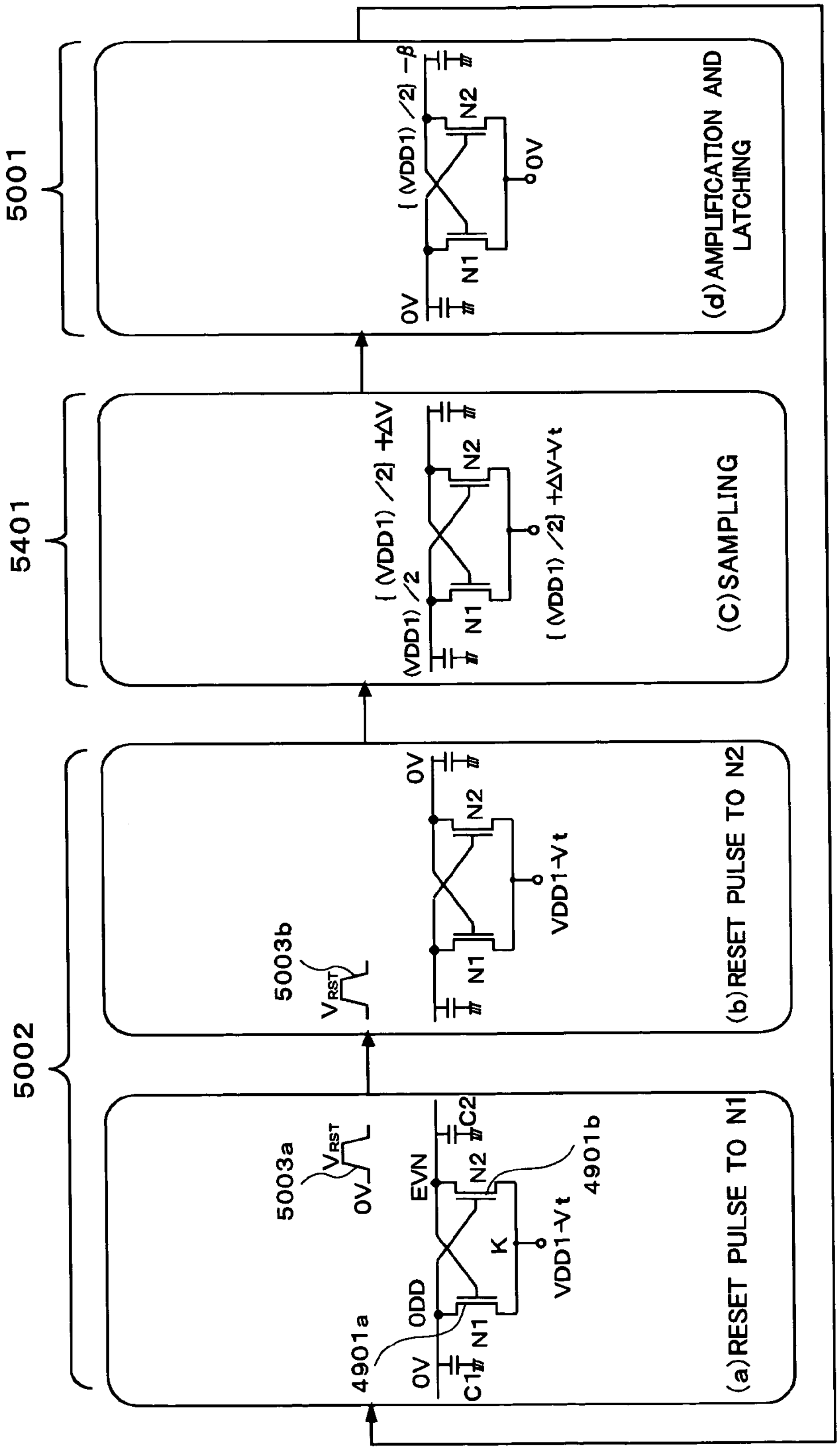
FIG. 26 is a flowchart showing a method for driving a latch circuit of a second embodiment of the present invention.

FIG. 26 is a flowchart showing a method for driving a latch circuit of the present invention. This is different from FIG. 16 in that (VDD1−Vt)V is given to a node K in a period where a body potential reset pulse is being given, so that a drain current flows to a MOS transistor to which the body potential reset pulse is being inputted.

Herein, although (VDD1−Vt)V given to the node K has been mentioned, this is a voltage provided for convenience of using the circuit of FIG. 17 in an experiment, therefore, simply giving VDD1 is essentially the same.

The latch circuit is driven while outputting a signal required in an unillustrated circuit other than the latch circuit by using electrical characteristics of the MOS transistors (4901*a* and 4901*b*) in a first period (effective period) (5001), and giving, in a second period (idle period) (5002) excluding the first period, step waveform pulses (5003*a* and 5003*b*) not less than a threshold voltage of the MOS transistors between the gate and source of the MOS transistors (4901*a* and 4901*b*) a predetermined number of times.

The driving method will be described with reference to a flowchart of FIG. 26.

First, as shown in (a) of FIG. 26, while giving (VDD1−Vt) (voltage) to the node K of the polysilicon TFT N1 (4901*a*) and polysilicon TFT N2 (4901*b*), and 0V, to a node ODD, a pulse (5003*a*) higher in voltage than the threshold voltage of the TFN N1 is given to a node EVN.

Subsequently, as shown in (b) of FIG. 26, while giving (VDD1-Vt) to the node K of the transistors N1 and N2, and 0V, to the node EVN, a pulse (5003*b*) higher in voltage than the threshold voltage of the TFT N2 is given to the node ODD.

Next, as shown in (c) of FIG. 26, a potential difference ΔV is given to the nodes EVN and ODD (5401), and this is held by the capacitances C1 and C2. Namely, this is sampled in the capacitances, and the nodes EVN and ODD are brought into a floating state. Here, similar to first embodiment, as the voltages to which ΔV is given, (VDD1)/2 is given to the node ODD, (VDD1)/2+ΔV is given to the node EVN.

In addition, in this case, the common source between the transistors N1 and N2 is brought into a floating state or is supplied with a voltage (which is provided as (VDD1)/2−(VDD1)/2+ΔV in this drawing) high enough but not to an extent to turn on the transistors N1 and N2.

Next, as shown in (d) of FIG. 26, by lowering the common source between the N1 and N2 to 0V, the potential difference given in (c) of FIG. 26 is amplified by a difference in conductance between the TFTs N1 and N2, and reaches a condition where the node to which a lower potential had been provided in (c) of FIG. 26 has been lowered to 0V, while the higher node potential has been scarcely lowered, at ({(VDD1)/2−β}, β has been described in FIG. 6), whereby the amplifying and latching operation is completed.

Then, when an amplifying and latching operation are to be carried out in succession hereto, the same operations are repeated in FIG. 26A again.

By giving, before carrying out an amplifying and latching operation, the gate electrodes of the TFTs N1 and N2 pulses (which are referred to as body potential reset pulses) to make VGS of these exceed the threshold voltage, unevenness in characteristics between the TFTs N1 and N2 that has occurred owing to operation histories can be corrected. And, consequently, it becomes possible to amplify ΔV without malfunction even when ΔV given to the latch circuit is small, which allows a normal latching operation.

Next, effects of the present invention in the present embodiment will be described based on experimental results.

As an experimental circuit for evaluating a latch-type sense amplifier, FIG. 17 shown in first embodiment is used. Since this experimental circuit has been described in first embodiment, a further description will be omitted.

Figure 27:
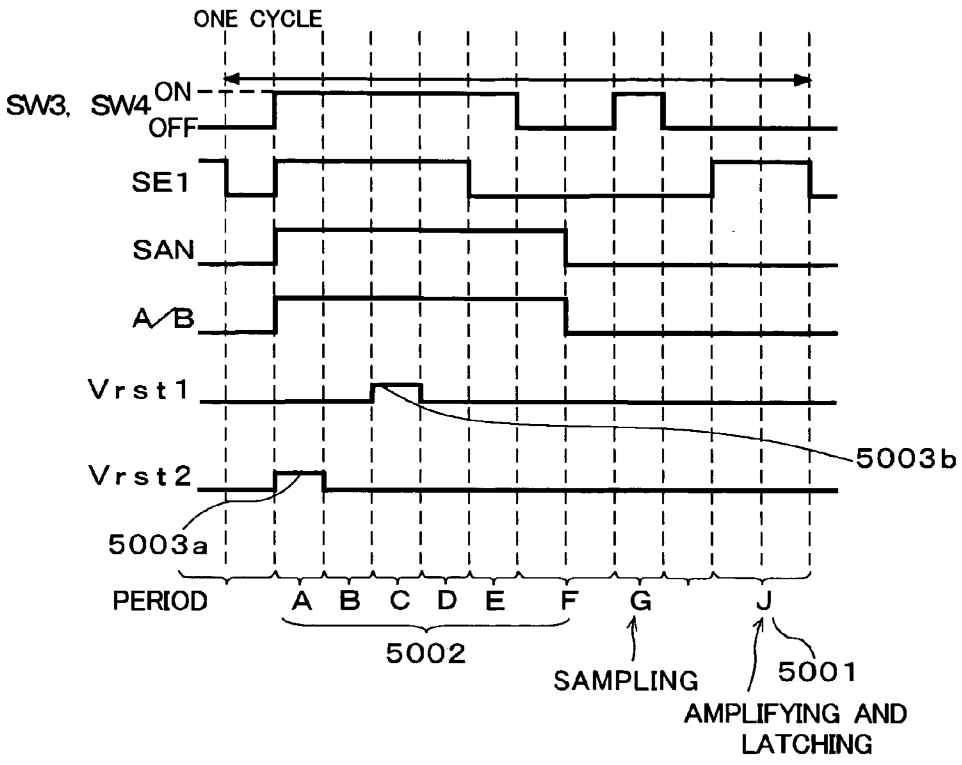
FIG. 27 is a timing chart showing a driving method of the second embodiment of the present invention.

Next, a method for driving this latch-type sense amplifier circuit will be described with reference to FIG. 27.

(Period A) With the switches SW3 and SW4 on, SE1 high in level, SAN high in level (VDD1), and A/B high in level, D0 and D1 are connected with the pulse voltage generators Vrst2 and Vrst1, so as to output a pulse with a pulse voltage value of Vrst from Vrst2. At this time, since Vrst1 is outputting 0V and (VDD1−Vt)V (herein, Vt is a threshold voltage of TFT N3) is being applied to the node K, the source of TFT N1 is at the node ODD side. Thereby, a pulse with a pulse voltage value of Vrst is applied between the gate and source of the transistor N1. Then, a drain current flows from the node K toward the node ODD through the transistor N1. In addition, since Vrst1 is 0V at this time, TFT N2 remains off.

(Period C) With the switches SW3 and SW4 on, SE1 high in level, SAN high in level (VDD1), and A/B high in level, D0 and D1 are connected with the pulse voltage generators Vrst2 and Vrst1, so as to output a pulse with a pulse voltage value of Vrst from Vrst2. At this time, since Vrst2 is outputting 0V and a voltage of (VDD1−Vt)V (herein, Vt is a threshold voltage of TFT N3) is being applied to the node K, the source of TFT N2 is at the node EVN side. Thereby, a pulse with a pulse voltage value of Vrst is applied between the gate and source of the transistor N2. Then, a drain current flows from the node K toward the node EVN through the transistor N2. In addition, since Vrst2 is 0V at this time, TFT N1 remains off.

(Period G) With the switches SW3 and SW4 on, SE1 low, and A/B low in level, D0 is connected with a variable voltage source VEVN, and D1 is connected with a fixed voltage source VODD. VODD is provided as (VDD1)/2 and VEVN is provided as (VDD1)/2+ΔV, whereby a potential difference of ΔV is given to the sense amplifier. Thereafter, by turning off SW3 and SW4, these voltages are sampled in C2 and C1, respectively.

(Period J) With the switches SW3 and SW4 off, SE1 high in level, and SAN low in level, the source potential of the N1 and N2 of the node K is lowered to 0V.

Then, operations are repeated in Period A again.

Monitoring the voltages of the node ODD and node EVN allows to find out at what voltage or more of the sense amplifier circuit sensitivity, that is, the absolute value of ΔV, the output is stabilized.

Similar to first embodiment, a positive value of ΔV and a negative value of ΔV necessary at a minimum for stable output are measured by use of the pulse voltage value Vrst as a parameter, whereby an unstable region is determined. As a result, effects the same as those in FIG. 19 obtained in first embodiment are obtained.

That is, although the unstable region is large when the pulse voltage is low, there is a tendency that the unstable region becomes smaller in proportion to a rise in the body potential reset pulse voltage. In particular, when the pulse voltage is raised above the threshold voltage of the transistors N1 and N2, an effect to reduce the unstable region is provided.

For example, the width of the unstable region when the reset pulse is V10 similar to FIG. 19 becomes 1/24 or less relative to (V8-V9) in the case of the conventional driving method shown in FIG. 12, thus the width is substantially reduced. Namely, for the same reason as that in first embodiment, similar effects can be obtained in the present embodiment as well.

Third Embodiment

In the present third embodiment, description will be given of a concrete example of a latch-type sense amplifier circuit to which the driving method of first embodiment has been applied.

Figure 28B:
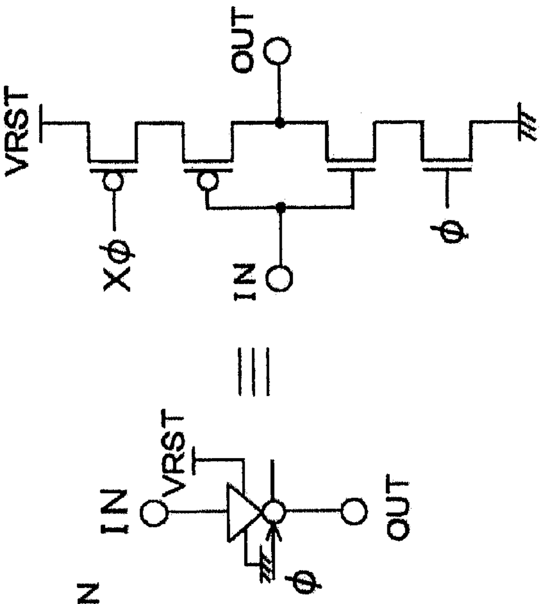
Figure 28A:
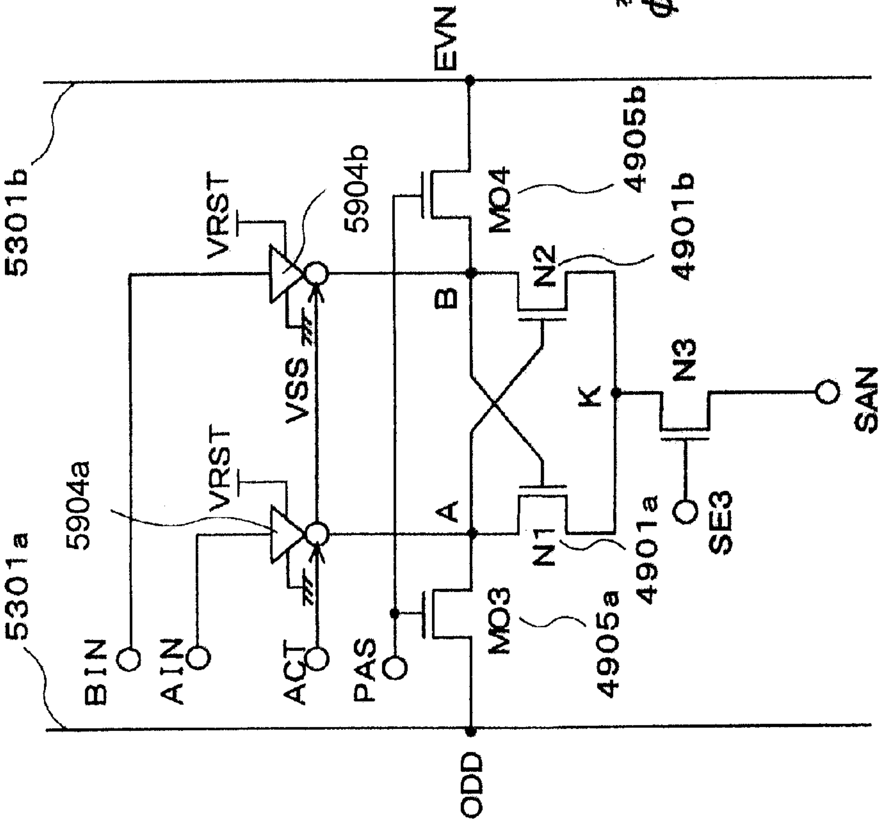

A circuit diagram of a sense amplifier circuit of the present invention is shown in FIG. 28A. A transistor N1 (4901*a*) and a transistor N2 (4901*b*) are n-channel polysilicon TFTs, and a transistor N3 is an n-channel polysilicon TFT to turn on and off a section between a source (node K) of the transistors N1 and N2 and a SAN electrode in accordance with a signal SE3. SAN is connected to VSS (for example, 0V).

A symbol of node A is used for the drain of the transistor N1, and a symbol of node B is used for the drain of the transistor N2. To the node A, a bit line ODD (5301*a*) is connected via a switch M03 (4905*a*) for which ON/OFF is controlled by PAS. In addition, to the node B, a bit line EVN (5301*b*) is connected via a transmission control section for which ON/OFF is controlled by PAS, namely, a switch M04 (4905*b*).

Moreover, to the node A, an output from a clocked inverter CINV1 (5904*a*) is connected, and to the node B, an output from a clocked inverter CINV2 (5904*b*) is connected. A clocked inverter is constructed as shown in FIG. 28(*b*), for example, and operates as an inverter when a clock ϕ is at a high level and a clock $X_\phi$ is at a low level, so as to output a high-level VRST voltage to OUT when an input IN is at a low level, and when an input IN is at a high level, VSS to OUT. OUT has a high impedance when a clock ϕ is at a low level and a clock $X_\phi$ is at a high level. To nodes of the clocked inverters CINV1 and CINV2 equivalent to ϕ of FIG. 28(*b*), in actuality, ACT is connected as in FIG. 28(*a*), and to an input of the CINV1, AIN is connected, and to an input of the CINV2, BIN is connected.

A latch circuit composed of the transistors N1, N2, and N3 is driven while outputting a signal required in a circuit (bit lines and unillustrated circuits connected thereto) other than the latch circuit by using electrical characteristics of the MOS transistors (4901*a* and 4901*b*) in a first period (effective period) (5001), and giving, in a second period (idle period) (5002) excluding the first period, step waveform voltage (5003*a* and 5003*b*) (referred to as reset pulses or body potential reset pulses) not less than a threshold voltage of the MOS transistors between the gate and source of the MOS transistors (4901*a* and 4901*b*) a predetermined number of times.

Figure 29:
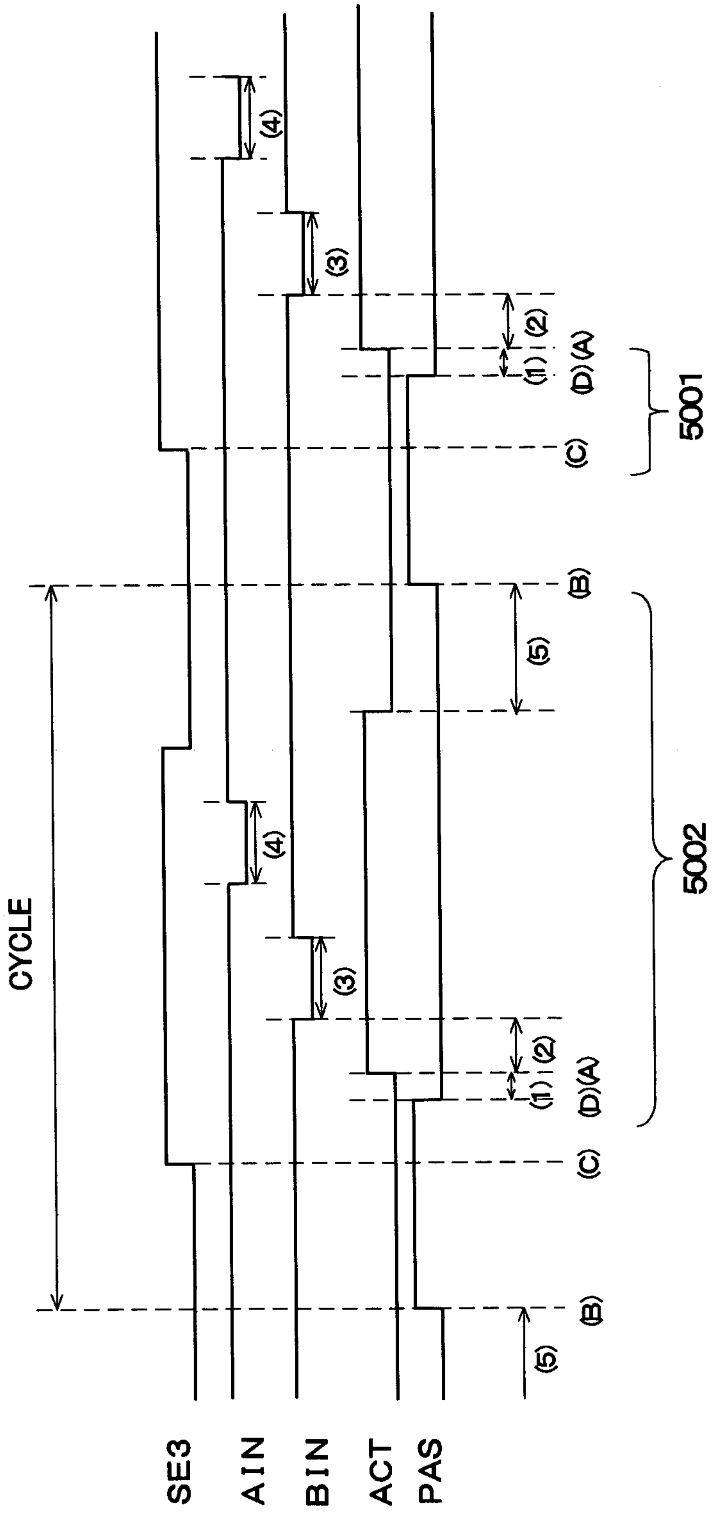
FIG. 29 is a timing chart showing a driving method of a third embodiment of the present invention.

Next, a method for driving this latch-type sense amplifier circuit will be described with reference to FIG. 29.

(1) In a period (1), SE3 is at a high level, and AIN and BIN are at a high level. In addition, PAS is at a low level, and the bit line pair has been disconnected from the sense amplifier.

(2) By raising ACT at the timing (A), the CINV1 and CINV2 start to issue outputs according to inputs AIN and BIN therein, and herein, low levels are outputted according to the inputs (high levels) therein. Accordingly, nodes K, A, and B all become 0V in a period (2).

(3) In a period (3), by giving a lowering pulse to BIN, a rising pulse is applied to the node B. At this time, a lower voltage of the pulse is VSS, while a higher voltage is VRST, and this VRST has been set to a voltage higher than the threshold voltage of the TFTs N1 and N2. In this period (3), to the TFT N1, since the node K is 0V, a pulse (5003*a*) by which VGS thereof is made not less than the threshold voltage is applied, whereby the body potential is reset.

(4) In a period (4), by giving a lowering pulse to AIN, a rising pulse is applied to the node A. At this time, a lower voltage of the pulse is VSS, while a higher voltage is VRST, and this VRST has been set to a voltage higher than the threshold voltage of the TFTs N1 and N2. In this period (4), to the TFT N2, since the node K is 0V, a pulse (5003*b*) by which VGS thereof is made not less than the threshold voltage is applied, whereby the body potential is reset.

(5) In a period (5), SE3 is at a low level, ACT is at a low level, PAS is at a low level and the nodes A, B, and K are all brought into a floating state.

(6) By raising PAS at the timing (B), continuity is provided between the node ODD and node A and between the node EVN and node B, and to the nodes of A and B of the sense amplifier, a voltage difference ΔV between the ODD and EVN to be amplified is given through the bit line pair.

(7) By giving a high level to SE3 at the timing (C), the transistor N3 is turned on, and ΔV is amplified according to lowering of the node K to VSS. In addition, since M03 and 04 are both on at this time, the voltage amplified by the sense amplifier is simultaneously written into the bit line pair ODD (5301*a*) and EVN (5301*b*).

(8) Thereafter, PAS is lowered at the timing (D) to turn off M03 and M04, and the operation returns to (1).

Similar to first embodiment, a positive value of ΔV and a negative value of ΔV necessary at a minimum for stable output were measured by use of the pulse voltage value Vrst as a parameter. As a result, effects the same as those in FIG. 19 obtained in first embodiment were obtained. The reason that such effects are obtained is the same as that in first embodiment.

Moreover, in a case where a circuit is constructed and driven as in the present third embodiment, when carrying out a resetting operation of the body potential, since the latch circuit and bit lines are disconnected by the transmission control section, namely, switches (4905*a* and 4905*b*), a noise (pulse voltages) caused by the body potential reset pulse is not transmitted to the bit lines (5301*a* and 5301*b*). Namely, electricity at the resetting time is reduced by minimizing nodes to which a body potential reset pulse is applied.

Embodiment 4

Figure 30:
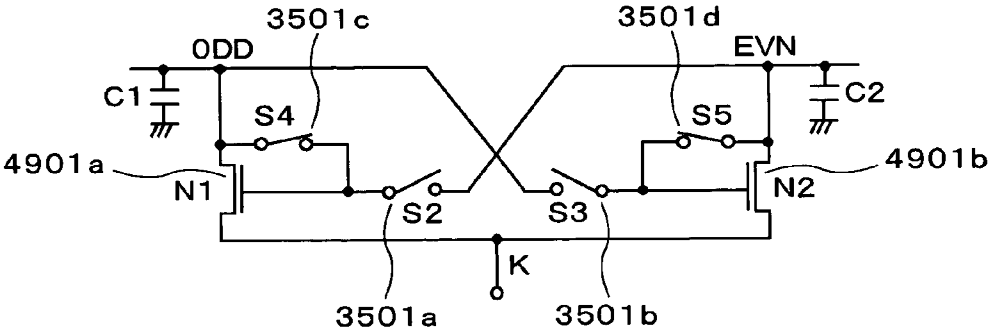
FIG. 30 is a circuit diagram showing a latch circuit of a fourth embodiment of the present invention.

FIG. 30 is a circuit diagram of a latch circuit according to the present embodiment. The present latch circuit comprises a polysilicon TFTs N1 (4901*a*) and N2 (4901*b*) whose sources are connected in common (node K). A gate of the TFT N1 is connected to a drain (node EVN) of N2 via a switch S2 (3501*a*), and is further connected to a capacitance C2. A gate of the TFT N2 is connected to a drain of the transistor N1 via a switch S3 (3501*b*), and is further connected to a capacitance C1. Moreover, a switch S4 (3501*c*) is provided between the drain and gate of the TFT N1, and a switch S5 (3501*d*) is provided between the drain and gate of the TFT N2.

Next, a driving method of the present invention will be described with reference to the flowchart of FIG. 31. The driving method of the present invention is characterized by giving, between the gate and sourse of MOS transistors (4901*a* and 4901*b*), step waveform voltages (5003*a* and 5003*b*) not less than the threshold voltage of these MOS transistors, a predetermined number of times, in a second period (5002) before carrying out a latching operation.

In addition, the driving method of the present invention is characterized by almost simultaneously giving body potential reset pulses to the MOS transistors N1 and N2 in the second period (5002). Therefore, a latch circuit of the present invention is characterized by being of a construction capable of almost simultaneously giving body potential reset pulses to the TFTs N1 and N2.

Figure 31:
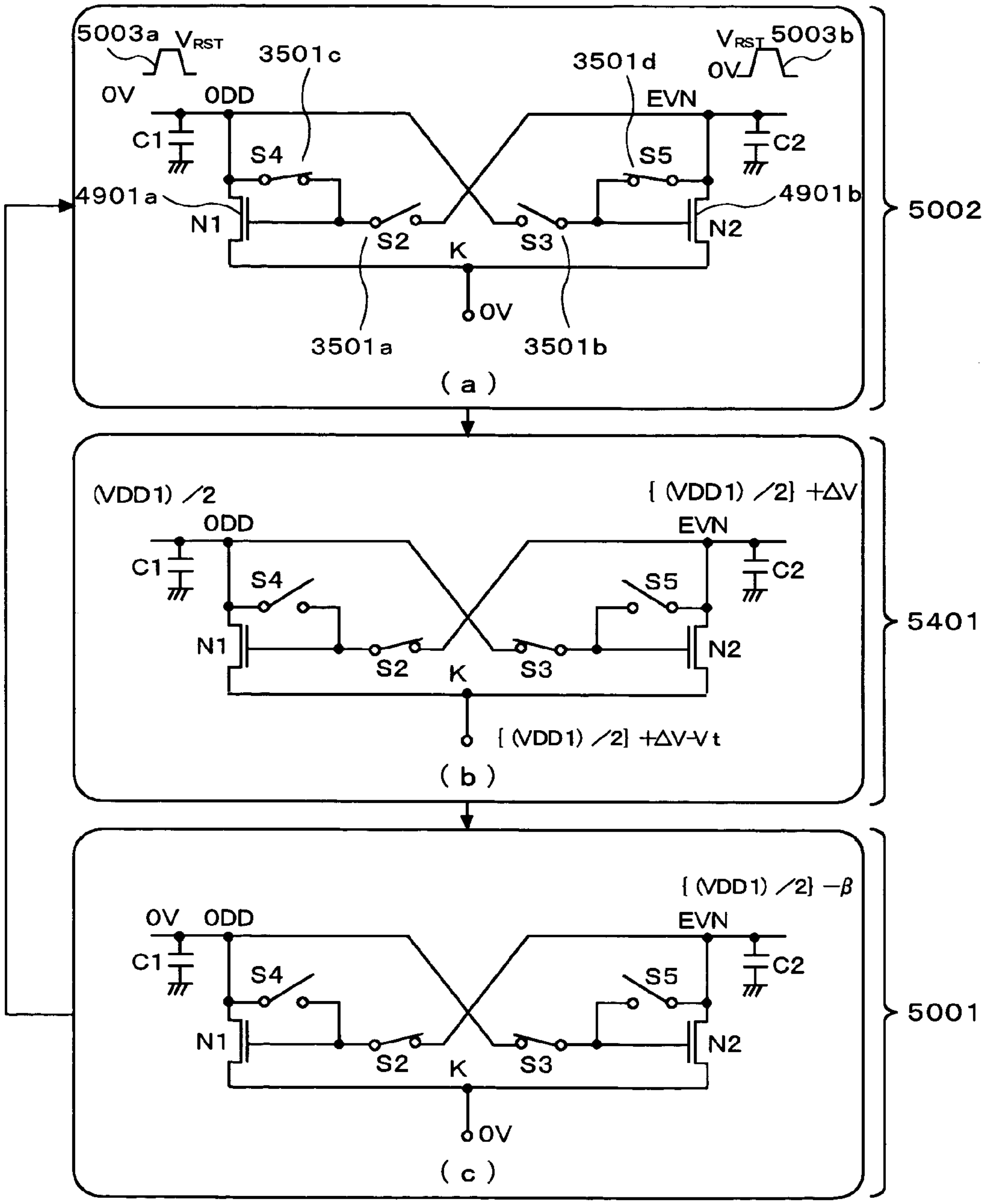
FIG. 31 is a flowchart showing a method for driving a latch circuit of the fourth embodiment of the present invention.

First, as shown in (a) of FIG. 31, the switches S2 and S3 are turned off, the switches S4 and S5 are turned on, and 0V is given to the source of the transistors N1 and N2. Then, a pulse (pulse from 0V to Vrst) (5003*b*) higher in voltage than the threshold voltage of the TFT N2 is given to the node EVN. Thereby, a pulse voltage more than the threshold voltage of the transistor N2 is given between the gate and source of the TFT N2, and body potential of the TFT N2 is reset. Also, simultaneously, at this time, a pulse (pulse from 0V to Vrst) (5003*a*) higher in voltage than the threshold voltage of the TFT N1 is given to the node ODD. Thereby, a pulse voltage more than the threshold voltage of the transistor N1 is applied between the gate and source of the TFT N1, whereby body potential of the TFT N2 is reset.

Next, as shown in (b) of FIG. 31, the switches S2 and S3 are turned on, and the switches S4 and S5 are turned off. In addition, the node ODD is provided as (VDD1)/2, while the node EVN is provided as (VDD1)/2+ΔV, whereby a potential difference ΔV is given between the nodes EVN and ODD. At this time, a source node (node K) of the transistors N1 and N2 connected in common is brought into a floating state or is supplied with a voltage high enough but not to an extent to turn on the transistors N1 and N2. In the drawing, a voltage value in a case of a floating state is shown. Herein, as an example, the threshold voltage of the transistors N1 and N2 is provided as Vt, and a voltage value where ΔV is positive is shown.

Next, as shown in (c) of FIG. 31, an amplifying operation is started by lowering the common source (node K) between the transistors N1 and N2 to 0V, the potential difference given in (b) of FIG. 31 is amplified by a difference in conductance between the TFTs N1 and N2, and reaches a latched condition where the lower node potential had been provided in (b) of FIG. 31 has been lowered to 0V, while the higher node potential has been scarcely lowered, at {(VDD1)/2−β}. β has been described in FIG. 6.

Then, when an amplifying and latching operation are to be carried out in succession hereto, the same operations are repeated in (a) of FIG. 31 again.

By giving, before carrying out a latching operation, the gate electrodes of the TFTs N1 and N2 pulses (which are referred to as body potential reset pulses) to make VGS of these exceed the threshold voltage, unevenness in characteristics between the TFTs N1 and N2 that has occurred owing to operation histories can be corrected. And, consequently, it becomes possible to amplify ΔV without malfunction even when ΔV given to the latch circuit is small, which allows a normal latching operation.

By using the circuit and driving method of the present embodiment, similar to first embodiment, an effect that the width of the unstable region of the latch circuit is narrowed can be obtained. Thus, for the same reason as that in first embodiment, similar effects can be obtained in the present embodiment as well.

In addition, by using the circuit of the present embodiment, since cross-linking of the latch circuit is released in a period for resetting body potential, it becomes possible to simultaneously reset the two MOS transistors N1 and N2. Thereby, it becomes possible to shorten the time required for resetting body potential, and moreover, speedup of the circuit and system as a whole using this circuit can be realized.

Fifth Embodiment

Figure 32:
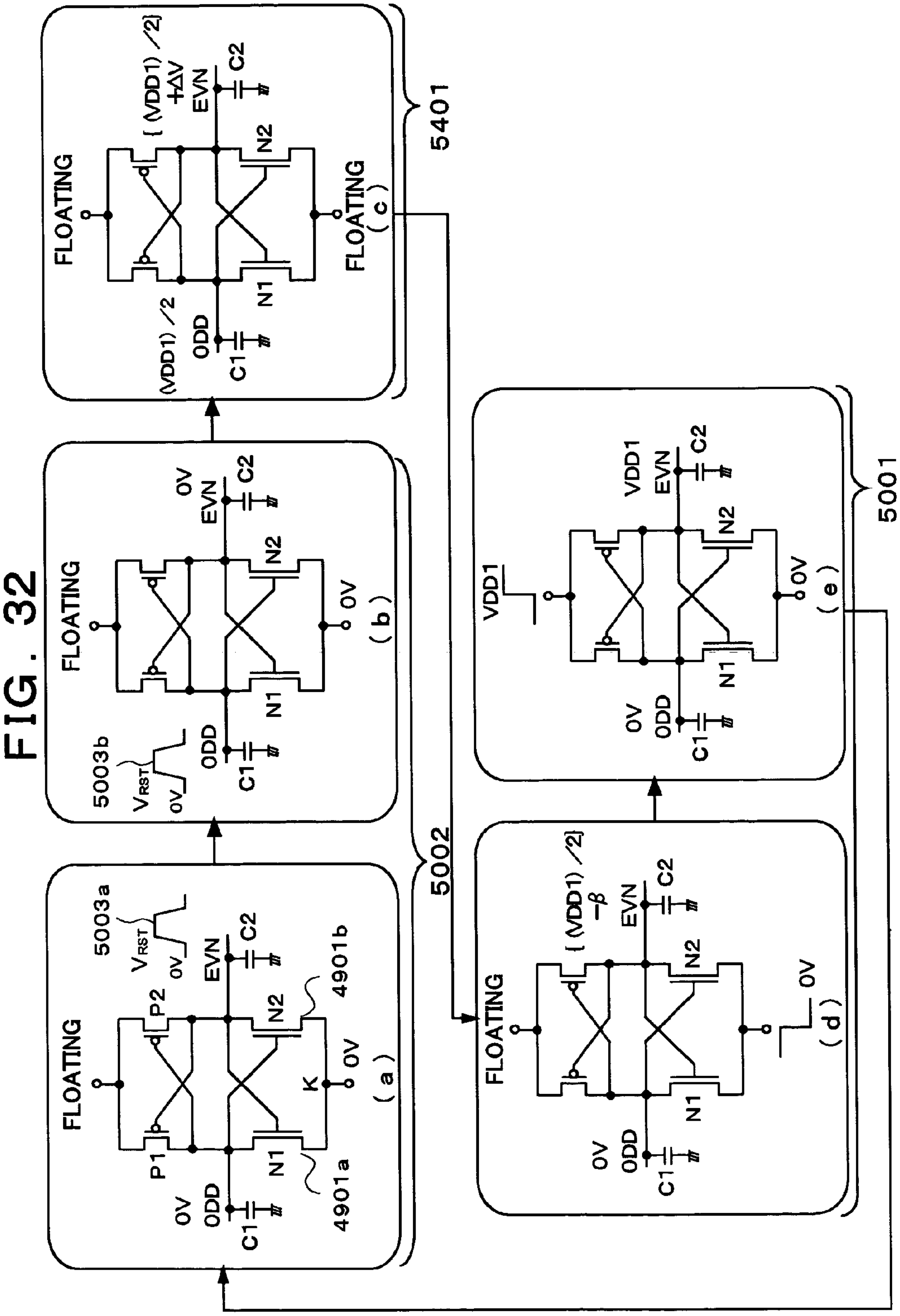
FIG. 32 is a flowchart showing a method for driving a latch circuit of a fifth embodiment of the present invention.

FIG. 32 is a flowchart showing fifth embodiment of a method for driving a latch circuit of the present invention. The latch circuit for describing the present embodiment is a circuit where the latch circuit (FIG. 16) described in first embodiment is composed of CMOS (Complementary Metal Oxide Semiconductor).

The present latch circuit comprises, as shown in (a) of FIG. 32, n-channel polysilicon TFTs N1 (4901*a*) and N2 (4901*b*) whose sources are connected (node K) in common. A gate of the TFT N1 is connected to a drain (node EVN) of the transistor N2, and is further connected to a capacitance C2. A gate of the TFT N2 is connected to a drain (node ODD) of the transistor N1, and is further connected to a capacitance C1.

Furthermore, p-channel TFTs are used to construct a complementary circuit, which is connected to nodes EVN and ODD. Namely, it comprises p-channel polysilicon TFTs P1 and P2 whose sources are connected in common. A gate of the TFT P1 is connected to a drain of the transistor P2, and is further connected to a capacitance C2. A gate of the TFT P2 is connected to a drain of the transistor P1, which is further connected to a capacitance C1.

Next, a driving method will be described in detail. The driving method of the present invention is characterized by giving body potential reset pulses (5003*a* and 5003*b*) to the TFTs N1 and N2 before carrying out a latching operation.

(a) to (d) of FIG. 32 are the same as those in first embodiment, and by carrying out (d) of FIG. 32, provided is a condition, similar to first embodiment, where the node to which a lower potential had been provided in (b) of FIG. 32 has been lowered to 0V, while the higher node potential has been scarcely lowered, for example, at {(VDD1)/2−β}, thus the amplification by the n-channel TFTs is completed and reaches a condition latched by the n-channel TFTs. Here, β is identical to that described in FIG. 6.

However, in the period from (a) to (d) of FIG. 32, the source of the transistors P1 and P2 is brought into a floating state or is supplied with a voltage low enough but not to an extent to turn on the transistors P1 and P2.

Next, as shown in (e) of FIG. 32, as a result of raising the common source between the transistors P1 and P2 to, for example, VDD1, a potential difference which has been latched in (d) of FIG. 32 is amplified by a difference in conductance between the TFTs P1 and P2, and a higher potential node which has been latched in (d) of FIG. 32 is raised to VDD1, while the lower node potential remains 0V. Thereby, the amplifying and latching operation by the n-channel and p-channel TFTs is completed.

Namely, in the present embodiment, an amplifying and latching operation is carried out, in accordance with (d) and (e) of FIG. 32, by the n-channel and p-channel TFTs. Then, when an amplifying and latching operation are to be carried out in succession hereto, the same operations are repeated in (a) of FIG. 32 again.

Next, effects of the present embodiment will be described based on experimental results.

Figure 33:
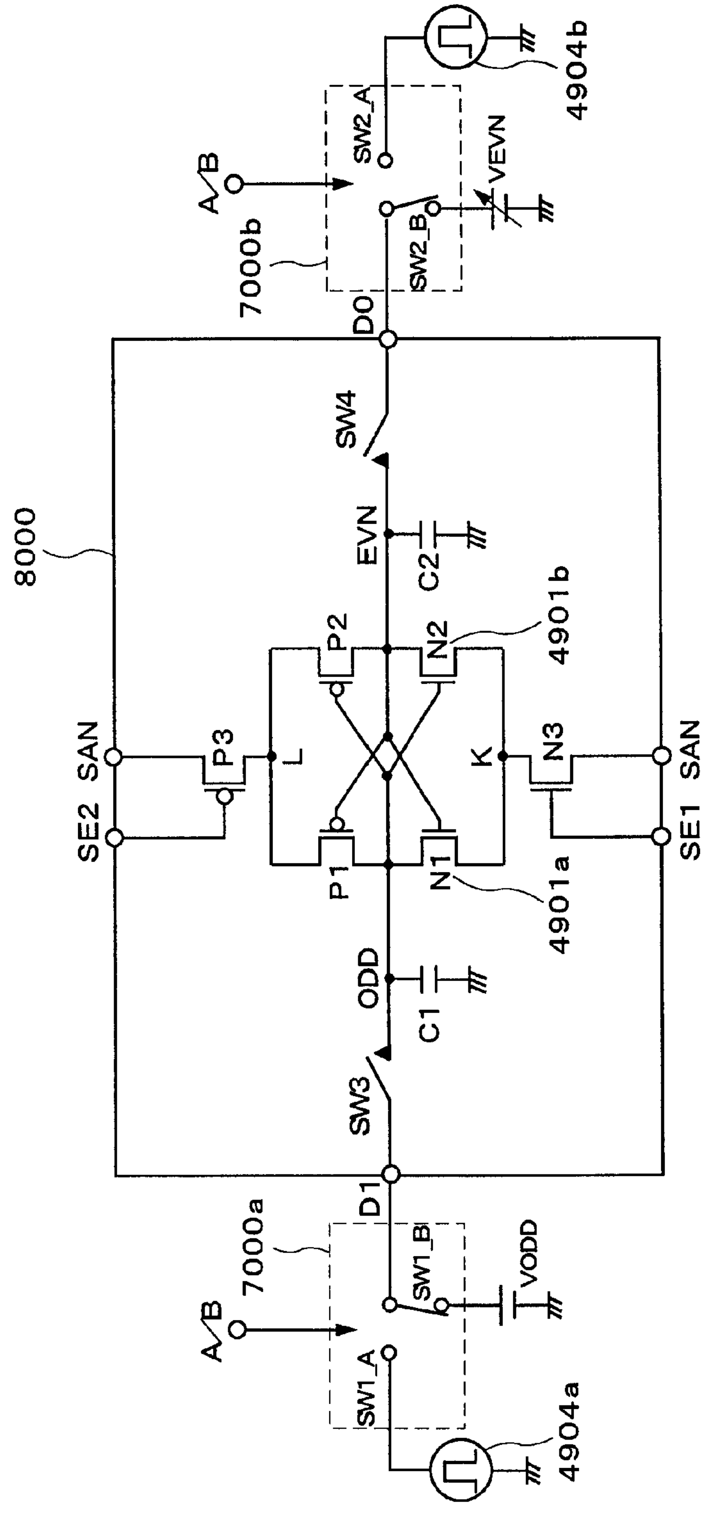
FIG. 33 is an experimental circuit for confirming effects of the fifth embodiment.

FIG. 33 is a circuit diagram showing an experimental circuit to evaluate a latch-type sense amplifier. A latch circuit 8000 enclosed by a square is a latch circuit composed of polysilicon TFTs on a glass substrate, which is also used for a sense amplifier of a memory circuit. Transistors N1 and N2 are n-channel polysilicon TFTs, and a transistor N3 is an n-channel polysilicon TFT to turn on and off a section between the source of the transistors N1 and N2 and a SAN node connected to a ground electrode. Transistors P1 and P2 are p-channel polysilicon TFTs, and a transistor P3 is a p-channel polysilicon TFT to turn on and off a section between the source of the transistors P1 and P2 and an SAP node connected to a power supply VDD (herein, voltage thereof is provided as VDD1) in accordance with a signal SE2.

The node ODD and node EVN are, in a memory circuit, equivalent to nodes to which a bit line pair is connected, and capacitances C1 and C2 are connected thereto in place of bit line capacitances. To the node EVN, a selector switch (7000*b*) is connected via a switch SW4. This selector switch is controlled by a control signal "A/B," wherein a node D0 and SW2_A have continuity where "A" is at a high level, and the node D0 and a variable voltage supply VEVN have continuity where "A" is at a low level. To the SW2_A terminal, a pulse voltage generator Vrst2 is connected.

To the node ODD, a selector switch (7000*a*) is connected via a switch SW3. This selector switch is controlled by a control signal "A/B," wherein a node D1 and SW1_A have continuity where "A" is at a high level, and the node D1 and a fixed voltage supply VODD have continuity where "A" is at a low level. To the SW1_A terminal, a pulse voltage generator Vrst1 is connected.

The variable voltage supply VEVN, fixed voltage source VODD, and switches (SW3 and SW4) are provided for giving ΔV that is originally read out from a memory cell to the latch-type sense amplifier circuit.

Next, a method for driving this latch-type sense amplifier circuit will be described with reference to FIG. 34.

(Period C) With the switches SW3 and SW4 on and SE1 high in level, the transistor N3 is turned on, and with SE2 high in level, the transistor P3 is turned off, and with SAN at 0V and SAP at VDD1, 0V is given to the source of the transistors N1 and N2. On the other hand, with A/B high in level, D0 and D1 are connected with pulse generators, and Vrst1 and Crst2 are both provided as 0V. Namely, 0V is given to the nodes EVN and ODD.

(Period D) A pulse with a pulse voltage value of Vrst is outputted from Vrst2. Thereby, a pulse with a pulse voltage value of Vrst is applied between the gate and source of N1.

(Period F) A pulse with a pulse voltage value of Vrst is outputted from Vrst1. Thereby, a pulse with a pulse voltage value of Vrst is applied between the gate and source of the transistor N2.

(Period J) With SE1 low in level, the transistor N3 is turned off, with SE2 high in level, the transistor P3 is turned off and with SE2 high in level, the transistor P3 is turned off, and the switches SW3 and SW4 are turned on. On the other hand, with A/B low in level, D0 is connected with VEVN, and D1 is connected with VODD. VODD is provided as (VDD1)/2 as its voltage, and VEVN is provided as {(VDD1)/2+ΔV} as its voltage, whereby a potential difference of ΔV is given to the sense amplifier. Thereafter, by turning off the switches SW3 and SW4, these voltages are sampled in C2 and C1, respectively.

(Period L) With the switches SW3 and SW4 off and SE1 high, the source potential of the transistors N1 and N2 is lowered to 0V.

(Period M) With SE1 high and SE2 low, the transistor P3 is turned on, and the source potential of the transistors P1 and P2 is raised to VDD1.

(Period N) After latching for a time required, SE1 is set to a low level to turn off the transistor N3, and then SE2 is set to a high level to turn off the transistor P3, and the operation shifts to Period A.

(Period B) SE1 is set to a high level to turn on the transistor N3, and 0V is given to the source of the transistors N1 and N2. In addition, A/B is set to a high level to connect D0 and D1 with pulse generators, and Vrst1 and Vrst2 are both provided as 0V.

Then, operations are repeated in Period C again.

Monitoring the voltages of the node ODD and node EVN allows to find out at what voltage or more of the sense amplifier circuit sensitivity, that is, the absolute value of ΔV, the output is stabilized.

A positive value of ΔV and a negative value of ΔV necessary at a minimum for stable output were measured by use of the pulse voltage value Vrst as a parameter.

Figure 35:
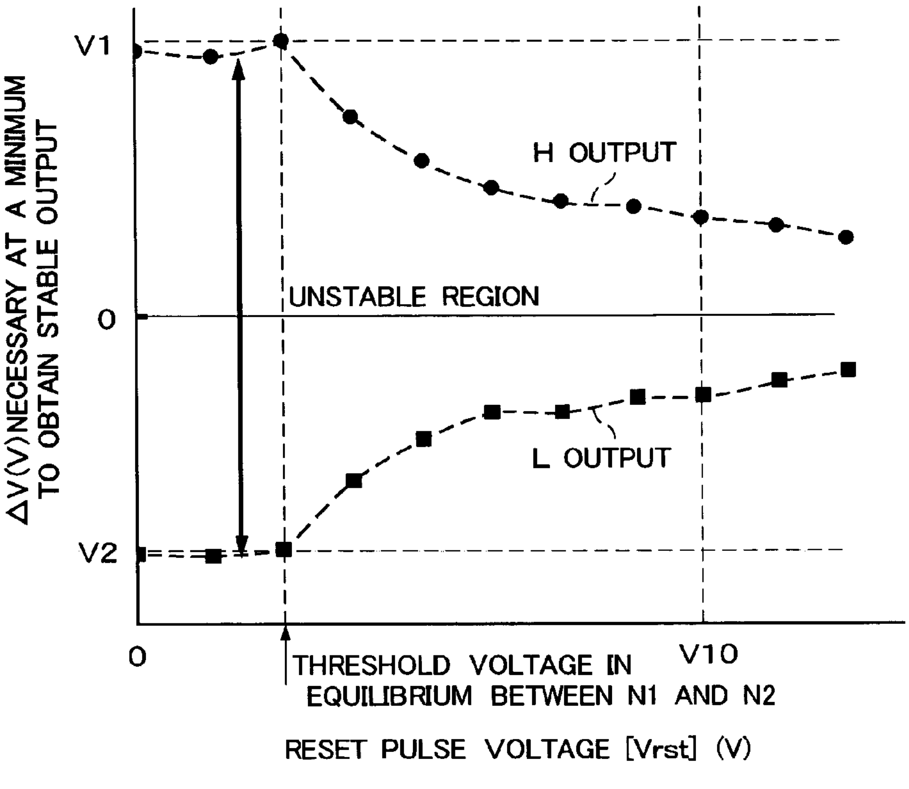
FIG. 35 is a graph of actual measurement values showing a relationship between a reset pulse voltage obtained in the fifth embodiment of the present invention and ΔV necessary at a minimum to obtain a stable output.

Experimental results are shown in FIG. 35. According to FIG. 35, similar to FIG. 19, although the unstable region is large when the body potential reset pulse voltage is low, there is a tendency that the unstable region becomes smaller in proportion to a rise in the body potential reset pulse voltage. In particular, the effects are prominent when the body potential reset pulse voltage is raised above the threshold voltages of TFTs N1 and N2.

An unstable region when a conventionally known normal driving method was applied to the present latch circuit is, as already shown in FIG. 12 (data of VDD=VDD1), V2<ΔV<V1, and the width (V1−V2) of the unstable region is large to the same extent as that when the body potential reset pulse voltage is 0.

On the other hand, in the graph of FIG. 35, the width of the unstable region when, for example, the reset pulse is V10 becomes approximately ⅓ relative to (V1−V2) in the case of the conventional driving method, wherein a substantial reduction can be recognized. Thereby, it is understood that the present embodiment also provides effects similar to those of the aforementioned embodiments.

Namely, by giving step waveform voltages (5003*a* and 5003*b*) (referred to as reset pulses or body potential reset pulses) not less than the threshold voltage of the MOS transistors between the gate and source of the MOS transistors (4901*a* and 4901*b*) a predetermined number of times for driving, the unstable region of the latch circuit is reduced.

Also, in a case of this driving method, similar to first embodiment, no current flows between the drain and source even when the body potential reset pulse is given to the gate to turn on the MOS transistor. Therefore, there is also an effect such that electricity resulting from the body potential resetting operation is small.

Also, in a case of this driving method, similar to first embodiment, for the period where body potential reset pulses are given to the gates, in addition to that the source potential is 0V, the drain voltage is also provided as 0V. Accordingly, electrons that are necessary to eliminate positive holes accumulated in the body can be easily supplied from both the source and drain, thus potential of the body can be effectively lowered.

Therefore, in the present embodiment as well, effects of the present invention can be obtained for the same reason as that in first embodiment. Effects of the present embodiment and the reason therefor are as follows.

By carrying out an amplifying and latching operation in a latch circuit composed of n-channel MOS transistors prior to carrying out an amplifying and latching operation in a latch circuit composed of p-channel MOS transistors, ΔV is amplified to approximately {(VDD1)/2−β} in this example. Accordingly, when an amplifying and latching operation is carried out in a latch circuit composed of p-channel MOS transistors in succession hereto, a sufficient voltage difference has been already given between the nodes EVN and ODD. Therefore, no malfunction occurs even when no body potential reset pulses are given to the p-channel MOS transistors P1 and P2.

Although a driving method for activating a latch circuit part composed of n-channel MOS transistors earlier has been shown in the present embodiment, a latch circuit part composed of p-channel MOS transistors may be activated earlier. In this case, it is sufficient to apply a body potential reset drive such as to apply a VGS voltage to the p-channel MOS transistors P1 and P2 so that a gate-source voltage |VGS| of the p-channel MOS transistors becomes not less than the threshold voltage of these MOS transistors.

Here, when, without applying this driving method, the latch circuit part composed of p-channel MOS transistors was activated earlier, a wide unstable region was measured, as had been expected.

In the present embodiment, although a description has been given of polysilicon TFTs as MOS transistors composing a circuit, for example, similar effects can be obtained by amorphous silicon TFTs and MOS transistors such as MOS transistors using microcrystalline silicon in an intermediate state between polysilicon and amorphous silicon as channels and SOI MOS transistors using crystalline silicon as channels.

Sixth Embodiment

Figure 36:
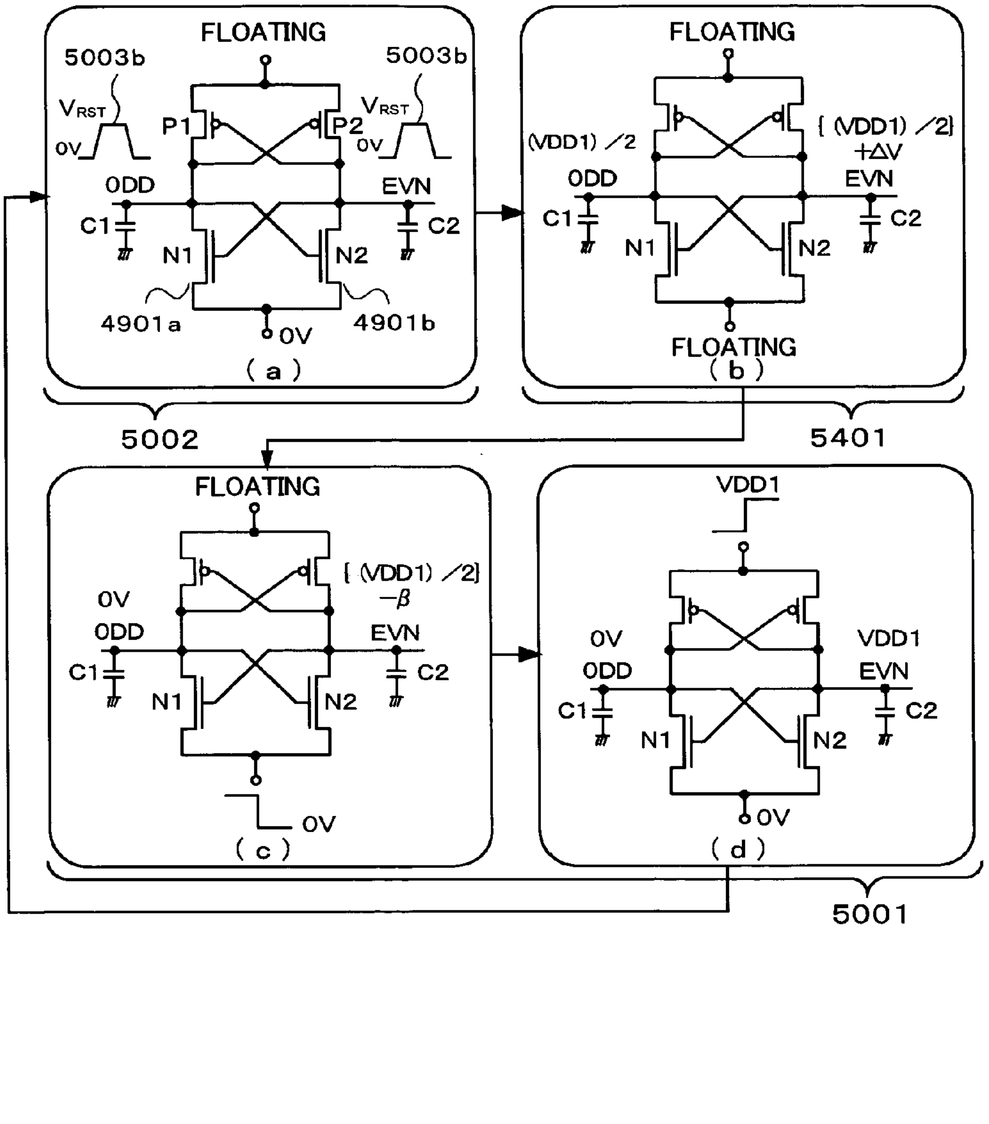
FIG. 36 is a flowchart showing a method for driving a latch circuit of a sixth embodiment of the present invention.

FIG. 36 is a flowchart showing a method for driving a latch circuit according to sixth embodiment of the present invention. The latch circuit is provided as a circuit the same as (a) of FIG. 32 described in fifth embodiment, wherein the driving method has been changed.

A driving method of the present invention is characterized by giving body potential reset pulses to the TFTs N1 and N2 almost simultaneously (5002) before carrying out a latching operation (5001).

First, as shown in (a) of FIG. 36 (Period 5002), while applying 0V to the source of the transistor N1 (4901*a*) and transistor N2 (4901*b*) and providing the source of the transistor P1 and P2 in a floating state or at a voltage low enough but not to an extent to turn on the transistors P1 and P2, pulses (5003*a* and 5003*b*) higher in voltage than the threshold voltage of the transistors N1 and N2 are given to the node EVN and node ODD.

Next, as shown in (b) of FIG. 36 (Period 5401), a potential difference ΔV is given to the nodes EVN and ODD by providing the node ODD as (VDD1)/2 and the node EVN as (VDD1)/2+ΔV, and voltages of the respective nodes are sampled in capacitances C1 and C2. At this time, the source node of the transistors N1 and N2 is brought into a floating state or is supplied with a voltage high enough but not to an extent to turn on the transistors N1 and N2. Likewise, the source node of the transistors P1 and P2 is brought into a floating state or is supplied with a voltage low enough but not to an extent to turn on the transistors P1 and P2.

Next, as shown in (c) of FIG. 36, by lowering the common source between the transistors N1 and N2 to 0V, the potential difference given in (b) of FIG. 36 is amplified by a difference in conductance between the TFTs N1 and N2, and the amplification by n-channel TFTs is completed in a state where the lower node potential had been given in (b) of FIG. 36 has been lowered to 0V, while the higher node potential has been scarcely lowered, for example, at {(VDD1)/2−β}, and thus reaches a latched condition. β has been described in FIG. 6.

Next, as shown in (d) of FIG. 36, by raising the common source between the transistors P1 and P2 to, VDD1, the potential difference which has been latched in (c) of FIG. 36 is further amplified by a difference in conductance between the TFTs P1 and P2, and in a condition where the higher potential node which has been latched in (c) of FIG. 36 has been raised to VDD, while the lower node potential remains 0V, the amplifying and latching operation by the n-type and p-type TFTs is completed.

Since a signal has been latched in these period 5001 shown in (c) and (d) of FIG. 36, the period becomes a period (effective period) (5001) in which an effective signal is being outputted. This signal is to be utilized in an unillustrated circuit.

Then, when an amplifying and latching operation are carried out in succession hereto, the same operations are repeated beck in (a) of FIG. 36 again.

By simultaneously giving, before carrying out an amplifying and latching operation, the gate electrodes of the TFTs N1 and N2 pulses (which are referred to as body potential reset pulses) to make VGS of these exceed the threshold voltage, unevenness in characteristics between the TFTs N1 and N2 that has occurred owing to operation histories can be corrected. And, consequently, it becomes possible to amplify ΔV without malfunction even when ΔV given to the latch circuit is small, which allows a normal latching operation.

Effects of the present embodiment will be described based on experimental results.

Figure 37:
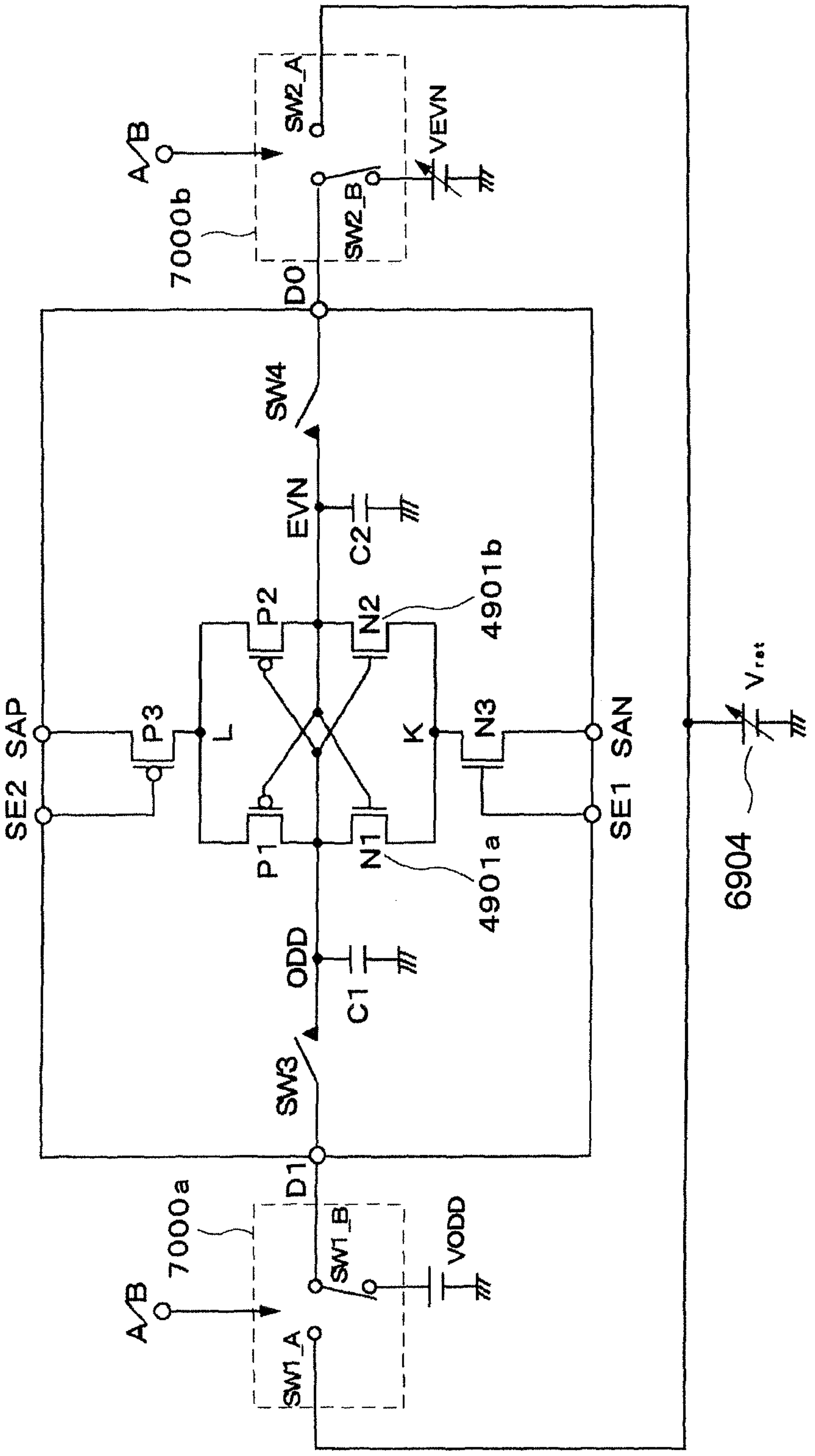
FIG. 37 is an experimental circuit for confirming effects of the sixth embodiment.

FIG. 37 is an experimental circuit to evaluate a latch-type sense amplifier. A latch circuit composed of polysilicon TFTs on a glass substrate is the same as the circuit of FIG. 33 used in fifth embodiment. This is different from FIG. 33 in that an SW2_A terminal and an SW1_A terminal are connected to each other, and furthermore, a variable voltage source Vrst (6904) is further connected.

Figure 38:
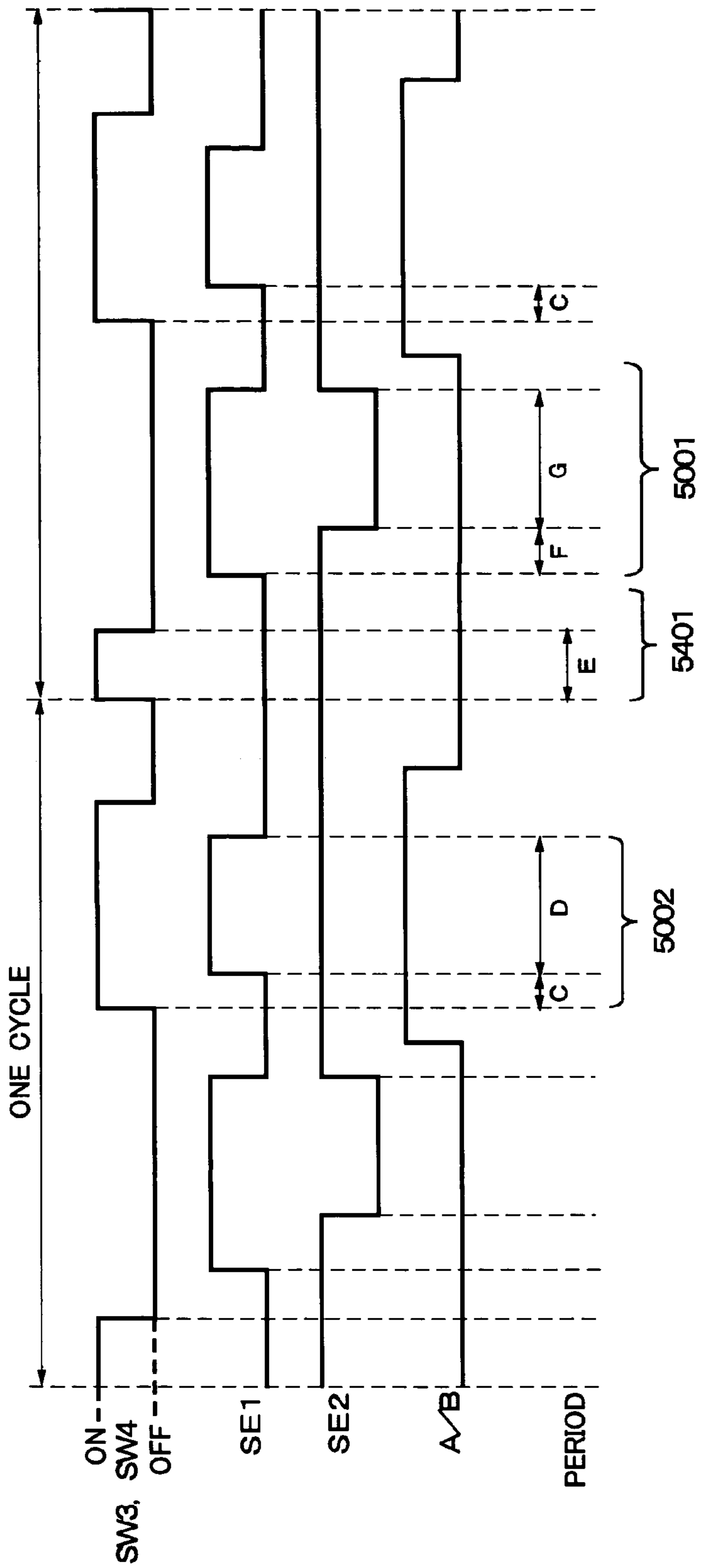
FIG. 38 is a timing chart showing a driving method of the sixth embodiment of the present invention.

Next, a method for driving this latch-type sense amplifier circuit will be described with reference to FIG. 38.

(Period C) With the switches SW3 and SW4 on and A/B high in level, D0 and D1 are connected with the voltage source Vrst. At this time, a voltage Vrst is given to the node ODD and node EVN. On the other hand, and with SE1 low in level, the transistor N3 is turned off, with SE2 high in level, the transistor P3 is turned off, and SAN is provided as 0V, and SAP is provided as VDD1. Although Vrst is applied to the node EVN and node ODD, since the transistor N3 is off, a voltage that is lower than Vrst by the threshold voltage of the transistors N1 and N2 appears at the source of the transistors N1 and N2. Nevertheless, this never becomes lower than 0V. Namely, VGS of the transistors N1 and N2 is nearly equal to the threshold voltage Vt or a value not more than the same.

(Period D) SE1 becomes high in level, the transistor N3 is turned on, and the source between the transistors N1 and N2 are lowered to 0V. Then, a voltage of Vrst is applied to VGS of the transistors N1 and N2 (5002).

(Period E) With SE1 low in level, the transistor N3 is turned off, and with SE2 high in level, the transistor P3 is turned off. In addition, with SW3 and SW4 on and A/B low in level, D0 is connected with VEVN, and D1 is connected with VODD. VODD is provided as (VDD1)/2, and VEVN is provided as {(VDD1)/2+ΔV}, whereby a potential difference of ΔV is given to the sense amplifier. Thereafter, by turning off SW3 and SW4, the given voltages are sampled in C2 and C1, respectively.

(Period F) With the switches SW3 and SW4 off, SE1 is set to a high level, and the source potential of the transistors N1 and N2 is lowered to 0V.

(Period G) With SE1 high in level and SE2 low in level, the transistor P3 is turned on, and the source potential of the transistors P1 and P2 is raised to VDD1.

Since a signal has been latched in these periods F and G, these periods become a period (effective period) (5001) in which an effective signal is being outputted. This signal is to be utilized in an unillustrated circuit.

Then, operations are repeated in Period C again.

Monitoring the voltages of the node ODD and node EVN allows to find out at what voltage or more of the sense amplifier circuit sensitivity, that is, the absolute value of ΔV, the output is stabilized.

A positive value of ΔV and a negative value of ΔV necessary at a minimum for stable output were measured by use of the pulse voltage value Vrst as a parameter.

Similar to the embodiments so far, although the unstable region is large when the reset voltage is low, there is a tendency that the unstable region becomes smaller in proportion to a rise in the reset voltage. In particular, the effects are prominent when the reset voltage is raised above the threshold voltage in equilibrium between the TFTs N1 and N2.

An unstable region when a conventionally known normal driving method is applied to the present latch circuit is, as already shown in FIG. 12 (data of VDD=VDD1), V2<ΔV<V1, and the width (V1−V2) thereof is large to the same extent as that when the body potential reset pulse voltage is 0.

On the other hand, the width of the unstable region when, for example, the reset pulse is V10 similar to the embodiments so far becomes ⅕ or less relative to (V1−V2) in the case of the conventional driving method, wherein a substantial reduction could be recognized.

In addition, in a case of this driving method, since the transistors N1 and N2 are simultaneously reset, it becomes possible to shorten the time required for resetting, and moreover, speedup of the circuit and system as a whole using this circuit can be realized.

Seventh Embodiment

Although an example where VDS of the MOS transistors to which body potential reset pulses were given was 0 and no drain current flowed has been shown in fifth embodiment, an example where a drain current flows will be described in the present seventh embodiment.

Figure 39:
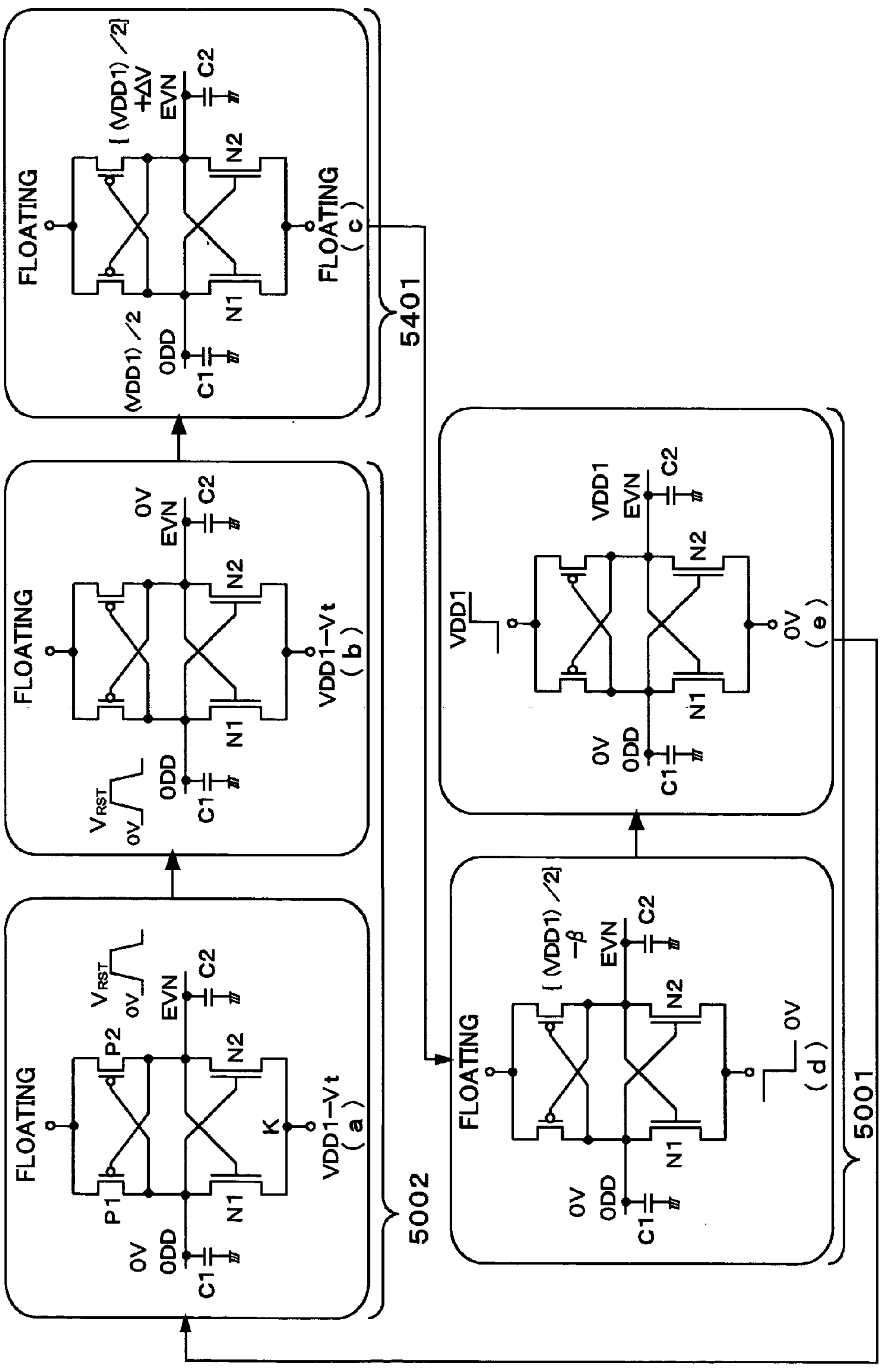
FIG. 39 is a flowchart showing a method for driving a latch circuit of a seventh embodiment of the present invention.

FIG. 39 is a flowchart showing a driving method of the present embodiment. This is different from FIG. 32 in that (VDD1−Vt)V is given to a node K in a period where a body potential reset pulse is being given, so that a drain current flows to a MOS transistor to which the body potential reset pulse is being inputted. Namely, the only difference is in that (VDD1−Vt)V is given to the node K in (a) and (b) of FIG. 39 of the present embodiment although 0V is given to the node K in (a) and (b) of FIG. 32. The driving method is the same as that of FIG. 32 in other aspects.

Next, effects of the present invention will be described based on experimental results.

As, an experimental circuit for evaluating a latch-type sense amplifier, FIG. 33 shown in fifth embodiment was used.

Figure 34:
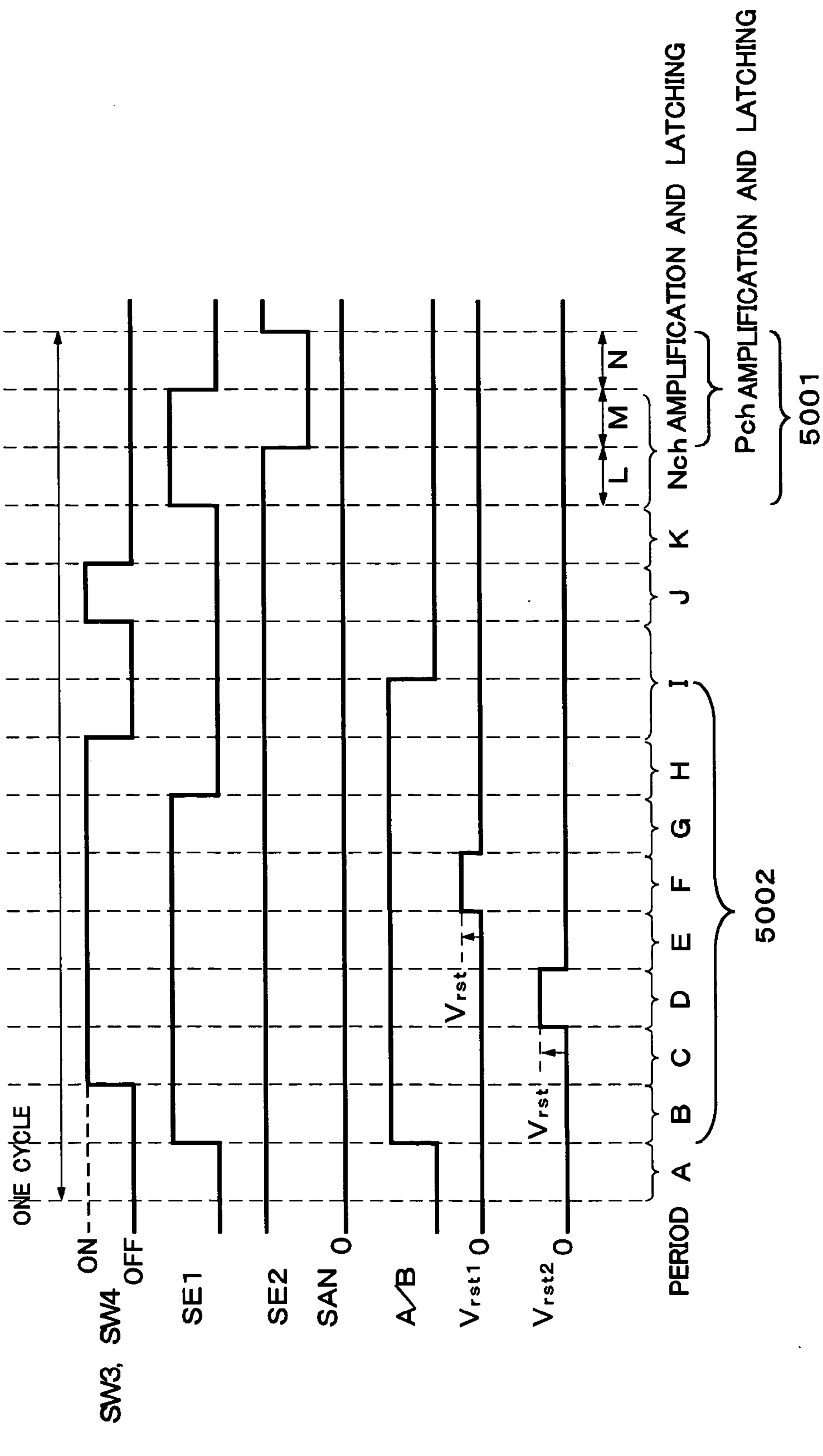
FIG. 34 is a timing chart showing a driving method of the fifth embodiment of the present invention.

Driving was based on the timing chart of FIG. 34 except for the potential of the node K within a body potential resetting period.

Similar to the embodiments so far, a positive value of ΔV and a negative value of ΔV necessary at a minimum for stable output were measured by use of the pulse voltage value Vrst as a parameter.

As a result, similar to the embodiments so far, although the unstable region is large when the body potential reset pulse voltage is low, effects were prominent when a body potential reset pulse voltage was raised and the pulse voltage was made higher than the threshold voltage in equilibrium between the TFTs N1 and N2.

An unstable region when a conventionally known normal driving method is applied to the present latch circuit is V1−V2, which is large to the same extent as that when the body potential reset pulse voltage is 0.

On the other hand, the width of the unstable region when, for example, the reset pulse is V10 similar to the embodiments so far becomes ⅕ or less relative to (V1−V2) in the case of the conventional driving method, wherein a substantial reduction could be recognized.

Eighth Embodiment

Herein, description will be given of a circuit example for concretely realizing a driving method of eighth embodiment.

Figure 40:
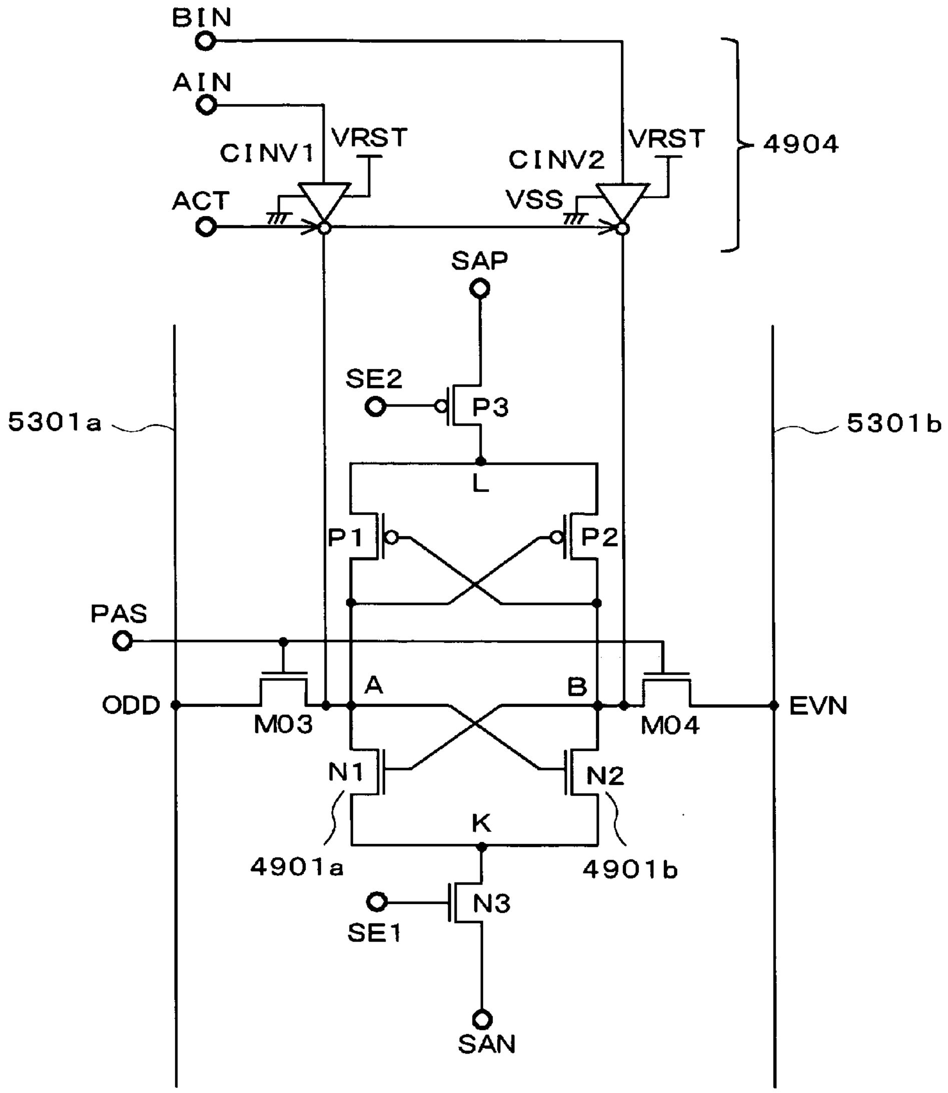
FIG. 40 is a circuit diagram of a latch-type sense amplifier of an eighth embodiment of the present invention.

FIG. 40 shows a circuit diagram of a latch-type sense amplifier circuit of the present embodiment. Three p-type polysilicon TFTs P1, P2, and P3 have been added to the circuit of FIG. 28, signals of SE2 to give potential to the transistor P3 and SAP (to give a potential of VDD1, for example) have been added. These added p-type polysilicon TFTs form a complementary latch circuit with the latch circuit composed of n-channel polysilicon TFTs and are connected to the nodes A and B. Namely, sources of the transistors P1 and P2 are connected in common, a gate of the transistor P1 is connected to a drain of the transistor P2, and is connected to the node B. In addition, a gate of the transistor P2 is connected to a drain of the transistor p1, and is connected to the node A.

Figure 41:
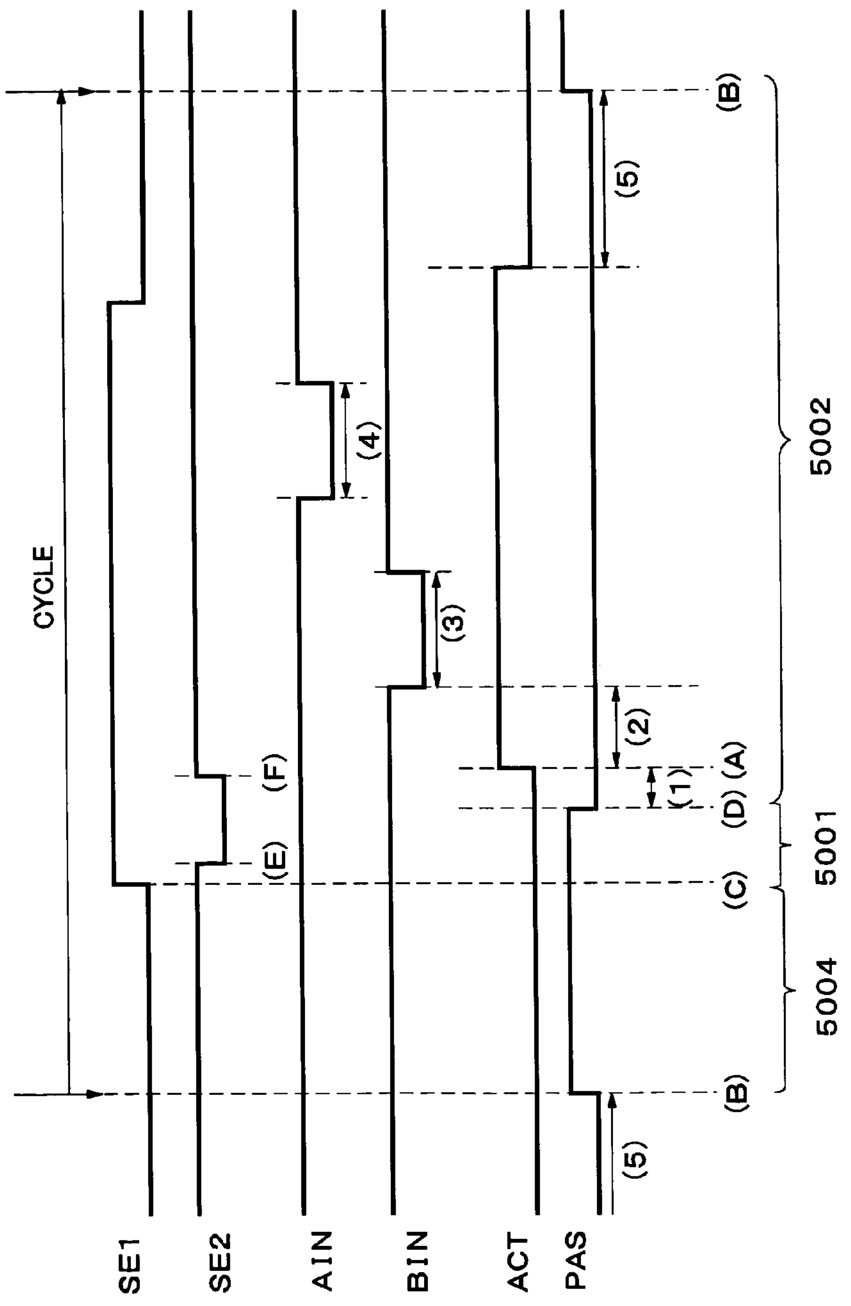
FIG. 41 is a timing chart showing a driving method of the eighth embodiment of the present invention.

Next, with reference to FIG. 41, a method for driving this latch-type sense amplifier circuit will be described. This is different from the timing chart of FIG. 29 in that a signal of SE2 to control the transistor P3 has been added to the inside of the timing chart.

(1) In a period (1), SE1 is at a high level. SE2 rises from a low level to a high level at the timing (F). At this time, the latch circuit has been latching a low-level signal at a low impedance, and a high-level signal has been latched at a high impedance. On the other hand, AIN and BIN are at a high level, and PAS becomes low in level at the timing (D). Accordingly, the bit line pair ODD and EVN has been disconnected from the latch circuit.

(2) By raising ACT at the timing (A), the CINV1 and CINV2 start to issue outputs according to inputs AIN and BIN therein, and herein, low levels are outputted according to the inputs therein. Accordingly, nodes K, A, and B all become 0V in a period (2).

(3) In a period (3), by giving a lowering pulse to BIN, a rising pulse is applied to the node B. At this time, a lower voltage of the pulse is VSS, while a higher voltage is VRST, and this VRST has been set to a voltage higher than the threshold voltage of the polysilicon TFTs N1 and N2. In this period (3), to the polysilicon TFT N1, a pulse by which VGS thereof is made not less than the threshold voltage is applied, whereby the body potential is reset.

(4) In a period (4), by giving a lowering pulse to AIN, a rising pulse is applied to the node A. At this time, a lower voltage of the pulse is VSS, while a higher voltage is VRST, and this VRST has been set to a voltage higher than the threshold voltage of the polysilicon TFTs N1 and N2. In this period (4), to the polysilicon TFT N2, a pulse by which VGS thereof is made not less than the threshold voltage is applied, whereby the body potential is reset.

(5) In a period (5), SE1 is at a low level, SE2 is at a high level, ACT is at a low level, PAS is at a low level, and the nodes A, B, K and L are all brought into a floating state.

(6) By raising PAS at the timing (B), continuity is provided between the node ODD and node A and between the node EVN and node B, and to the nodes of A and B of the sense amplifier, a voltage difference ΔV to be amplified is given through the bit line pair.

(7) Thereafter, the transistor N3 is turned on by giving a high level to SE1 at the timing (C), and ΔV is amplified according to lowering of the node K to VSS. Furthermore, P3 is turned on by giving a low level to SE2 at the timing (E), and ΔV is further amplified according to lowering of the node L to VDD1. In addition, at this time, since M03 and M04 are both on, the voltage amplified by the sense amplifier is simultaneously written into the bit line pair.

(8) Thereafter, PAS is lowered at the timing (D) to turn off M03 and M04, and the operation returns to (1).

A period (5001) from the timing (C) to (D) is a period where the latch circuit is outputting an amplified and latched voltage, and this signal is transmitted to the bit lines (5301*a* and 5301*b*).

A period (5002) from the timing (D) to (B) is a period where the latch circuit is disconnected from the bit lines and an output from the latch circuit is unnecessary.

A period (5004) from the timing (B) to (C) is a period where a potential difference ΔV to be amplified is applied to the latch circuit.

In the present eighth embodiment, similar to third embodiment, electricity at the resetting time is reduced by minimizing nodes to which a body potential reset pulse is applied.

Furthermore, similar to fifth embodiment, in activation of the p-type polysilicon TFTs, since a sufficient potential difference has been already given between the nodes EVN and ODD, no malfunction occurs even when P1 and P2 are not reset.

Ninth Embodiment

Figure 42:
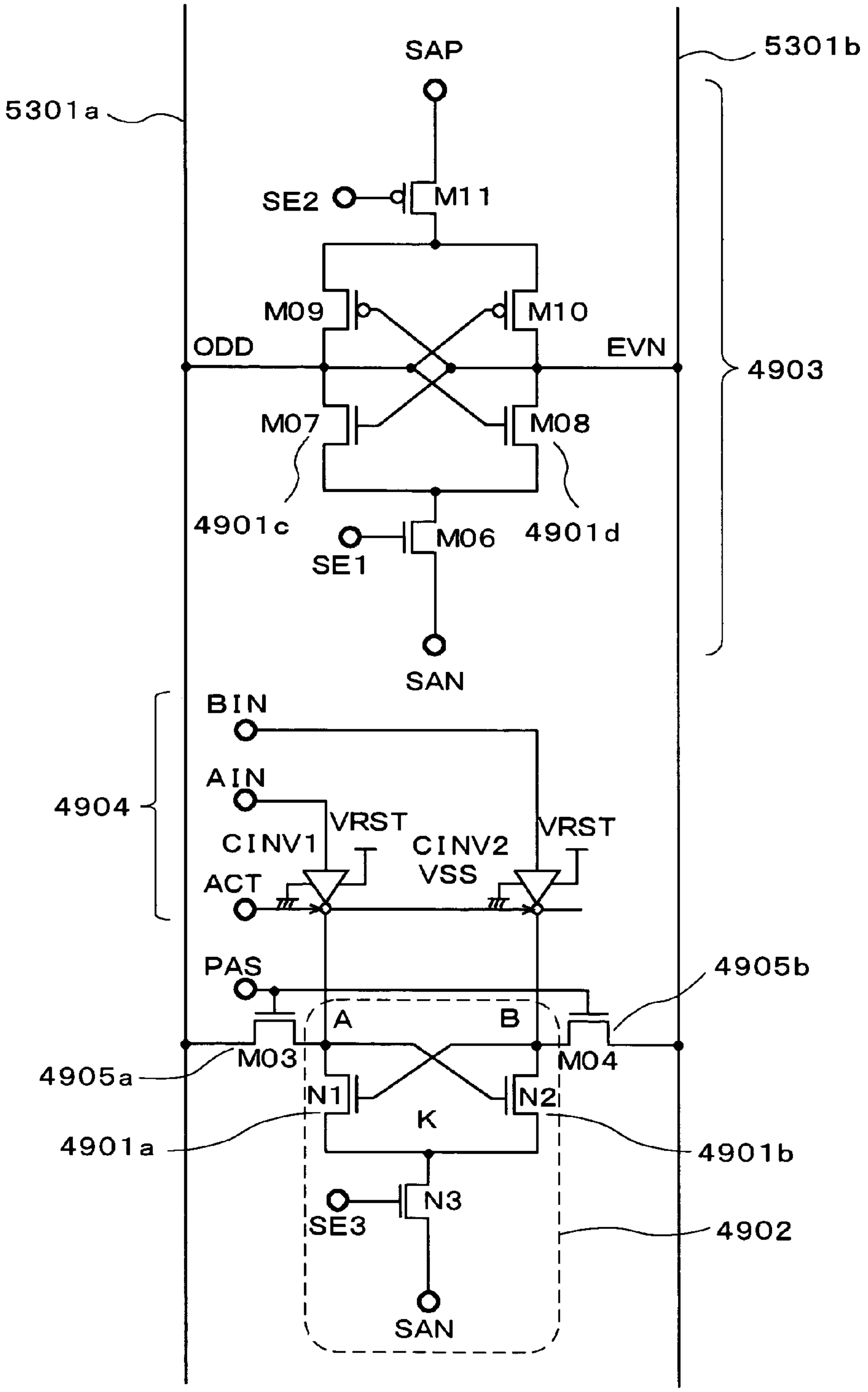
FIG. 42 is a circuit diagram of a latch-type sense amplifier of a ninth embodiment of the present invention.

FIG. 42 shows an example of a sense amplifier circuit for resetting potential of the present invention.

For the present circuit, based on the findings obtained so far, a reset drive is applied to a latch-type sense amplifier circuit composed of n-channel polysilicon TFTs, and this circuit has a first circuit (4902) such as a small-amplitude preamplifier portion or circuit for amplifying a potential difference between the nodes to a relatively small amplitude value. Furthermore, the circuit has a second circuit (4903) such as a full-swing amplifier portion or circuit for amplifying a potential difference obtained by the small-amplitude preamplifier portion (hereinafter, abbreviated as "preamplifier portion") to an amplitude value originally required. In the preamplifier portion, a potential difference ΔV read out at a bit line pair ODD and EVN is amplified to 0V and {(VDD1)/2−β}, for example. β is identical to that described in FIG. 6. Thereafter, 0V and {(VDD1)/2−β} retained in the bit line pair are amplified by the full-swing amplifier to 0V and VDD1, for example. In order to prevent the polysilicon TFTs (N1 and N2) in the preamplifier portion from receiving a voltage VDD1 at the full-swing time, the switches M03 and M04 are turned off before activating the full-swing amplifier so to disconnect the preamplifier portion from the bit lines. Body potential reset pulses are given to the disconnected preamplifier transistors N1 and N2 during a period where the full-swing amplifier is carrying out an amplifying operation.

Figure 43:
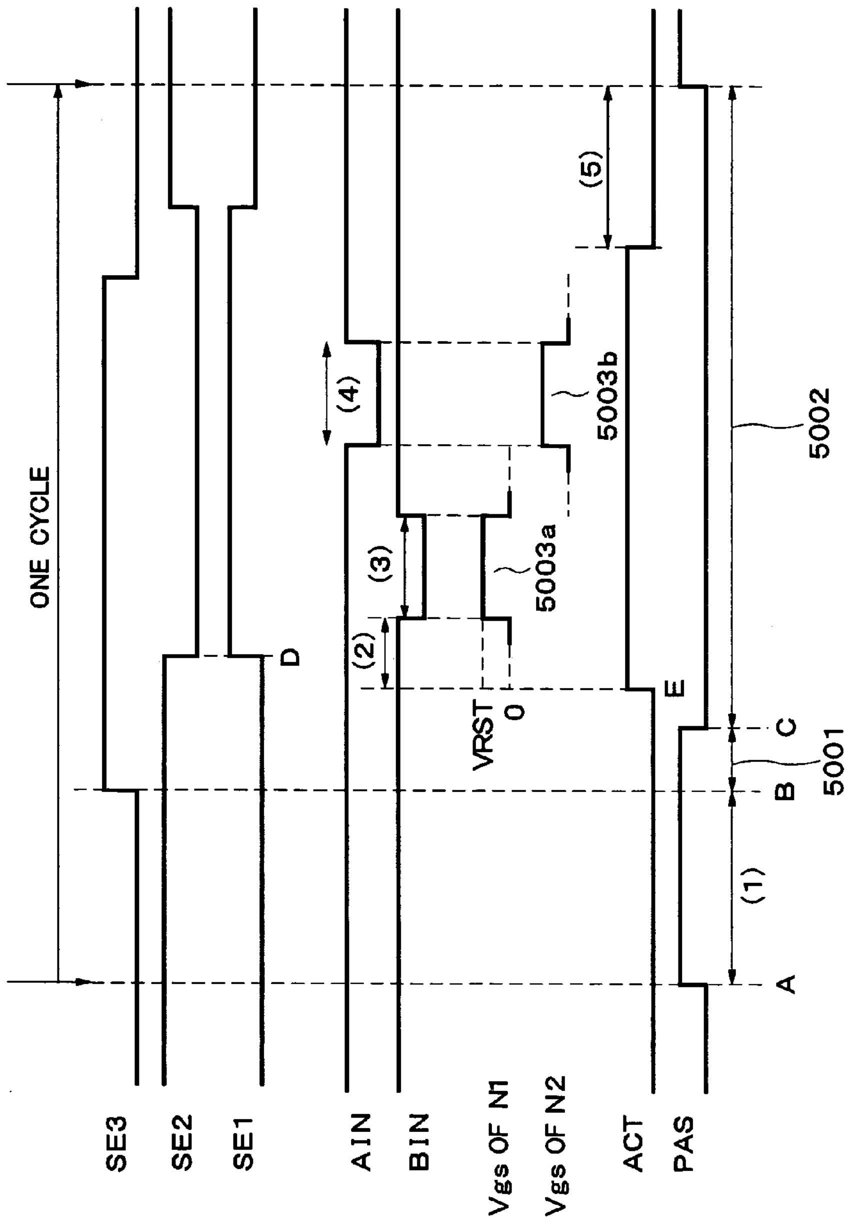
FIG. 43 is a timing chart showing a driving method of the ninth embodiment of the present invention.

Next, a method for driving this latch-type sense amplifier circuit will be described with reference to a timing chart of FIG. 43.

(1) In a period (1), PAS is at a high level, and the small-amplitude preamplifier portions are connected to the bit lines ODD and EVN at a low impedance (switch-on state) through the switches M03 and M04. At this time, SE1 and SE3 have been set at a low level, and SE2, to a high level, and the small-amplitude preamplifier and full-swing amplifier are both inactive. Moreover, before PAS rises at the timing A, to the bit line pair EVN and ODD, (VDD1)/2 is given by an unillustrated bit-line precharge circuit.

(2) When SE3 is raised at the timing B, ΔV given to the bit lines earlier than raising SE3 is amplified according to lowering of the node K to VSS. Thereby, of the ODD and EVD, the node to which a lower potential has been provided is lowered to VSS (=0V), while the other node is latched at a potential slightly ({(VDD1)/2−β}) lower than (VDD1)/2.

(3) When PAS falls at the timing C, the switch M03 and switch M04 are turned of, and the preamplifier circuit is disconnected from the bit lines. Then, in the bit line pair, voltages (0V and {(VDD1)/2−β}) amplified by the preamplifier are held by the bit line capacitances.

Hereinafter, the preamplifier carries out a body potential resetting operation for the polysilicon TFTs, and in parallel therewith, the main amplifier carries out an operation to amplify (0V and {(VDD1)/2−β}) amplified by the preamplifier to (0V and VDDL) amplified by the preamplifier.

At the timing D, SE1 rises, SE2 falls, and the full-swing amplifier is activated. By this operation, (0V and {(VDD1)/2−β}) that have been held after being amplified by the preamplifier are amplified to (0V and VDDL). This voltage is read out to the outside and used to refresh the memory.

On the other hand, at the preamplifier side, by raising ACT at the timing E after PAS falls, the CINV1 and CINV2 start to issue outputs according to inputs AIN and BIN therein. Herein, low levels are outputted according to the inputs. Accordingly, in a period (2), the nodes K, A, and B all become 0V.

In a period (3), by giving a falling pulse to BIN, a rising pulse is applied to the node B. At this time, a lower voltage of the pulse is VSS, while a higher voltage is VRST, and this VRST has been set to a voltage higher than the threshold voltage of the polysilicon TFTs N1 and N2. In this period (3), to the polysilicon TFT N1, a pulse by which VGS thereof is made not less than the threshold voltage is applied, whereby the body potential is reset.

In a period (4), by giving a falling pulse to AIN, a rising pulse is applied to the node A. At this time, a lower voltage of the pulse is VSS, while a higher voltage is VRST, and this VRST has been set to a voltage higher than the threshold voltage of the polysilicon TFTs N1 and N2. In this period (4), to the polysilicon TFT N2, a pulse by which VGS thereof is made not less than the threshold voltage is applied, whereby the body potential is reset.

In a period (5), SE3 is at a low level, ACT is at a low level, and PAS is at a low level, thus the nodes A, B, and K are all brought into a floating state.

Then, operations are repeated in (1).

Since such operations are repeated, to the polysilicon TFTs N1 and N2 of the preamplifier, potential reset pulses are applied before carrying out a sensing operation.

As such, since the circuit is composed of the "small-amplitude preamplifier portion" and "full-swing amplifier portion" and is driven in a manner that a high voltage amplified by the full-swing amplifier, that is, a finally required output voltage, is not applied to the "small-amplitude preamplifier portion," a voltage applied to the polysilicon TFTs composing the "small-amplitude preamplifier portion" is kept low, and as a result, a hysteresis effect can be reduced.

For this, effects can be confirmed from the data of FIG. 12. Although herein no reset drive has been applied, the region of ΔV where output becomes unstable when supply voltage falls has been reduced.

Moreover, in a case where a reset drive of the present invention is applied, when the experimental results shown in FIG. 19 are compared with the experimental results shown in FIG. 35, although a reset drive has been applied in both cases, the unstable region is smaller in FIG. 19 where a lower voltage is applied to the polysilicon TFTs. This is because the size relationship among V1, V2, V8, and V9 is identical to that shown in FIG. 12.

Body potential reset pulses are given to the N1 and N2 of the disconnected preamplifier during a period where the full-swing amplifier is carrying out an amplifying operation. Namely, since an amplifying and latching operation of the full-swing amplifier and a resetting operation of the preamplifier are executed in parallel, an increase in the cycle time resulting from a body potential resetting operation can be suppressed.

Figure 44:
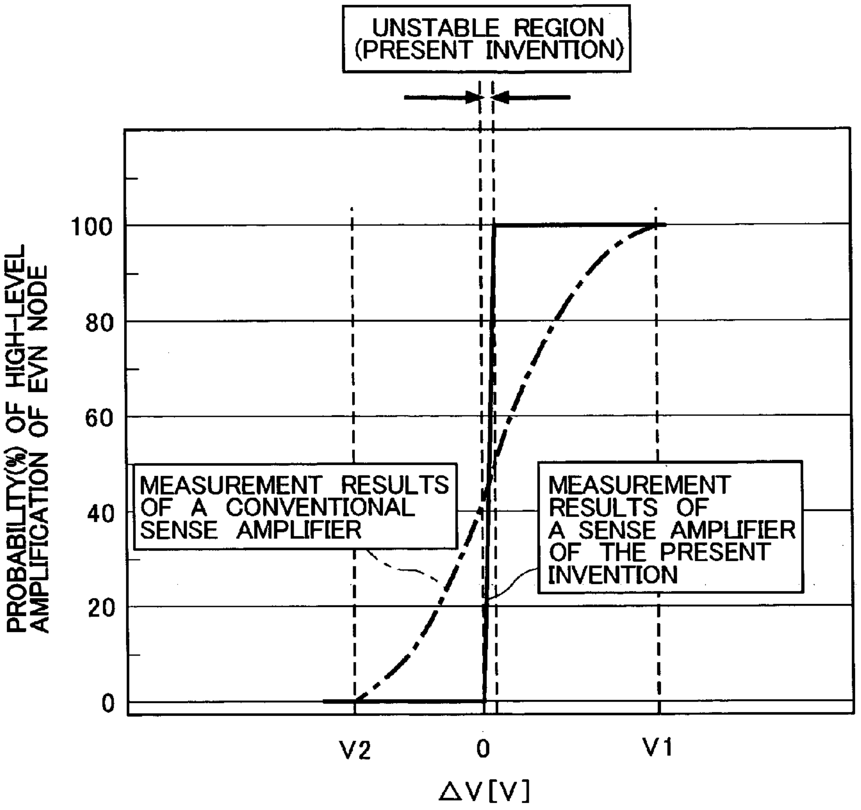
FIG. 44 is a diagram showing a potential difference ΔV to be inputted into a latch-type sense amplifier actually measured in the ninth embodiment of the present invention and a probability of high-level amplification of a node EVN.

FIG. 44 shows measurement results of a sense amplifier prepared in the present embodiment. It has been repeated to input ΔV into a sense amplifier circuit of the present invention and then activate the sense amplifier so as to carry out a sensing operation. In FIG. 44, similar to FIG. 7, the horizontal axis shows an inputted potential difference ΔV, and the vertical axis shows a probability of high-level amplification of the node EVN.

As a result, suppression to 1/40 or less was realized relative to an unstable region obtained in a conventional sense amplifier.

Figure 45:
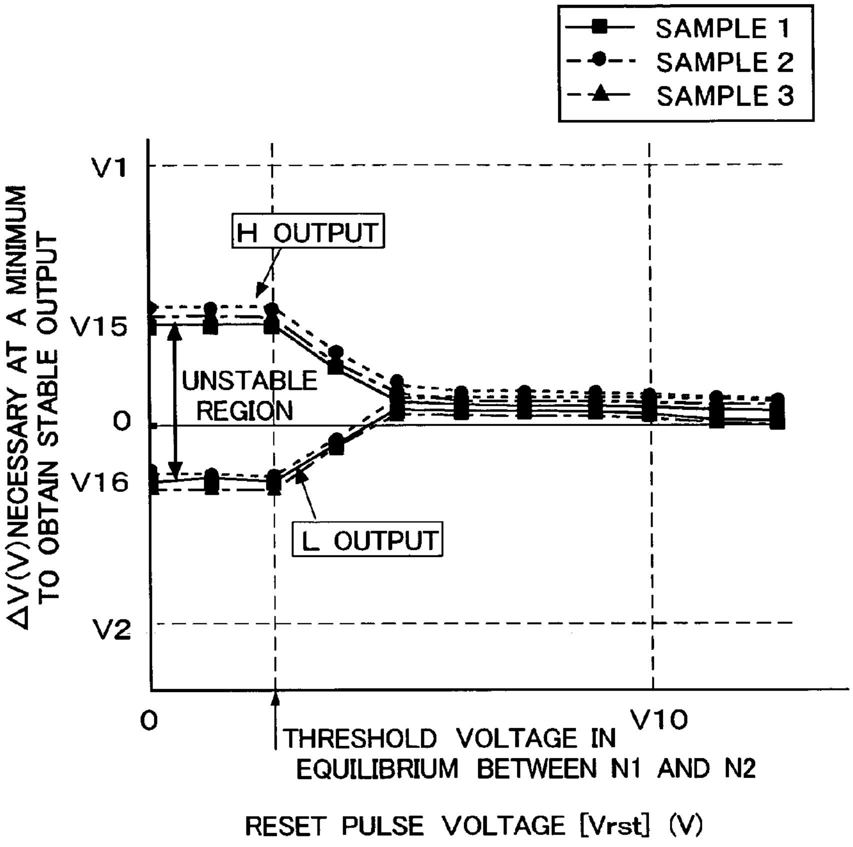
FIG. 45 is a graph of actual measurement values showing a relationship between a reset pulse voltage obtained in the ninth embodiment of the present invention and ΔV necessary at a minimum to obtain a stable output.

In addition, FIG. 45 shows measurement results of a sense amplifier prepared by the present embodiment. In this drawing, results of a measurement using three similarly fabricated samples are shown. Sample 1 is shown by square marks, sample 2 is shown by circle marks, and sample 3 is shown by triangle marks. A reduction in the unstable region is recognized around the point where the pulse voltage exceeds the threshold voltage of the polysilicon TFTs. This result again indicates the feature of the present invention described in first embodiment. Namely, since the body is not of a single crystal but of a polycrystal, virtually no effect is obtained by forward biasing between the body and source by simply raising the body potential, and in order to effects, it is necessary that VGS is not less than the threshold voltage of this polysilicon TFT when body potential reset pulses are given.

An unstable region when a conventionally known normal driving method was applied to the present latch circuit was, as already shown in FIG. 12 (data of VDD=VDD1), V2<ΔV<V1.

On the other hand, in the graph of FIG. 45, when, for example, the reset pulse is V10, the width of the unstable region becomes 1/40 or less relative to (V1−V2) in the case of the conventional driving method, wherein a substantial reduction can be recognized.

Although, in some samples, an offset was recognized in the ΔV value necessary at a minimum to obtain a stable output, the unstable region has become 1/38 or less in all samples, wherein effects of the present invention have been confirmed. Even in a case of a design taking an offset of each sample into consideration, |ΔV| necessary at a minimum has become an eighth part of the conventional value, thus very excellent effects were obtained. As a result, in the present invention, it has become easier to carry out design than in the prior art and a wider margin is provided in use, thus a stable operation could be obtained.

In addition, in the present ninth embodiment, a description has been given while focusing on a case where reset pulses were given, however, even in a case where no reset pulses are given, an effect to reduce the unstable region can be obtained by, as in the present embodiment, providing the circuit composed of the "small-amplitude preamplifier portion" and "full-swing amplifier portion" and driving the same in a manner that a high voltage amplified by the full-swing amplifier, namely, a finally required output voltage is not applied to the "small-amplitude preamplifier portion."

This is because the imbalance in body potential that occurs in the amplifying and latching period and in the course of shifting from the latching period to the sampling period can be reduced by reducing an unbalanced voltage applied to the MOS transistors.

This effect can be confirmed by comparing a case where a reset pulse voltage is 0V in FIG. 45 with a case where the conventional sense amplifier shown in FIG. 12 is driven at a supply voltage VDD1. Namely, an unstable region when a conventionally known normal driving method is applied to the present latch circuit is, as already shown in FIG. 12 (data of VDD=VDD1), V2<ΔV<V1, and the width thereof is (V1−V2).

On the other hand, when a reset pulse voltage is 0V (no reset pulse) with use of a circuit of the present ninth embodiment, the unstable region (in a case of sample 1) V16<ΔV<V15, the width thereof is (V15-V16), which is 1/3 or less of the width (V1−V2) obtained by the conventional driving method.

Accordingly, by providing the circuit composed of the "small-amplitude preamplifier portion" and "full-swing amplifier portion" and driving the same in a manner that a high voltage amplified by the full-swing amplifier, namely, a finally required output voltage is not applied to the "small-amplitude preamplifier portion," an effect to reduce the unstable region can be obtained without giving reset pulses.

Furthermore, the unstable region can be substantially reduced by giving reset pulses not less than the threshold value, which is as has been mentioned above.

Here, the main components of FIG. 42 referred to in the present ninth embodiment are simplified and shown in FIG.

Figure 46:
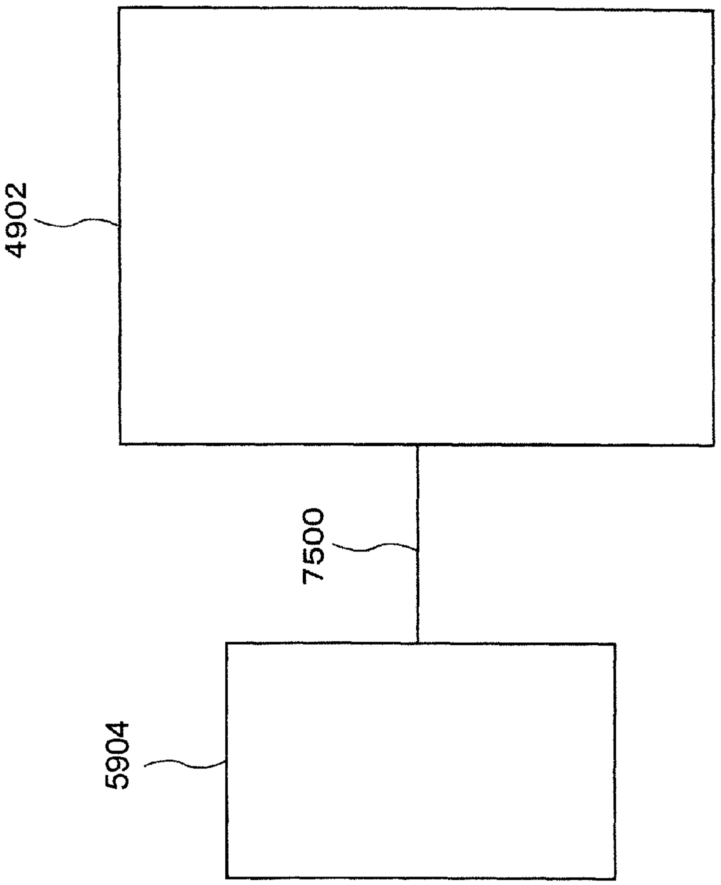
FIG. 46 is a circuit block diagram showing a concept of the present invention.

46. FIG. 46 shows a first circuit (4902) such as the small-amplitude preamplifier circuit, and a step waveform voltage applying section (4904) which may include the hysteresis suppressing section (5904), which, for example, may include the clocked inverters (5904*a* and 5904*b*), connected to the first circuit via a connection (7500). A hysteresis effect may be suppressed by having this construction.

In addition, FIG. 17 referred to in the first embodiment also similarly corresponds to FIG. 46. Namely, 4904*a* and 4904*b* of FIG. 17 are equivalent to the hysteresis suppressing section (5904) of FIG. 46, and the latch circuit (4900) of FIG. 17 corresponds to the first circuit (4902) of FIG. 46.

In other words, a concept of the present invention can be shown by FIG. 46.

Tenth Embodiment

In this embodiment, a DRAM using the sense amplifier described in ninth embodiment will be prepared. A configuration of a bit line circuit will be described with reference to FIG. 47 and FIG. 48. For convenience of illustration, the circuit was divided into two sheets. By connecting points J and points K shown in FIG. 47 (upper part of a DRAM circuit) and FIG. 48 (lower part of a DRAM circuit) to each other, a single bit line circuit is constructed.

The first circuit (4902) described in ninth embodiment, such as the small-amplitude preamplifier circuit, and the second circuit (4903) such as the full-swing amplifier circuit are connected to a bit line pair. To the bit line ODD, memory cells selected when the word address is an odd number are connected. As an example, a memory cell (5303) composed of an n-channel MOS transistor M12 and a capacitance C2 is shown in the drawing as a cell selected at WL_ODD. Similarly, to the bit line EVN, memory cells selected when the word address is an even number are connected. As one example, a memory cell composed of an n-channel MOS transistor M13 and a capacitance C1 is shown in the drawing as a memory cell selected at a word line WL_EVN. Other memory cells are omitted.

Furthermore, to the bit line pair, a precharge circuit (5302) composed of n-channel MOS transistors M14 to M16 is connected. On/off of these MOS transistors is controlled by a signal given to a PC node. To PCS, (VDD1)/2 has been given, and the bit line pair is set to (VDD1)/2 when a high level is given to a control line PC.

For data readout, to the bit line EVN, a transfer gate composed of MTG3A and MXTG3A is connected, which is turned on and off by control lines TG3A and XTG3A (a signal complementary to TG3A is given). In addition, to the bit line ODD, a transfer gate composed of MTG3B and MXTG3B is connected, which is turned on and off by TG3B and XTG3B. These are activated when reading out data onto an OUT terminal. Control is carried out so that only one of the transfer gates is turned on depending on whether the word address of a memory cell for readout is an even number or an odd number.

For data writing, to the bit line EVN, a switch MTG1A is connected, which is turned on and off by a control line TG1A. In addition, to the bit line ODD, a switch MTG1B is connected, which is turned on and off by a control line TG1B. These are activated when writing data. Control is carried out so that only one of the analog switches is turned on depending on whether the word address of a memory cell for writing is an even number or an odd number.

For a transfer gate composed of MDRGT and MXDRGT, on/off is controlled by an unillustrated column decoder. DRGT is turned on, if it is at a time of writing operation and if the column address corresponds to that bit line circuit, so as to transfer a data bus signal to the switches MTGLA and MTGLB, and this is written into the bit line through either of the switches.

Figure 47:
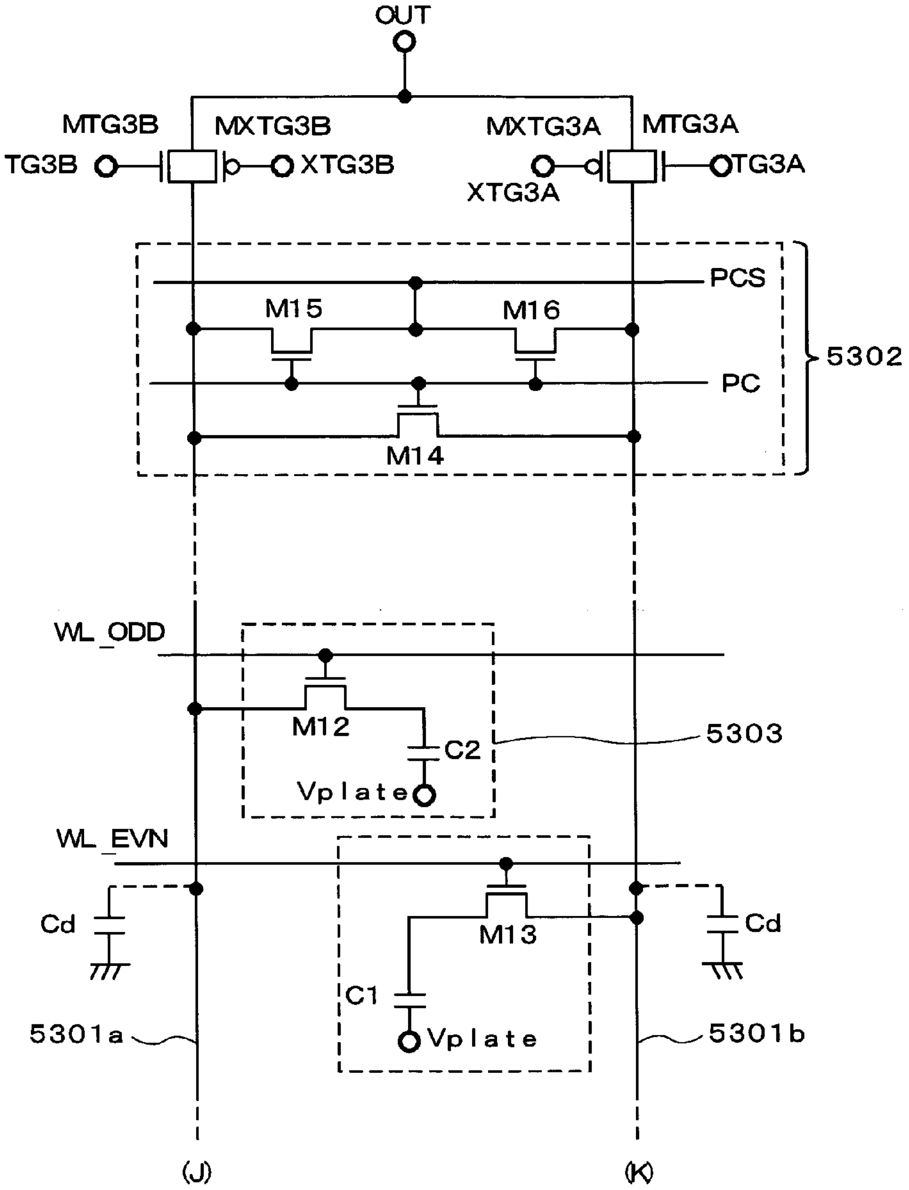
FIG. 47 is a DRAM circuit diagram (upper part) of a tenth embodiment of the present invention.

In the present embodiment, supply voltage is provided as VDD1. The SAN node of the small-amplitude preamplifier and SAN of the full-swing amplifier circuit are connected to VSS (=0V). SAP is connected to VDD1. A terminal V-plate of the capacitance in a memory cell on a side not connected to a MOS transistor is connected to (VDD1)/2 so as to minimize a voltage stress between the capacitance terminals. In FIG. 47, Cd is shown as a parasitic capacitance of each bit line.

Figure 49:
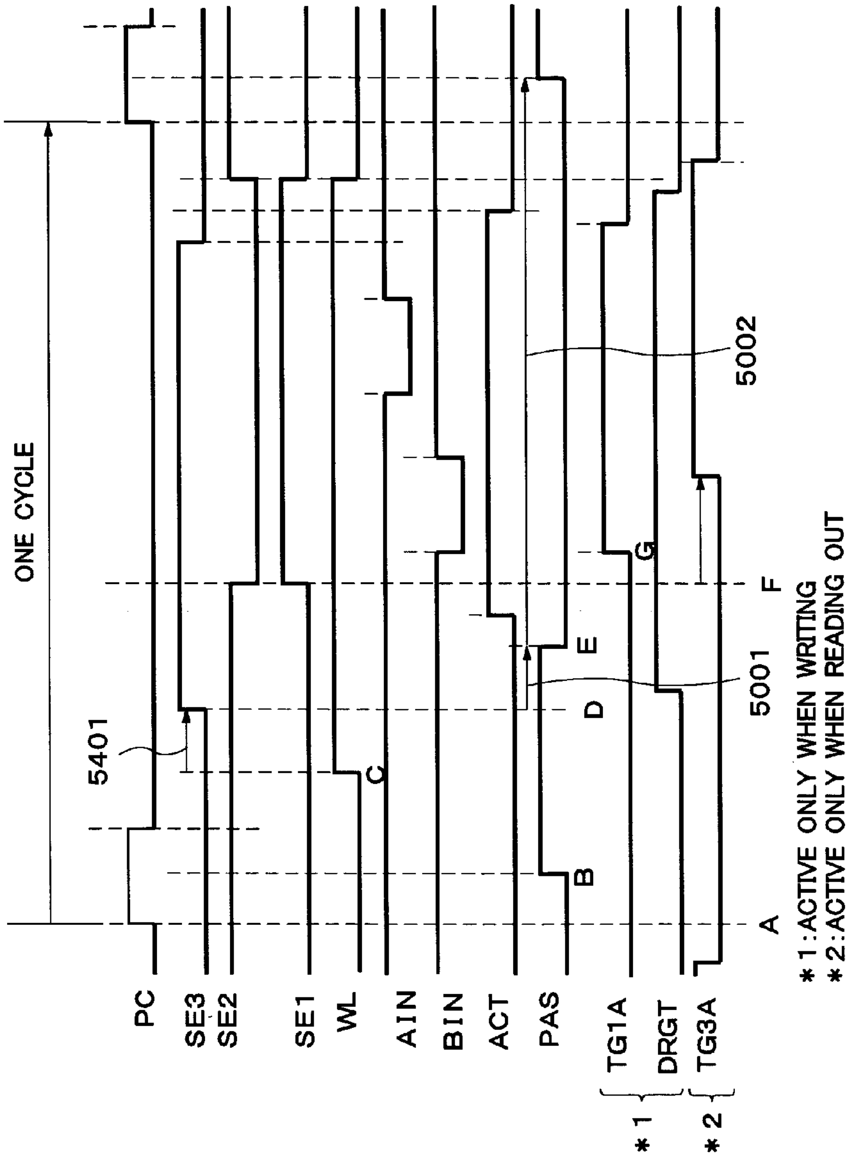
FIG. 49 is a timing chart showing a method for driving a DRAM of the tenth embodiment of the present invention.

Next, operations of the present embodiment will be described with reference to FIG. 49.

(1) To begin with, description will be given of an operation when data is read out from a memory cell onto an OUT node.

By raising PC at the timing A, the bit line pair (ODD and EVN) is precharged to (VDD1)/2 by the precharge circuit (5302). At the timing B where the bit line pair has been precharged, a high level is given to PAS so as to turn on M03 and M04. Thereby, nodes A and B are precharged to this (VDD1)/2.

Thereafter, a high voltage is given to a one word line at the timing C. Herein, a high voltage is given to WL_EVN, for example. Thereby, onto the bit line EVN, a voltage of ΔV is read out based on a voltage which has been held by a memory cell C1. When the voltage that has been held by C1 is VDD, a voltage of (VDD1)/2+|ΔV| appears at the bit line EVN, and when the voltage that has been held by C1 is 0, a voltage of (VDD1)/2−|ΔV|. The voltage of |ΔV| is a value expressed by Numerical expression 1 mentioned in "Description of the Related Art." In the following, description will be given for a case where the voltage that has been held by C1 is VDD1, and a voltage of (VDD1)/2+|ΔV| appears.

Upon giving a high level to SE3 at the timing D, the small-amplitude preamplifier circuit starts an amplifying and latching operation. Since an EVN voltage is (VDD1)/2+|ΔV| and an ODD voltage is (VDD1)/2, the ODD voltage is lowered to VSS (=0V) by a sense operation of the small-circuit preamplifier circuit. On the other hand, the EVN voltage is scarcely lowered and becomes, for example, approximately {(VDD1)/2−β}. β is identical to that described in FIG. 6.

After a potential difference ΔV between the EVN and ODD has been amplified to a desirable potential difference by the small-amplitude preamplifier circuit and this has been written into the bit line pair (ODD and EVV), as shown by E, PAS is made low in level to disconnect the small-amplitude preamplifier circuit from the bit line pair.

Thereafter, to the small-amplitude preamplifier circuit, body potential reset pulses to reset body potential of M01 and M02 are given.

On the other hand, the voltages (0V and {(VDD1)/2−β}) which have been amplified by the small-potential preamplifier circuit and have been held by the bit line pair is amplified at the timing F, to (0V and VDD1) by the full-swing amplifier circuit. These operations are the same as those in ninth embodiment.

The signal amplified to the supply voltage is read out onto the OUT node by turning on the transfer gate composed of MTG3A and the like.

The operations so far are operations in one cycle, and when again reading out or writing data, the operation returns to a bit-line precharge.

Although herein a description has been given of an operation for reading out data onto OUT, a refresh operation of the memory cell is simultaneously carried out. Namely, when the full-swing amplifier circuit is activated by SE1 and SE2 at the timing F, since a high level has been given to the word line (herein, WL_EVN), the bit line signal amplified to the supply voltage is written into the memory cell as it is, and data of the memory cell is refreshed.

(2) Next, description will be given of an operation when writing 0V from the data bus into the capacitance C1 in the memory cell.

The timing A to timing F and a drive given to the small-amplitude preamplifier by body potential reset pulses are the same as those in (1).

Description will be given of the timing F onward.

MTG1A is turned on at the timing G. At this time, the transfer gate composed of MDRGT and the like has been turned on by the column decoder, and M13 has been turned on by WL_EVN, 0V that has appeared on the data bus can be written into the capacitance C1 by a pass from the data bus to the bit line EVN and M13.

At this time, although the full-swing amplifier is in a latched condition, impedance of the data bus, transfer gate composed of MDRGT and the like, and MTG1A is sufficiently low, therefore, it is possible to invert the latched condition, and in such a manner data is written.

The operations so far are operations in one cycle, and when again reading out or writing data, the operation returns to a bit-line precharge.

Sensitivity of the latch-type sense amplifier circuit is heightened as a result of a body potential reset operation, thus it becomes possible to carry out a stable readout operation without malfunction even when an absolute value of ΔV is small. Accordingly, it becomes possible to increase the number of cells connected to a set of bit line pair, which makes it possible to improve the memory capacity per unit area.

Here, after power on, a writing operation into the memory cell is carried out prior to a readout operation from the memory cell. Body potential reset pulses are given to the MOS transistors N1 and N2 at the time of this writing operation, a malfunction of the latch-type sense amplifier can be avoided even for a first readout operation after power on.

Eleventh Embodiment

Figure 48:
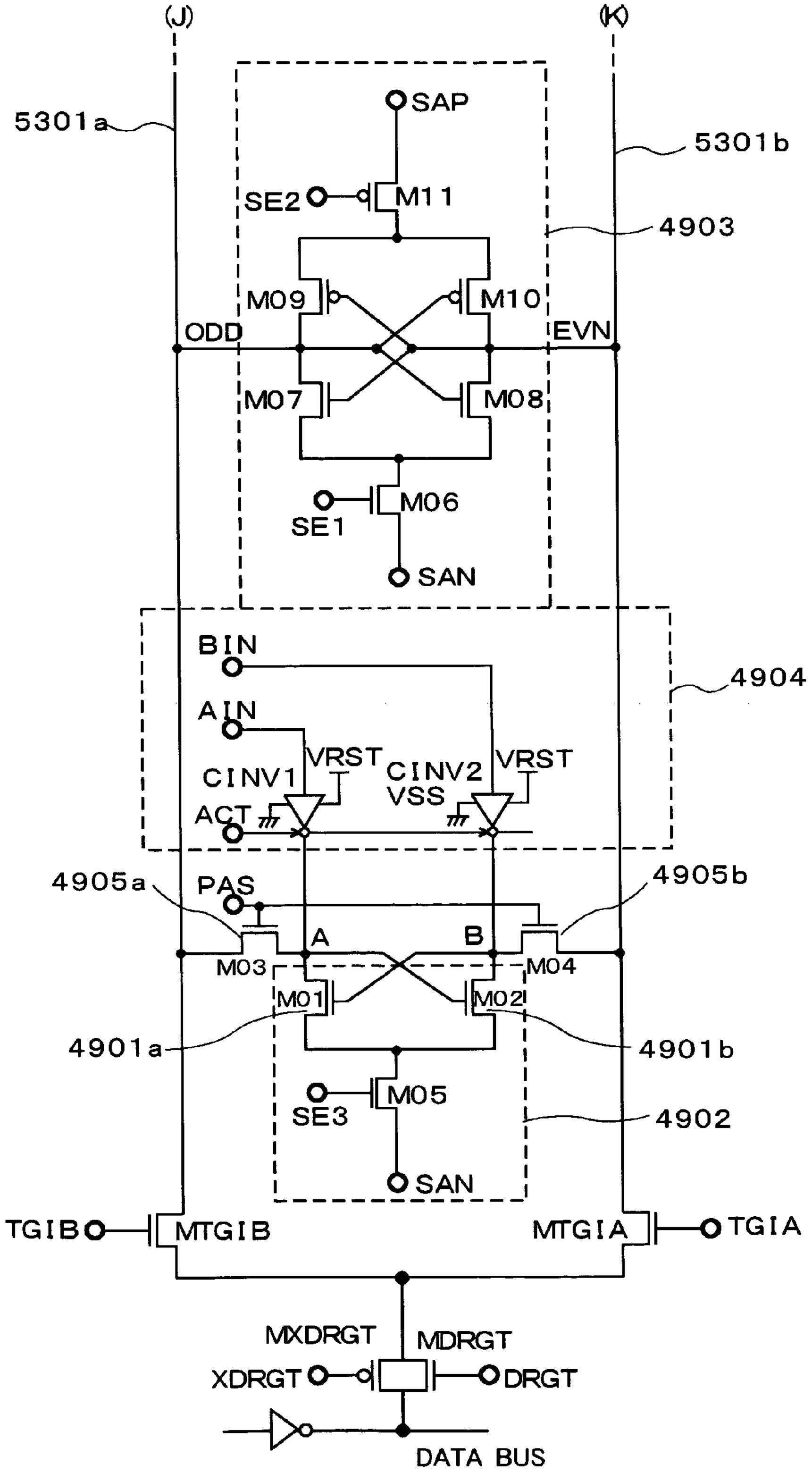
FIG. 48 is a DRAM circuit diagram (lower part) of the tenth embodiment of the present invention.
Figure 50:
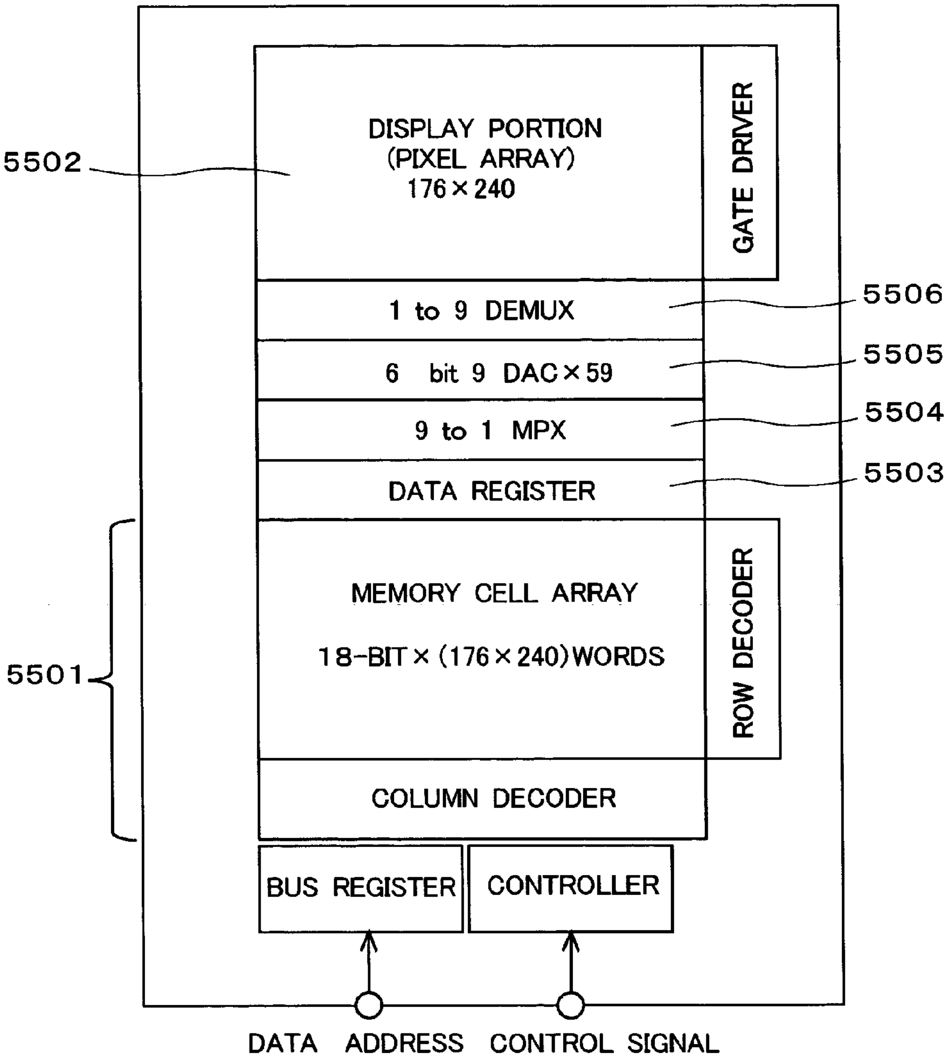
FIG. 50 is a block diagram showing a display device of an eleventh embodiment of the present invention.

In this embodiment, a liquid crystal display device (LCD) is prepared as a display device of the present invention. FIG. 50 shows a circuit configuration of a liquid crystal display device of the present embodiment. The number of word lines of the bit line circuit shown in FIG. 47 and FIG. 48 is provided as 240, and by laying the same in the lateral direction in 3168 pieces (18×176 pieces), a memory cell array with a memory capacity of 18-bit×(176×240) words is prepared.

Moreover, on the periphery of the memory cell array or inside, a column decoder, a row decoder, and a bus register are prepared, whereby a memory (5501) is prepared.

This memory is used, for example, as a frame memory of the present liquid crystal display device, as a register for setting an operation mode of the LCD, or as a display RAM for relating data with display patterns. On the top of this memory, 18-bit×176 data registers (5503) are connected as shown in FIG. 50, so that, when a one word line is selected by the row decoder, data of all memory cells connected to this word line is read out in block to this data register. To the data registers, multiplexers (9 to 1 MPXs) (5504), 6-bit DACs (5505), and demultiplexers (1 to 9 DEMUXs) (5506) are further connected in order. To the demultiplexers, data bus lines of a display portion are connected.

The display portion is constructed by arranging pixels in a matrix form at intersections between a plurality of data lines and a plurality of scanning lines. Moreover, a gate drive circuit to apply voltage to the scanning lines in sequence is prepared on the periphery of the display portion.

A controller for controlling operation of these circuits is also prepared. These circuits and the like are prepared of polysilicon TFTs on a glass substrate.

Figure 51:
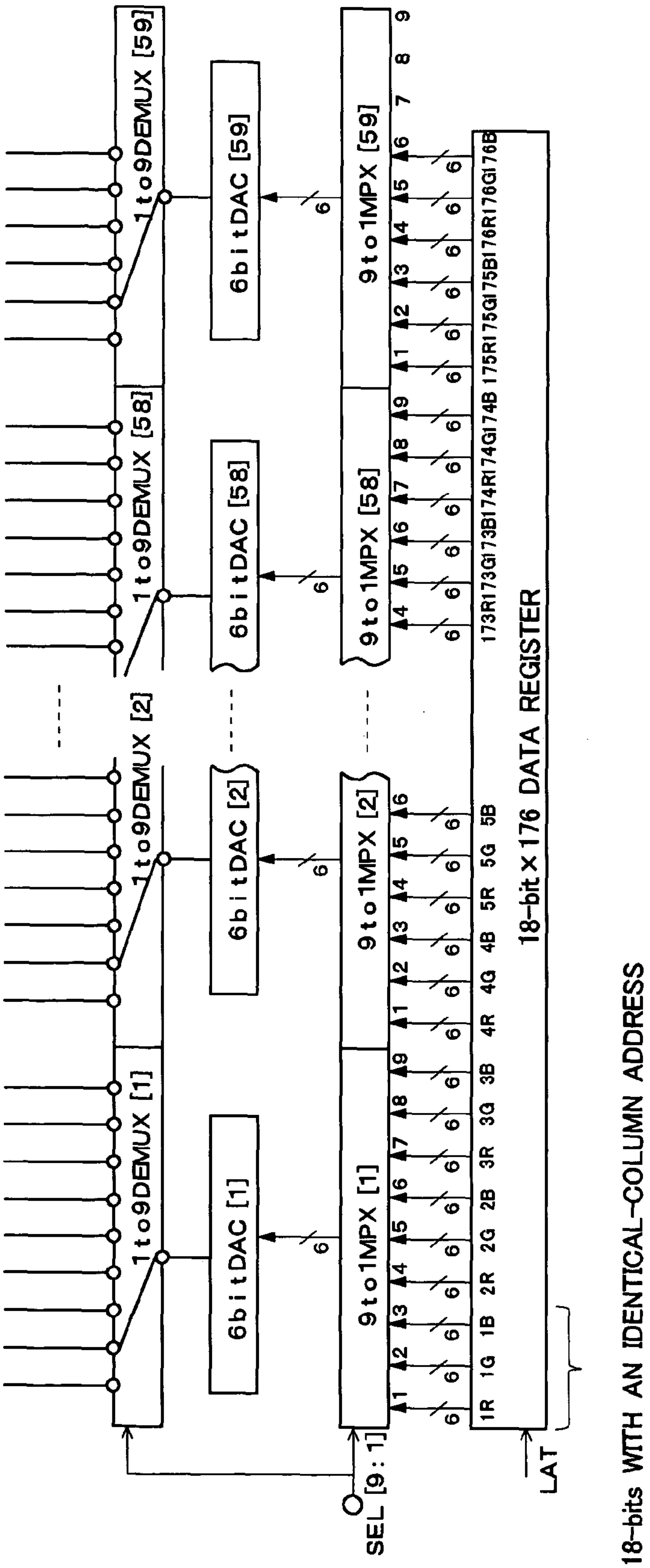
FIG. 51 is a circuit configuration diagram of a data register, MPXes, DACes, and DEMUXes included in a display device of the eleventh embodiment of the present invention.

FIG. 51 shows a configuration of the data registers (5503), 9 to 1 MUXs (5504), 6-bit DACs (5505), and 1 to 9 DEMUXs (5506) included in a display device in greater detail. Data which has been read out and held in the data register is equivalent to data to be written into one line of a pixel array of the display portion. Data held herein is selected by the 9 to 1 MPX in time series, is converted to an analog signal by the 6-bit DAC, and is written into a data bus line (5507) selected by the 1 to 9 DEMUX. Herein, the 9 to 1 MPXs and 1 to 9 DEMUXs operate in pairs and are selected by a common selecting signal SEL [9:1].

In a case where the above-described memory is used as a frame memory, since the frame memory is provided in an LCD panel, it is unnecessary to externally supply video data to display a still image. Therefore, it becomes possible to stop the circuit portion that has been driven for an external video data supply, whereby electricity can be reduced.

Even for a video image generally regarded as a moving image, there is often a frequency difference between a panel driving frequency (for example, 60 HZ, this means a drive where a signal is written into the pixels 60 times in one second) and a frame rate of video data (for example, 30 fps, this means that video data is updated 30 times in one second) as in the examples shown in the parentheses. This occurs when, for example, the processing speed of elements for generating video data is slow, and when the frame rate of video data is slow (for example, 10 fps or less), a moving image is displayed in a manner of a frame-by-frame advance.

In a case of the above numerical example (panel driving frequency is 60 Hz, and a video data frame rate is 30 fps), the panel substantially displays an identical image in two frames, which is considered to be a sort of still image. Namely, by providing the frame memory in the LCD panel, the band of video data that should be externally supplied can be reduced to half despite generally being a moving image.

In other words, although it has been necessary, when there is no frame memory in an LCD panel, to supply a signal equivalent to 60 Hz irrespective of a frame rate of video data, it is sufficient, in a case of the present embodiment, to supply a signal in accordance with a frame rate of video data, for example, at 30 Hz, whereby the band of data to be supplied to the panel can be reduced.

In addition, since a highly-sensitive sense amplifier and a DRAM with a small memory cell area were used, a memory having a capacity for one frame could be formed at a so-called frame part in the periphery of the display portion. Namely, in comparison with a construction mounted with a memory chip supplied as a separate chip, a frame memory could be obtained in a smaller space. In addition, since a frame memory can be manufactured simultaneously with an LCD panel, it is unnecessary to procure a memory chip, which has facilitated delivery date management. In addition, mounting costs for module assembly could be reduced.

Moreover, stock of the members is also reduced, and inventory management also becomes unnecessary, which allows to supply products at a low price.

Since a pixel arrangement of the display portion is identical to an arrangement of memory cells in the memory, a simple layout from the memory to the display portion realized a small layout area.

The display device has been constructed so as to select data by the multiplexers, convert the same to analog signals by the DACs, and select data lines for writing by the demultiplexers, and also has been constructed so that the multiplexers and demultiplexers operate in pairs. In the conventional construction, since the multiplexers and demultiplexers do not have a one-to-one correspondence, it has been necessary to wire signal lines from the multiplexers to the demultiplexers via the DACs while drawing around the same in the lateral direction. In the present invention, this drawing-around of wiring is unnecessary, therefore, a small layout area was required. Furthermore, since an optimal number of DACS could also be selected from the point of view of the circuit area, operating speed, and power consumption, a small-area low-power circuit and display device could be realized.

In order to maintain display quality, even for a still image, data is written into all pixels at a fixed cycle in the liquid crystal display device. This cycle is 16.6 ms, in general. The memory cells of a DRAM prepared in the present embodiment have been designed so that the retention time is longer than this cycle. Accordingly, all cells that store frame data are accessed at the fixed cycle, and the memory cell data is refreshed at this time, therefore, a circuit for refreshing that is usually necessary for a DRAM becomes unnecessary.

Twelfth Embodiment

Figure 52:
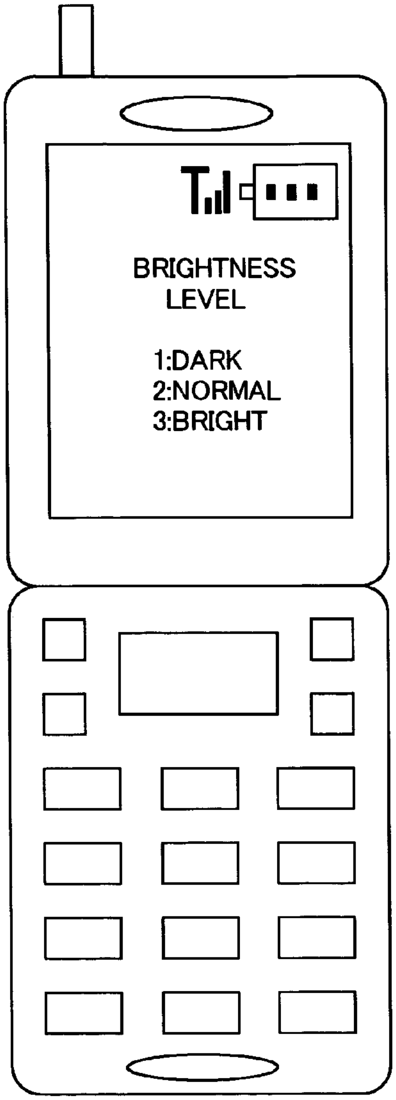
FIG. 52 is a view showing a portable terminal of a twelfth embodiment of the present invention.

This embodiment relates to a personal digital assistant (portable telephone) as shown in FIG. 52. In the present embodiment, the display device prepared in eleventh embodiment has been installed in the personal digital assistant.

Use of a highly-sensitive sense amplifier and a DRAM with a small memory cell area allows to form a memory having a capacity for one frame at a so-called frame part in the periphery of a display portion. Namely, in comparison with a construction mounted with a memory chip supplied as a separate chip, a frame memory could be obtained in a smaller space. Consequently, the personal digital assistant can be reduced in size.

Thirteenth Embodiment

This embodiment relates to a polysilicon TFT array. FIGS. 53A to 53H are sectional views showing a manufacturing method for a polysilicon TFT (planer structure) array for forming channels on a surface layer of polycrystalline silicon.

Figures 53A, 53B, 53C, 53D:
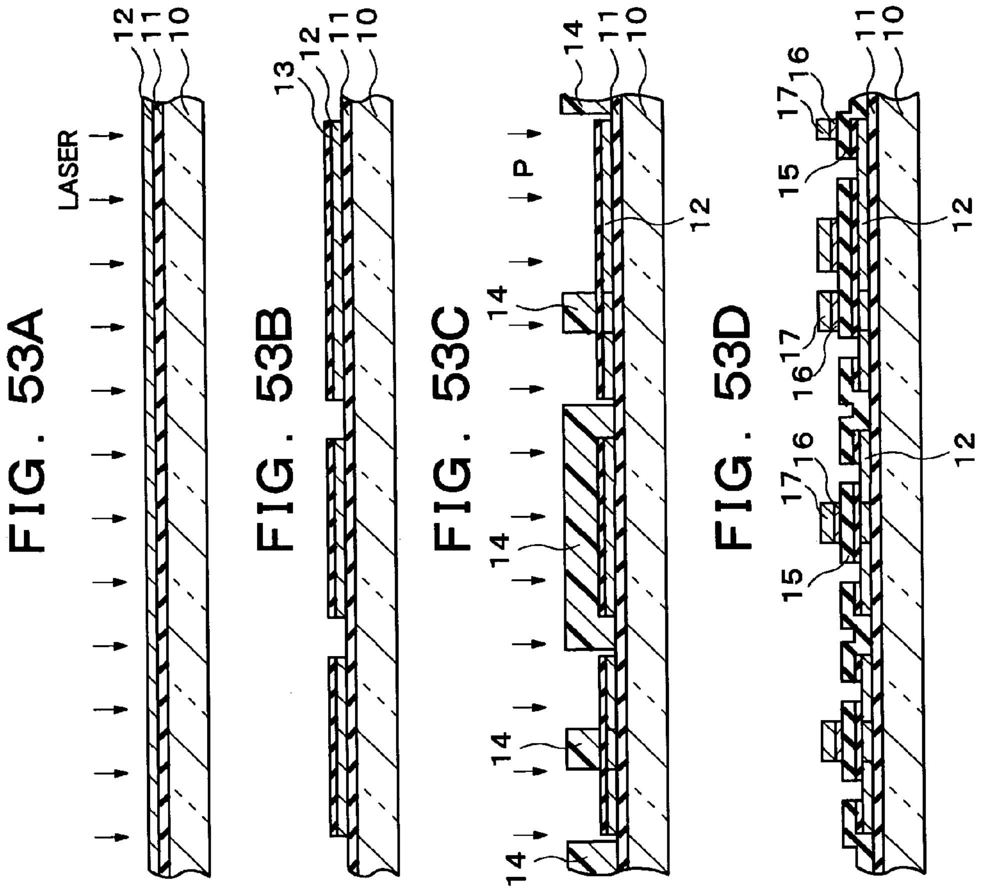
FIG. 53A through FIG. 53H are sectional views showing a method for manufacturing a display panel board used in embodiments of the present invention, in order of steps.

Concretely, first, as shown in FIG. 53A, after forming an oxide silicon layer 11 on a glass substrate 10, amorphous silicon 12 is grown. Next, by annealing by use of an excimer laser, the amorphous silicon is made into polysilicon.

Furthermore, as shown in FIG. 53B, an oxide silicon layer 13 with a film thickness of 10 nm is grown, and after patterning, as shown in FIG. 53C, this is coated with a photoresist 14 and is patterned, and by doping phosphorus (P) ions, n-channel source and drain regions are formed.

Furthermore, as shown in FIG. 53D, after growing an oxide silicon layer 15 with a film thickness of 40 nm to be a gate insulating film, a microcrystalline silicon (μ-c-Si) film 16 and a tungsten silicide (WSi) film 17 for constructing gate electrodes are grown and are patterned into gate forms. Next, as shown in FIG. 53E, this is coated with a photoresist 18 and is patterned (to mask the n-channel regions), and by doping boron (B), p-channel source and drain regions are formed.

Figures 53E, 53F, 53G, 53H:
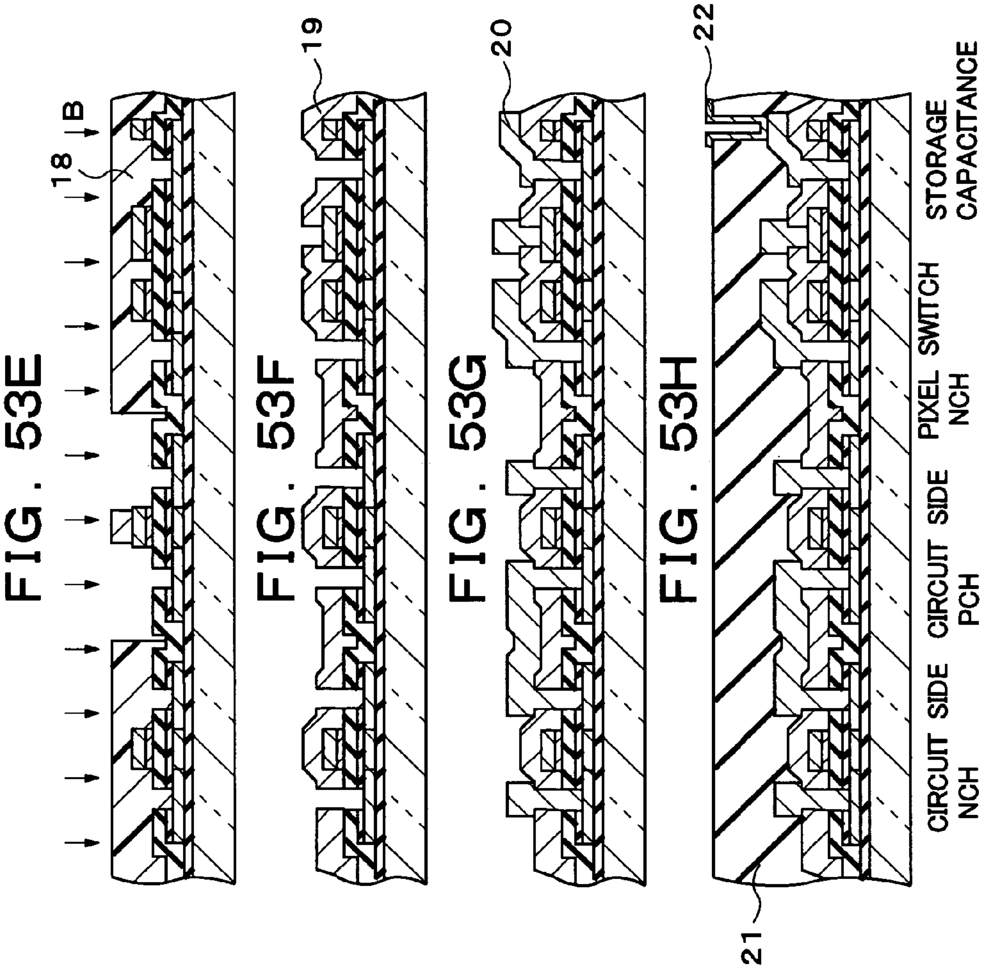

Next, as shown in FIGS. 53F and 53G, after continuously growing a film 69 of stacked oxide film and silicon nitride film, contact holes are opened, and a film 20 of stacked an aluminum film and titanium film is formed by sputtering, and is patterned. By this patterning, CMOS source and drain electrodes of a peripheral circuit, data line wiring to be connected to drains of pixel switch TFTs, and contacts to a pixel electrode are formed.

Next, as shown in FIG. 53H, a silicon nitride film 21 of an insulating film is formed, holes for contact are opened, and ITO (Indium Thin Oxide) 22 of a transparent electrode is formed for a pixel electrode, and is patterned.

In such a manner, by preparing planer-structure TFT pixel switches, a TFT array is formed. In the peripheral circuit portion, together with n-channel TFTs similar to pixel switches, formed are TFTs provided with p-channels by boron doping although the steps are almost the same as those of n-channel TFTs. In FIG. 53H, an n-channel TFT of the peripheral circuit, a p-channel TFT of the peripheral circuit, a pixel switch (n-channel TFT), a storage capacitance, and a pixel electrode are shown from the left side of the drawing. Moreover, although not illustrated, a capacitance of a memory cell is, similar to this storage capacitance, formed of a gate electrode and a body (polysilicon layer) when a DRAM is formed.

TFTs composing the circuits on the display device substrate shown in FIG. 50 are prepared as TFTs of an identical process, which is a process where pixel switches that require the highest voltage can operate.

Furthermore, patterned 4 μm supports are fabricated on this TFT substrate (unillustrated), which are not only used as spacers to maintain gaps but also provide the substrate with impact resistance. In addition, an ultraviolet curing seal member is coated outside the pixel region of an opposite substrate (unillustrated).

After adhering the TFT substrate with the opposite substrate, liquid crystal is injected therebetween. The crystal material is of nematic liquid crystal, which is made into a twisted-nematic (TN) type by matching the rubbing direction by adding a chiral liquid.

In the present embodiment, a transmissive liquid crystal display device which simultaneously satisfies a higher-definition, further multiple tones, lower cost, and lower power consumption than those of a prior-art construction can be realized.

Although an excimer laser has been used for forming a polysilicon layer in the present embodiment, another laser such as, for example, a CW laser capable of continues oscillation can be used.

In the present embodiment, the peripheral CMOS circuit can be constructed in a process identical to a process where pixel switches that require a high voltage can operate.

Fourteenth Embodiment

Figure 54:
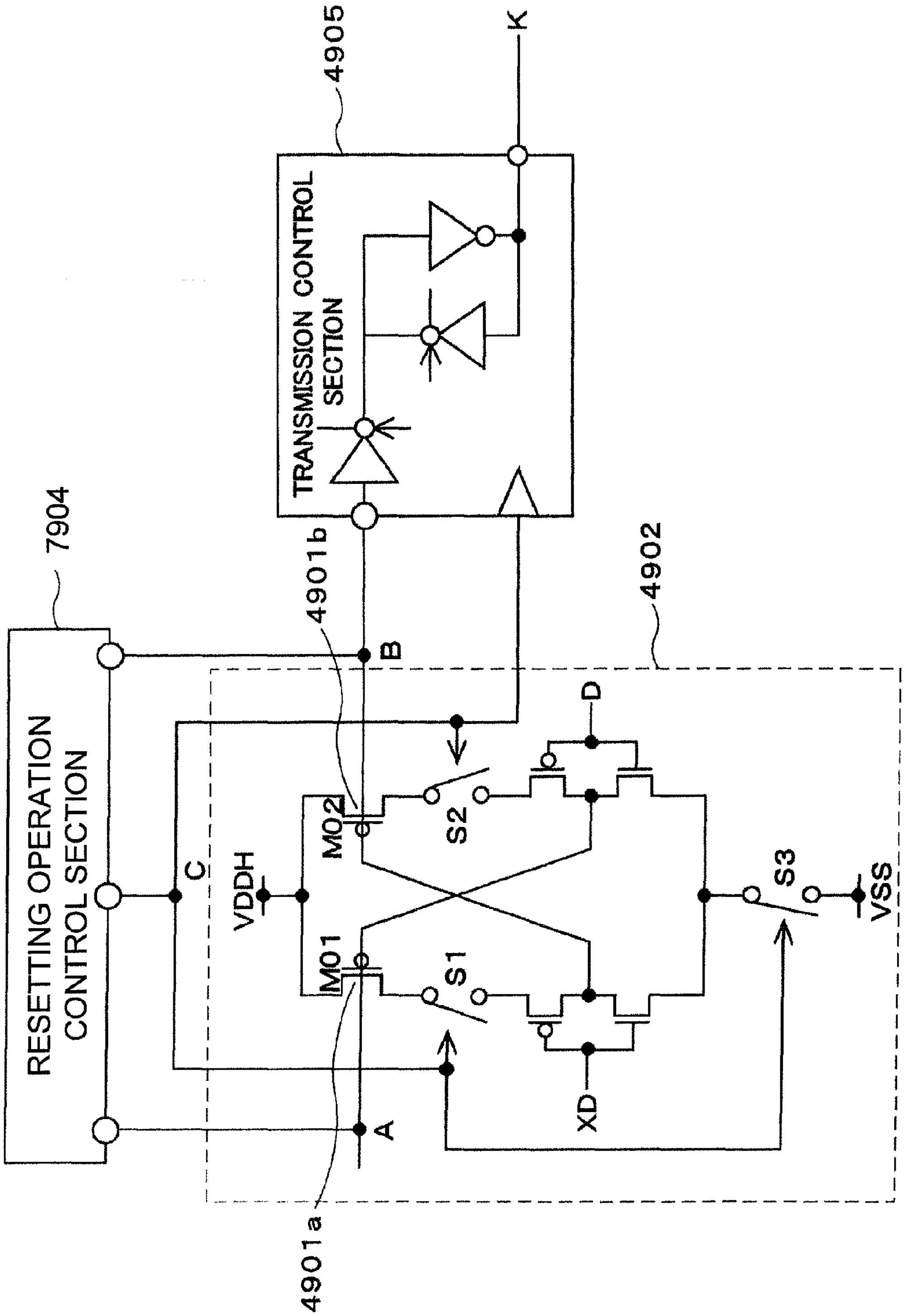
FIG. 54 is a circuit diagram of a level conversion circuit of a fourteenth embodiment of the present invention.

This embodiment relates to a level shift circuit (also referred to as a level conversion circuit). FIG. 54 shows a circuit configuration diagram of a level shift circuit of the present embodiment. Input is at D and XD, in which low voltage logic signals in a complementary relationship are inputted. Output appears at node K, and amplitude of the logic signal is a high-voltage logic high-level supply voltage VDDH-VSS. Namely, by amplifying a low voltage logic signal in amplitude, a high-voltage amplitude logic signal is outputted.

Here, the circuit diagram of FIG. 54 from which a reset operation control section (7904) and a transmission control section (4905) are removed and also switches of S1, S2, and S3 are removed by short-circuiting is equal to a conventionally known level shift circuit.

The present embodiment aims to control unevenness in output rising and falling delays by giving body potential reset pulses (5003*a* and 5003*b*) to p-channel MOS transistors M01 (4901*a*) and M02 (4001*b*). The reset operation control section (7904) gives a reset voltage to the transistors M01 and M02 through nodes A and B. In addition, the switches S1, S2, and S3 are off during the period where the reset is being given, so as to prevent a drain current from flowing to the transistors M01 and M02. In addition, a current that flows to other circuit parts is cut. These switches S1, S2, and S3 are controlled by the reset operation control section (7904) through a node C, and the switches S1, S2, and S3 are turned off when C is at a high level.

At a part beyond the node B, a transmission control section (4905) composed of, for example, a latch circuit is connected. This transmission control section (4905) is controlled by the reset operation control section (7904) through the node C, and a logical value of the node B, namely, a high level or a low level, is transmitted as it is to the node K when C is at a low level, the logical value of the node B is latched at a rise of node C, and this latched value is outputted in Period C where the node is at a high level.

Figure 55:
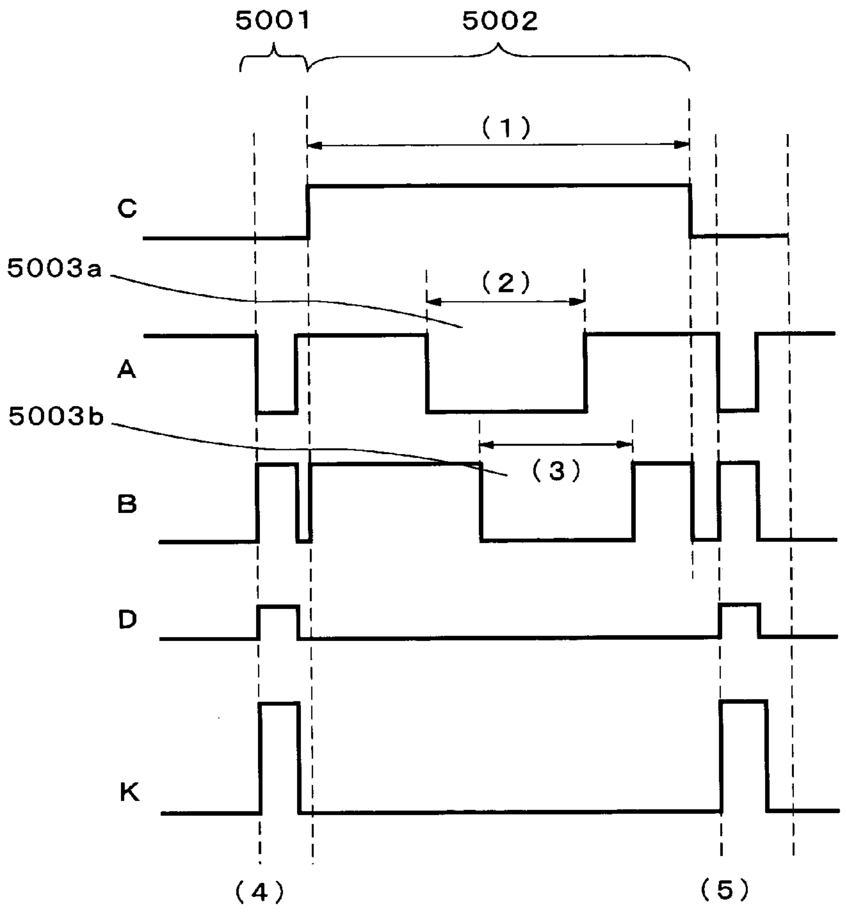
FIG. 55 is a timing chart diagram showing a method for driving a level conversion circuit of a fourteenth embodiment of the present invention.

Next, description will be given of operations with reference to a timing chart of FIG. 55

A driving method of the present embodiment is characterized by outputting a necessary signal in a first period (effective period) (5001) and thereby giving, between the gate and source of two predetermined MOS transistors (4901*a* and 4901*b*), step waveform voltages (5003*a* and 5003*b*) not less than the threshold voltage of the MOS transistors in a second period (idle period) (5002).

At the timing (4), a signal pulse is inputted in D. Thereafter, the node C becomes high in level in a period (1). Thereby, S1, S2, and S3 are turned off. In addition, for the node K, a low level of the node B immediately before the same is latched and outputted. In addition, to the node A and node B, a voltage of VDDH is given by the reset operation control section (4904) (7904) so that VGS of the transistors M01 and M02 becomes 0V. Then, in a period (2) and a period (3), to the gates of the M01 and M02, body potential reset pulses as high as an extent to turn on these MOS transistors or more are given. Thereafter, at the falling timing of C, impedance of the reset operation control section (7904) in terms of A and B is set to a high impedance. In addition, the switches S1, S2, and S3 are turned on. Thereby, at the timing (5), the transmission control section (4905) operates to again output the value of B to K.

Then, a signal pulse is again given to D, and according thereto, a level-shifted signal pulse is outputted to K.

MOS transistor body potentials can be reset, and thereby characteristics of the MOS transistors fluctuated by operation histories can be corrected, thus operation of the level conversion circuit is stabilized. In particular, fluctuation in rising and falling times can be suppressed.

Fifteenth Embodiment

Figure 56:
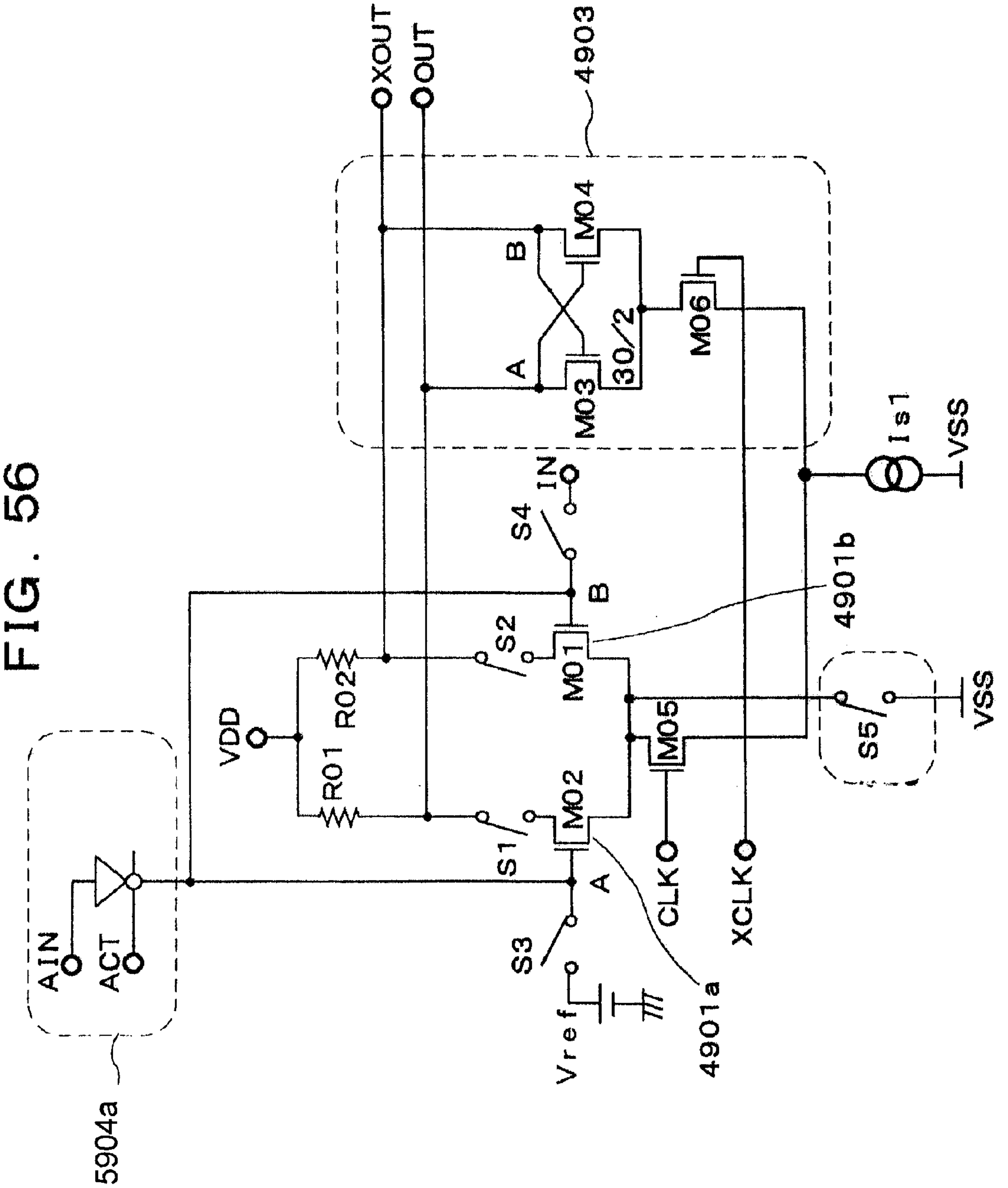
FIG. 56 is a circuit diagram of a latched comparator circuit of the fifteenth embodiment of the present invention.

In the present embodiment, a latched comparator circuit is prepared. FIG. 56 shows a latched comparator circuit of the present embodiment. Switches S1 to S4 are added to a conventionally known latched comparator circuit. Furthermore, a switch S5 is added.

The present latched comparator circuit includes, as shown in FIG. 56, a differential amplification circuit composed of MOS transistors M01 (4901*b*) and M02 (4901*a*), a constant current source Is1, and loads R01 and R02 and a second circuit (4903) including a latch circuit for latching an output from this differential amplification circuit. A transistor M05 is provided to be turned on when CLK is at a high level so as to make the differential amplification circuit operate and to be turned off when CLK is at a low level so as to stop the amplifying operation. Here, XCLK stands for an inversion signal of CLK, and XOUT stands for an inversion signal of OUT.

Also, the circuit includes switches S1 and S2 to open drain terminals of the transistors M01 and M02. Also, the circuit includes a switch S5 to give VSS to source terminals of the transistors M01 and M02. Also, switches S4 and S3 to turn on and off sections between an input terminal (IN) of the differential amplification circuit and gate terminals of the transistors M01 and M02. Furthermore, the circuit includes a clocked inverter circuit CINV01 (5904*a*) to give a step voltage to the node A and node B. In this example, power supply of the CINV01 is provided as VDD and VSS.

Figure 57:
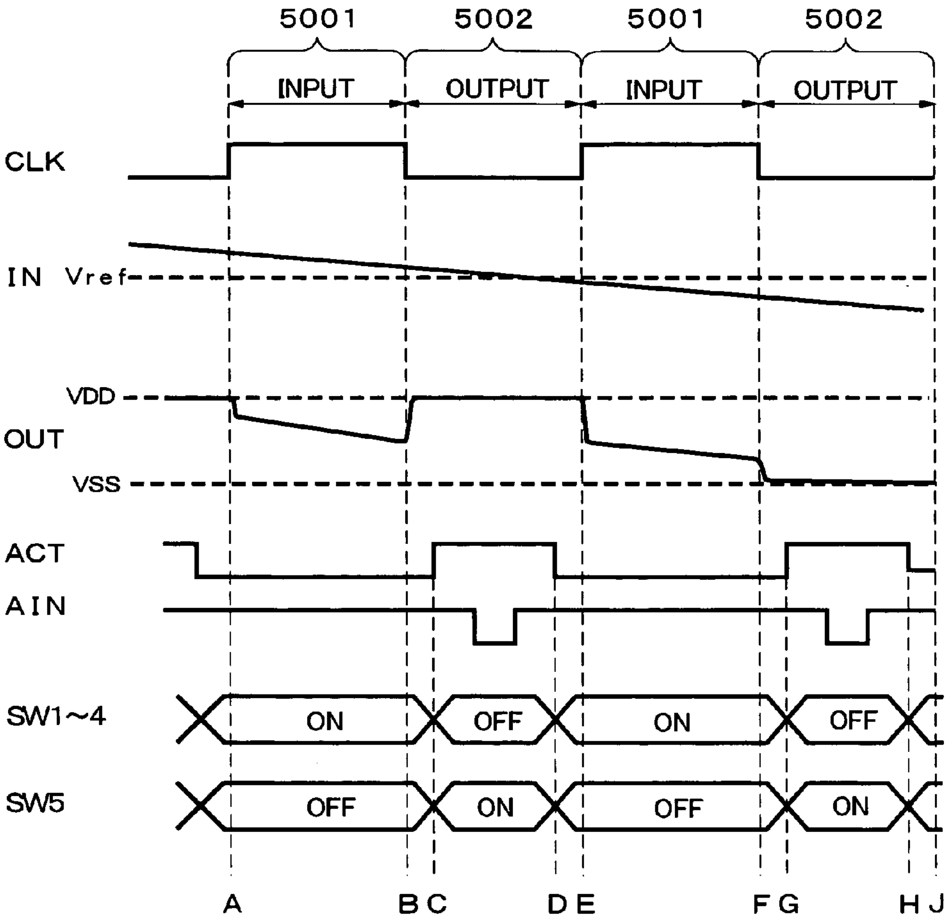
FIG. 57 is a timing chart diagram showing a method for driving a latched comparator circuit of the fifteenth embodiment of the present invention.

Next, description will be given of operations with reference to a timing chart of the present circuit shown in FIG. 57. In a period A to B (5001) where CLK is at a high level, a MOS transistor M05 is on and M06 is off. In addition, since the switches SW1 to SW4 are on and the switch SW5 is off, the differential amplification circuit operates in accordance with a voltage of Vref and a voltage given to IN, and amplified voltages of the input voltages appear at the OUT and XOUT terminals.

When CLK falls subsequently, a latch circuit composed of transistors M03 and M04 operates, thereby, out of the voltage appeared at the OUT and XOUT terminals earlier, voltage of a lower voltage node is lowered, while a higher voltage node (OUT in this drawing) is raised to VDD. Thereby, the outputs are brought into a latched condition.

In addition to these operations, body potential reset pulses are given to the MOS transistor M01 and M02 in a period (5002) where CLK is low. First, SW1 to SW4 are turned off, and SW5 is turned on. Then, a high level is given to ACT to activate a clocked inverter CINV01, and a falling pulse is given to AIN. Thereby, rising pulses are given to the nodes A and B. At this time, since S5 has continuity, for VGS of the transistors M01 and M02, a pulse of VDD-VSS is given.

When a clock rises subsequently, the switches SW1 to SW4 are turned on, the switch SW5 is turned off, and the comparator operation is repeated in accordance with a following input signal to continue operation.

In a conventional latched comparator circuit, different voltage stresses have been applied to the transistors M01 and M02, and a threshold voltage of the transistors M01 and M02 has been thereby dynamically fluctuated. Thus, a dynamic fluctuation in the threshold value of the comparator circuit results in a circuit where a relative error is large or outputs are fluctuated depending on hystereses.

In the present embodiment, since a step voltage is applied to VGS of the transistors M01 and M02, body potentials of the transistors M01 and M02 are thereby reset, and a dynamic fluctuation in the threshold voltage is reset. Thus, a latched comparator circuit with a small relative error or independent of hystereses can be obtained.

In addition, in the present embodiment, output voltage has been held by the latch circuit during a period where body potential reset pulses are being given, and the body potential reset pulses never influence output by making S1 and S2 open.

In addition, in the present embodiment, since the body potential reset pulses are given in a period where the outputs have been latched and are being used in the next stage circuit, an increase in the cycle resulting from a reset operation can be suppressed.

In addition, since the comparator circuit has been constructed, in the present embodiment, so that the OUT node and XOUT node fully swing from VDD to VSS as a result of turning on an M06, by driving the same so that the S1 and S2 becomes off before turning on the M06, a voltage applied to the M01 and M02 for detecting greater and smaller input voltages can be kept low. In a case of such driving, since a hysteresis effect of the M01 and M02 is suppressed, a desirable accuracy can be secured even when no reset pulses are given.

Sixteenth Embodiment

Figure 58:
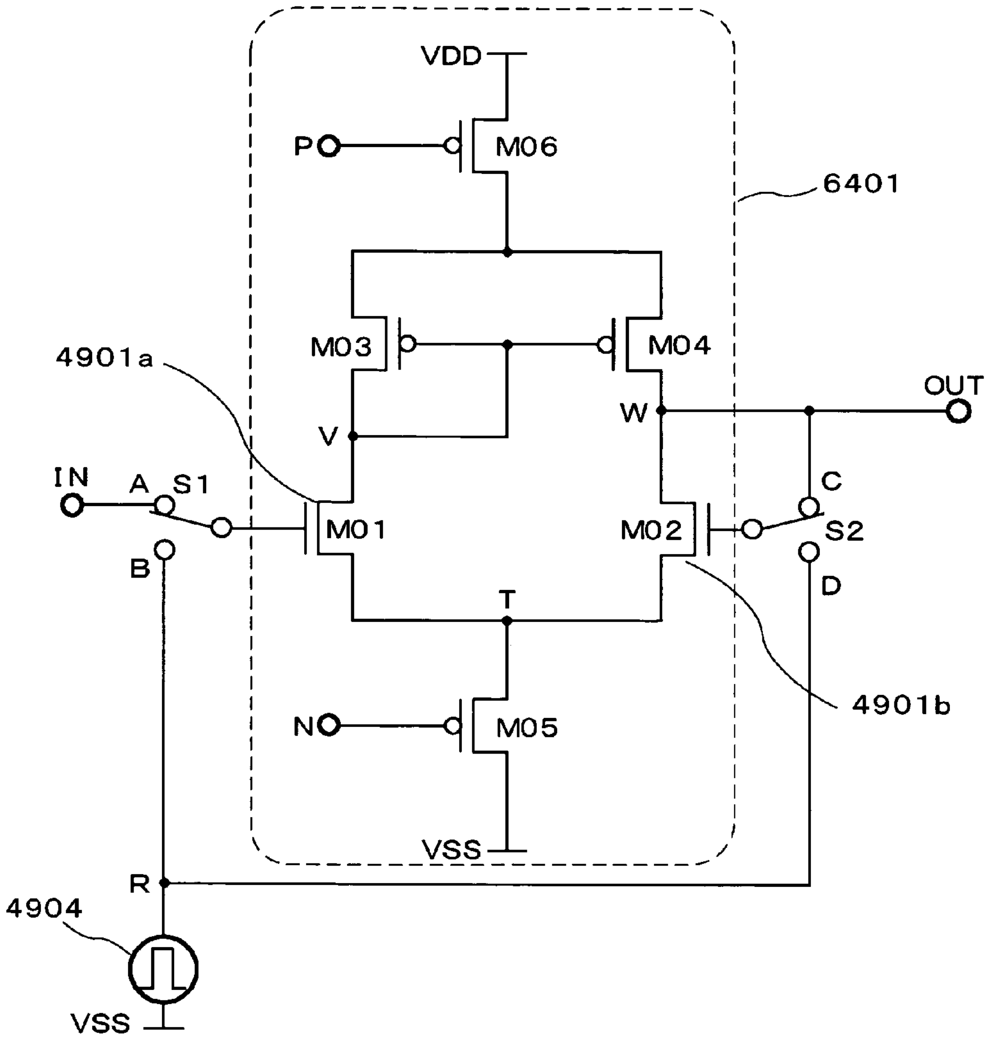
FIG. 58 is a circuit diagram of a differential amplification circuit and a voltage follower circuit of a sixteenth embodiment of the present invention.

This embodiment relates to a voltage follower circuit 6401 using a differential amplification circuit. FIG. 58 shows a voltage follower circuit of the present embodiment. A conventionally known voltage follower circuit has no switches S1 and S2, and in a part equivalent to S1, an input node IN is connected to the gate of M01, and the gate of M02 is directly connected to an OUT node.

In the conventional voltage follower circuit, a node V and a node W have different voltages according to inputs into this circuit. Accordingly, depending on hystereses of inputted voltages, characteristics of the MOS transistors M01 and M02 differently fluctuate by a floating body effect, whereby input/output characteristics are deteriorated.

In a voltage follower circuit of the present invention, provided is a step waveform voltage applying section (4904) for resetting body potentials of the transistors M01 and M02 in a period between one input and the next input. For making the circuit function ordinarily as a voltage follower, the switch S1 is connected to the A-side, and the switch S2 is connected to the C-side. For resetting body potentials, the switch S1 is connected to the B-side, and the switch S2 is connected to the D-side. Then, a step voltage is applied to a node R by use of a step waveform voltage applying section (4904). At this time, the step voltage is given so that VGS of the transistors M01 and M02 becomes not less than the threshold voltage of these MOS transistors.

Although a description has been given of a voltage follower in the present embodiment, the circuit format is not limited to a voltage follower, and the present invention can be applied to circuits in general for carrying an amplifying operation by using a difference in conductance between two MOS transistors as in a differential amplifier circuit. Namely, by applying a step voltage to make VGS not less than the threshold value to the two MOS transistors, a dynamic fluctuation of these two MOS transistor can be reset.

In addition, as a result of application of the present voltage follower circuit to an output stage of the DAC circuit shown in FIG. 50, image quality of the display portion is improved.

Since a step voltage to make VGS of the MOS transistors M01 and M02 not less than the threshold voltage is applied to the MOS transistors M01 and M02, body potentials of these MOS transistors are reset.

Thereby, an offset of the voltage follower circuit which has occurred owing to operation histories is improved, thus a deterioration in input/output characteristics of the voltage follower is improved. Thereby, image quality of a display device for which the present voltage follower circuit has been applied to the output stage of the DAC circuit shown in FIG. 50 is improved.

Seventeenth Embodiment

Figure 59:
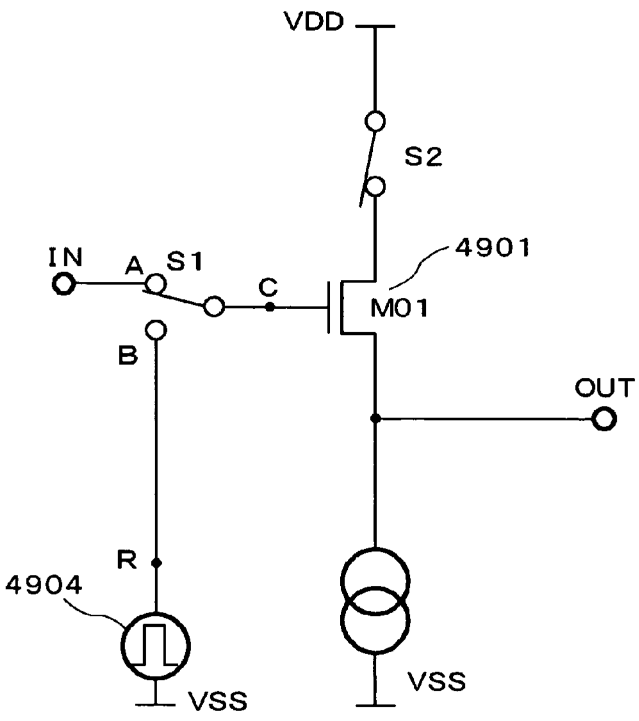
FIG. 59 is a circuit diagram of a source follower circuit of a seventeenth embodiment of the present invention.

The present embodiment relates to a source follower circuit. FIG. 59 shows a circuit configuration. Connecting a switch S1 to the A-side and turning on a switch S2 for operation allows the present circuit to operate as a source follower as a conventionally known source follower.

A voltage (VDS) between the drain and source of a MOS transistor M01 greatly fluctuates according to an input voltage in the source follower. Then, in accordance therewith, body potential of the M01 dynamically fluctuates. Thereby, the inventor has discovered that MOS transistor characteristics of the transistor M01 dynamically fluctuate and input/output characteristics of a conventional source follower changes according to hystereses.

In order to solve this problem, a body potential reset pulse is applied between the gate and source of the transistor M01. To a node R, a step waveform voltage applying section (4904) for applying a body potential reset pulse is connected. In addition, a switch S2 is provided to prevent a current from flowing through the transistor M01 when resetting.

Figure 60:
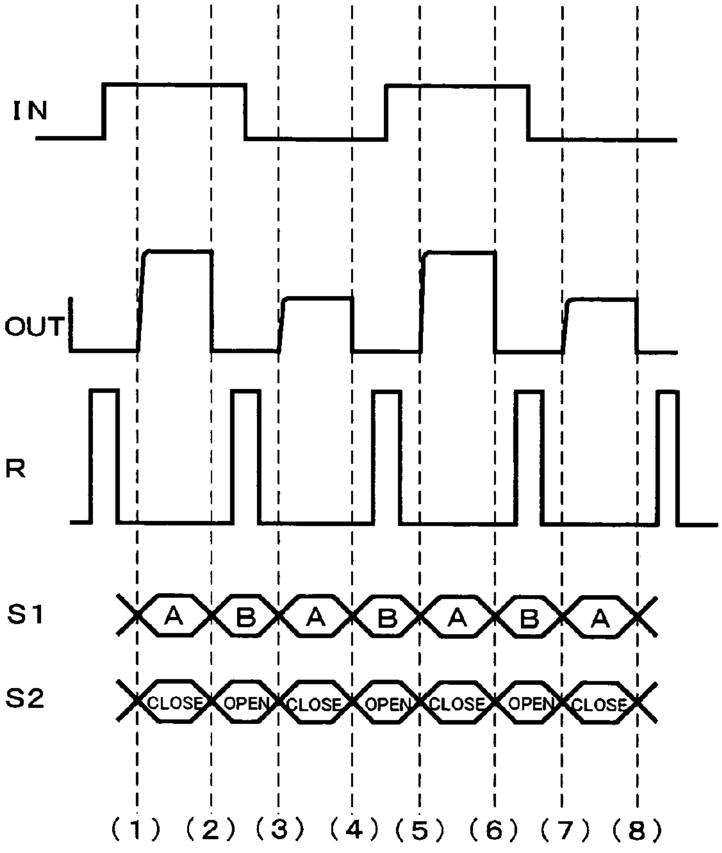
FIG. 60 is a timing chart showing a method for driving a source follower circuit of a seventeenth embodiment of the present invention.

Next, description will be given of a driving method with reference to a timing chart shown in FIG. 60. In a period (1) to (2) of the timing chart, the present circuit operates as a source follower using the transistor M01 as an amplifying element. Namely, S1 is connected to the A-side, and S2 is on (closed). A body potential reset pulse is applied to the transistor M01 in a period (2) to (3) of the timing chart. Namely, in this period, S1 is connected to the B-side, whereby the gate voltage of the transistor M01 is connected to a step waveform voltage applying section (4904). In addition, the switch S2 is turned off (opened), whereby a current is prevented from flowing to the transistor M01 when resetting. In a subsequent period of (3) to (4), this is again operated as a source follower circuit.

In addition, as a result of application of the present source follower circuit to an output stage of the DAC circuit shown in FIG. 50, image quality of the display portion is improved.

Body potential is reset since, between the gate and source of a MOS transistor, a step voltage with VGS higher than the threshold voltage of this MOS transistor is given. Thereby, fluctuation in input/output characteristics of the source follower circuit that has occurred owing to operation histories of the circuit can be suppressed.

Thereby, image quality of a display device for which the present source follower circuit has been applied to the output stage of the DAC circuit shown in FIG. 50 is improved.

In addition, since the switch S2 is off when giving a body potential reset pulse, an increase in consumption current can be suppressed.

Other Embodiments

Effects of the present invention can also be obtained by use circuits complementary to the circuits described first embodiment through tenth embodiment and fourteenth embodiment through seventeenth embodiment and driving methods according thereto (circuits and driving methods where the positive and negative of the power supply and reset pulse voltage have been inverted by interchanging the n-channel MOS transistors and p-channel MOS transistors).

According to the embodiments of the present invention, examples where a reset pulse voltage with an amplitude of 0V to Vrst is given to VGS of predetermined MOS transistor(s) have been mentioned. Herein, effects of the present invention can be obtained even when a lower voltage is other than 0V. That is, effects of the present invention can be obtained as long as the lower voltage is lower than the threshold voltage of the MOS transistor(s).

What is claimed is:

1. A semiconductor device comprising:

a latch circuit that amplifies a voltage given by a voltage source via a pair of bit lines to a level required for a signal, and outputs the amplified signal via the pair of bit lines; the latch circuit constructed by cross-linking corresponding gates and drains of first and second MOS transistors between a first terminal and a second terminal, the first and second MOS transistor including, as channels, semiconductor layers having boundaries provided on insulating layers;

a first voltage applying section connected to the first terminal and gives, between a gate and a source of the second MOS transistor, a first step waveform voltage not less than a threshold voltage of the second MOS transistor for a predetermined number of times;

a second voltage applying section connected to the second terminal and gives, between a gate and a source of the first MOS transistor, a second step waveform voltage not less than a threshold voltage of the first MOS transistor for a predetermined number of times:

a first switch that lies between one bit line of the pair of bit lines and the first terminal; and a second switch that lies between the other one bit line of the pair of bit lines and the second terminal;

wherein the semiconductor device executes, when the first and second terminals are each disconnected from the pair of bit lines by the first and second switches, respectively, a first process in which the first voltage applying section gives, between the gate and the source of the second MOS transistor, the first step waveform voltage for the predetermined number of times, and the second voltage applying section then gives, between the gate and the source of the first MOS transistor, the second step waveform voltage for the predetermined number of times, subsequently, executes, when the first and second terminals are each connected to each bit line of the pair of bit lines by the first and second switches, respectively, a second process in which the voltage source gives the voltage to the first and second terminals of the latch circuit via the pair of bit lines, subsequently, executes a third process in which the latch circuit amplifies the given voltage to be a required signal, subsequently, executes a fourth process in which the latch circuit outputs the amplified signal via the pair of bit lines, and subsequently returns to the first process again and repeats the first to the fourth process.

2. A display device comprising the semiconductor device according to claim 1, the display device further comprising:

a display portion constructed by arranging pixels in a matrix form at intersections of a plurality of data lines with a plurality of scanning lines; and a memory for storing data corresponding to information to be displayed on the display portion, on an identical substrate thereof.

3. A personal digital assistant loaded with the display device as set forth in claim 2.

4. The semiconductor device according to claim 1, wherein the boundaries include grain boundaries, and at least one of the first and second MOS transistors includes a body contact.

5. The semiconductor device according to claim 1, wherein the boundaries include grain boundaries, and at least one of the first and second MOS transistors includes a back gate.

6. The semiconductor device according to claim 1, wherein positive holes-accumulated in body portions of the first and second MOS transistors are eliminated, through an application of the first and second step waveform voltages, the positive holes to move in a direction from the body portion to the gate of the first and second MOS transistors, respectively, and to be recombined with electrons.

7. The semiconductor device according to claim 1, wherein the first voltage applying section comprises a first pulse voltage generator; the second voltage applying section comprises a second pulse voltage generator; the first pulse voltage generator is connected to the first terminal via the first switch and a third switch in sequence: the second pulse voltage generator is connected to the second terminal via the third switch and a fourth switch in sequence; the voltage source comprises a fixed voltage source and a variable voltage source; the fixed voltage source is connected to the first terminal via one of the pair of the bit lines, the first switch, and the third switch in sequence; the variable voltage source is connected to the second terminal via the other one of the pair of the bit lines, the second switch, and the fourth switch in sequence; the first switch is a first selector switch, the first switch is selectively electrically connected to one of the first pulse voltage generator and the fixed voltage source according to a control signal; the second switch is a second selector switch, the second switch is selectively electrically connected to one of the second pulse voltage generator and the variable voltage source according to the control signal.

8. The semiconductor device according to claim 1, wherein the first and second voltage applying sections each comprise a clocked inverter.

9. The semiconductor device according to claim 1, wherein the latch circuit comprises a third switch and a fourth switch; the voltage source comprises a fixed voltage source and a variable voltage source; the first switch is a first selector switch and the first selector switch comprises a first pole, a first conductive end, and a second conductive end; the first conductive end is connected to the first voltage applying section, and the second conductive end is connected to the fixed voltage source via one of the pair of bit lines; the first pole comprises a first end and a second end, the first end is connected to the first terminal via the third switch, the second end is selectively electrically connected to one of the first conductive end and the second conductive end according to a control signal; the second switch is a second selector switch and the second selector switch comprises a second pole, a third conductive end, and a fourth conductive end; the third conductive end is connected to the second voltage applying section, the fourth conductive end is connected to the variable voltage source via the other one of the pair of bit lines; the second pole comprises a third end and a fourth end, the third end is connected to the third terminal via the fourth switch, the fourth end is selectively electrically connected to one of the third conductive end and the fourth conductive end according to the control signal.

10. The semiconductor device according to claim 9, wherein when the first pole of the first selector switch is connected to the first conductive end, the second pole of the second selector switch is connected to the third conductive end under control of the control signal, the third switch is switched on, and the fourth switch is switched on, the first voltage applying section gives, between the gate and the source of the second MOS transistor, the first step waveform voltage for the predetermined number of times via the third switch, and the second voltage applying section then gives, between the gate and the source of the first MOS transistor, the second step waveform voltage for the predetermined number of times via the fourth switch.

11. The semiconductor device according to claim 10, wherein when the first pole of the first selector switch is connected to the second conductive end, the second pole of the second selector switch is connected to the fourth conductive end under control of the control signal, the third switch is switched on, and the fourth switch is switched on, the fixed voltage source supplies a fixed voltage to the first terminal via the third switch, and the variable voltage source supplies a variable voltage to the second terminal via the fourth switch.

12. The semiconductor device according to claim 11, wherein the latch circuit further comprises a first capacitor and a second capacitor, the first terminal is connected to ground via the first capacitor, and the second terminal is connected to ground via the second terminal.

13. A method for driving a semiconductor device having a first circuit, a first switch, and a second switch; the first circuit constructed by cross-linking corresponding gates and drains of first and second MOS transistors between a first terminal and a second terminal, the first and second MOS transistors including, as channels, semiconductor layers having boundaries provided on insulating layers; the first switch lying between a first bit line and the first terminal, and the second switch lying between a second bit line and the second terminal, the method comprising:

executing, when the first and second terminals are each disconnected from the first and second bit lines by the first, and second switches, respectively, a first process in which a first voltage applying section connected to the first terminal gives, between a gate and a source of the second MOS transistor, a first step waveform voltage not less than a threshold voltage of the second MOS transistor for a predetermined number of times, and second voltage applying section connected to the second terminal then gives, between a gate and a source of the first MOS transistor, a second step waveform voltage not less than a threshold voltage of the first MOS transistor for a predetermined number of times;

subsequently, executing, when the first and second terminals are each connected to the first and second bit lines by the first and second switches, respectively, a second process in which a voltage source gives a voltage to the first circuit via the first and second bit lines, subsequently, executing a third process in which the first circuit amplifies the voltage given by the voltage source to be a required signal, subsequently, executing a fourth process in which the first circuit outputs the amplified signal via the first and second bit lines, and subsequently, returning to the first process again and executing the first to the fourth processes repeatedly.

14. The method according to claim 13, wherein the first circuit comprises a third switch and a fourth switch; the voltage source comprises a fixed voltage source and a variable voltage source; the first switch is a first selector switch, the first selector switch comprises a first pole, a first conductive end, and a second conductive end; the first conductive end is connected to the first voltage applying section, the second conductive end is connected to the fixed voltage source via the first bit line; the first pole comprises a first end and a second end, the first end is connected to the first terminal via the third switch, the second end is selectively electrically connected to one of the first conductive end and the second conductive end according to a control signal; the second switch is a second selector switch, the second selector switch comprises a second pole, a third conductive end, and a fourth conductive end, the third conductive end is connected to the second voltage applying section, the fourth conductive end is connected to the variable voltage source via the second bit line; the second pole comprises a third end and a fourth end, the third end is connected to the third terminal via the fourth switch, the fourth end is selectively electrically connected to one of the third conductive end and the fourth conductive end according to the control signal.

15. The semiconductor device according to claim 14, wherein when the first pole of the first selector switch is connected to the first conductive end, the second pole of the second selector switch is connected to the third conductive end under control of the control signal, the third switch is switched on, and the fourth switch is switched on, the first voltage applying section gives, between the gate and the source of the second MOS transistor, the first step waveform voltage for the predetermined number of times via the third switch, and the second voltage applying, section then gives, between the gate and the source of the first MOS transistor, the second step waveform voltage for the predetermined number of times via the fourth switch.

16. The semiconductor device according to claim 15, wherein when the first pole of the first selector switch is connected to the second conductive end, the second pole of the second selector switch is connected to the fourth conductive end under control of the control signal, the third switch is switched on, and the fourth switch is switched on, the fixed voltage source supplies a fixed voltage to the first terminal via the third switch, and the variable voltage source supplies a variable voltage to the second terminal via the fourth switch.

* * * * *